United States Patent
Przybylski

(10) Patent No.: US 10,612,805 B2
(45) Date of Patent: Apr. 7, 2020

(54) BUILDING AUTOMATION SYSTEM WITH A PARALLEL RELATIONSHIP COMPUTATION ENGINE

(71) Applicant: Johnson Controls Technology Company, Auburn Hills, MI (US)

(72) Inventor: Andrew J. Przybylski, Franksville, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 103 days.

(21) Appl. No.: 15/896,413

(22) Filed: Feb. 14, 2018

(65) Prior Publication Data
US 2018/0260219 A1 Sep. 13, 2018

Related U.S. Application Data

(60) Provisional application No. 62/469,246, filed on Mar. 9, 2017.

(51) Int. Cl.
*G06F 9/46* (2006.01)
*F24F 11/52* (2018.01)
(Continued)

(52) U.S. Cl.
CPC ............ *F24F 11/52* (2018.01); *F24F 11/32* (2018.01); *F24F 11/47* (2018.01); *F24F 11/88* (2018.01);
(Continued)

(58) Field of Classification Search
None
See application file for complete search history.

(56) References Cited

U.S. PATENT DOCUMENTS 6,557,095 B1 * 4/2003 Henstrom ............. G06F 9/3836
712/207
7,966,083 B2 6/2011 Moorer et al.
(Continued)

FOREIGN PATENT DOCUMENTS

EP 2 344 959 B1 5/2017
GB 2 541 170 A 2/2017
(Continued)

OTHER PUBLICATIONS https://developers.google.com/protocol-buffers/docs/csharptutorial, updated May 12, 2017. (8 pages).
(Continued)

*Primary Examiner* — Gregory A Kessler
(74) *Attorney, Agent, or Firm* — Foley & Lardner LLP

(57) ABSTRACT

A method for executing computations in parallel for a building management system of a building includes receiving a computing job request to determine values for one or more particular properties, receiving a property model indicating dependencies between a plurality of properties, the plurality of properties including the one or more particular properties, wherein the plurality of properties include building data for the building, and generating one or more computing threads based on the property model, wherein each computing thread includes a sequence of computations for determining values for the plurality of properties. The method further includes executing the computing threads in parallel to determine the values for the particular properties.

18 Claims, 34 Drawing Sheets

(51) Int. Cl.
| | |
|---|---|
| F24F 11/32 | (2018.01) |
| F24F 11/88 | (2018.01) |
| H04L 12/28 | (2006.01) |
| G06F 8/41 | (2018.01) |
| G05B 15/02 | (2006.01) |
| G06F 9/50 | (2006.01) |
| F24F 11/47 | (2018.01) |
| G06F 8/34 | (2018.01) |
| G06F 9/455 | (2018.01) |
| G06F 8/60 | (2018.01) |
| G06F 8/35 | (2018.01) |
| G06F 8/20 | (2018.01) |
| G06F 3/0481 | (2013.01) |
| G06F 3/0484 | (2013.01) |
| G06F 9/28 | (2006.01) |
| H04L 29/08 | (2006.01) |
| G06F 9/451 | (2018.01) |
| G05B 19/042 | (2006.01) |
| G05B 19/418 | (2006.01) |
| G06F 9/448 | (2018.01) |
| H04L 12/24 | (2006.01) |

(52) U.S. Cl.
CPC ......... *G05B 15/02* (2013.01); *G05B 19/0426* (2013.01); *G05B 19/41885* (2013.01); *G06F 3/0484* (2013.01); *G06F 3/04817* (2013.01); *G06F 3/04842* (2013.01); *G06F 3/04847* (2013.01); *G06F 8/20* (2013.01); *G06F 8/34* (2013.01); *G06F 8/35* (2013.01); *G06F 8/45* (2013.01); *G06F 8/60* (2013.01); *G06F 9/28* (2013.01); *G06F 9/4494* (2018.02); *G06F 9/451* (2018.02); *G06F 9/45512* (2013.01); *G06F 9/505* (2013.01); *G06F 9/5016* (2013.01); *G06F 9/5066* (2013.01); *H04L 12/2803* (2013.01); *H04L 12/283* (2013.01); *H04L 12/2809* (2013.01); *H04L 12/2812* (2013.01); *H04L 12/2816* (2013.01); *H04L 12/2818* (2013.01); *H04L 12/2823* (2013.01); *H04L 12/2825* (2013.01); *H04L 12/2834* (2013.01); *H04L 41/22* (2013.01); *H04L 67/10* (2013.01); *H04L 67/125* (2013.01); *H04L 67/327* (2013.01); *G05B 2219/2614* (2013.01); *G05B 2219/2642* (2013.01); *G06F 2209/522* (2013.01); *G06F 2212/1044* (2013.01); *H04L 67/12* (2013.01); *H04L 2012/285* (2013.01); *Y02D 10/22* (2018.01); *Y02D 10/36* (2018.01)

(56) References Cited

U.S. PATENT DOCUMENTS

| | | | |
|---|---|---|---|
| 8,001,219 | B2 | 8/2011 | Moorer et al. |
| 8,757,507 | B2 | 6/2014 | Fadell et al. |
| 8,762,942 | B2 | 6/2014 | Langworthy et al. |
| 8,903,554 | B2 | 12/2014 | Stagner |
| 9,475,359 | B2 | 10/2016 | MacKay |
| 9,671,768 | B2 | 6/2017 | Lo et al. |
| 9,817,383 | B1 | 11/2017 | Sinha et al. |
| 10,018,977 | B2 | 7/2018 | Cipollo et al. |
| 10,151,502 | B2 | 12/2018 | Flaherty et al. |
| 2004/0143510 | A1 | 7/2004 | Haeberle et al. |
| 2005/0119767 | A1 | 6/2005 | Kiwimagi et al. |
| 2006/0236248 | A1 | 10/2006 | Eischeid et al. |
| 2007/0208682 | A1 | 9/2007 | Mancisidor et al. |
| 2007/0211079 | A1 | 9/2007 | Nixon et al. |
| 2008/0167756 | A1 | 7/2008 | Golden et al. |
| 2009/0228812 | A1 | 9/2009 | Keenan et al. |
| 2010/0262298 | A1 | 10/2010 | Johnson et al. |
| 2011/0066258 | A1 | 3/2011 | Torzhkov et al. |
| 2011/0087988 | A1* | 4/2011 | Ray .................. G06Q 10/06 715/771 |
| 2011/0257911 | A1 | 10/2011 | Drees et al. |
| 2012/0083927 | A1 | 4/2012 | Nakamura et al. |
| 2012/0130679 | A1 | 5/2012 | Fadell et al. |
| 2012/0296480 | A1 | 11/2012 | Raman et al. |
| 2012/0310418 | A1 | 12/2012 | Harrod et al. |
| 2012/0310560 | A1 | 12/2012 | Ozaki |
| 2013/0179761 | A1 | 7/2013 | Cho et al. |
| 2014/0099002 | A1 | 4/2014 | Kim |
| 2014/0163759 | A1 | 6/2014 | Anderson et al. |
| 2014/0226851 | A1 | 8/2014 | Alberth et al. |
| 2014/0249876 | A1 | 9/2014 | Wu et al. |
| 2014/0346239 | A1 | 11/2014 | Fadell et al. |
| 2015/0066228 | A1 | 3/2015 | Clifton |
| 2015/0088312 | A1 | 3/2015 | Lo et al. |
| 2015/0198938 | A1 | 7/2015 | Steele et al. |
| 2015/0212714 | A1 | 7/2015 | Hua et al. |
| 2015/0256549 | A1 | 9/2015 | Spurlock et al. |
| 2015/0316902 | A1 | 11/2015 | Wenzel et al. |
| 2015/0316903 | A1 | 11/2015 | Asmus et al. |
| 2015/0316907 | A1 | 11/2015 | Elbsat et al. |
| 2015/0331689 | A1 | 11/2015 | Blahaerath et al. |
| 2016/0102881 | A1 | 4/2016 | Kim et al. |
| 2016/0131383 | A1 | 5/2016 | Zhao et al. |
| 2016/0132614 | A1 | 5/2016 | Eiynk et al. |
| 2016/0155223 | A1 | 6/2016 | Alberth et al. |
| 2016/0180220 | A1 | 6/2016 | Boettcher et al. |
| 2016/0182247 | A1 | 6/2016 | Cregg |
| 2016/0238579 | A1 | 8/2016 | Cai et al. |
| 2016/0313752 | A1 | 10/2016 | Przybylski |
| 2016/0350080 | A1 | 12/2016 | Ravindran et al. |
| 2016/0363943 | A1 | 12/2016 | Stefanski et al. |
| 2017/0006135 | A1 | 1/2017 | Siebel |
| 2017/0031962 | A1 | 2/2017 | Turney et al. |
| 2017/0036511 | A1 | 2/2017 | Lee et al. |
| 2017/0090492 | A1 | 3/2017 | Baker |
| 2017/0126879 | A1 | 5/2017 | Krishna et al. |
| 2017/0205100 | A1 | 7/2017 | Sanghamitra et al. |
| 2017/0212488 | A1 | 7/2017 | Kummer et al. |
| 2017/0212668 | A1 | 7/2017 | Shah et al. |
| 2017/0343228 | A1 | 11/2017 | Dyess et al. |
| 2017/0353858 | A1 | 12/2017 | Krishna et al. |
| 2018/0082575 | A1 | 3/2018 | El-Mankabady |
| 2018/0195753 | A1 | 7/2018 | Reider et al. |
| 2018/0224143 | A1 | 8/2018 | Anderson et al. |

FOREIGN PATENT DOCUMENTS

| | | |
|---|---|---|
| JP | 6144346 B2 | 6/2017 |
| WO | WO-2017/007990 A1 | 1/2017 |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 14 pages.

Diederik Kingma and Jimmy Ba. Adam: A Method for Stochastic Optimization. In International Conference on Learning Representations (ICLR), 2015, 15 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012. 8 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

International Search Report and Written Opinion on International Patent Application No. PCT/US2018/021288 dated Aug. 13, 2018. 20 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with

(56) References Cited

OTHER PUBLICATIONS

Evaporative Cooling Sources. Energy and Buildings, 87:199-210, 2015. 12 pages.

K. J. Astrom. Optimal Control of Markov Decision Processes with Incomplete State Estimation. J. Math. Anal. Appl., 10:174-205, 1965. 32 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages. 2018.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 21 pages.

Office Action on EP Application No. 19204033.5 dated Feb. 11, 2020. 15 pages.

\* cited by examiner

| Experiment | Chilled Water 1-Active (kW... | Chilled Water 1-UnmetLoadRateMax0 (ton... | Hot Water 1-Active (kW... | Hot Water 1-UnmetLoadRateMax0 (mmBTUperhr... | Condenser |
|---|---|---|---|---|---|
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |
| RdsTest | 3299976600.20380104 | 0 | 3062242707.1655677 | 0 | NaN |

FIG. 13

A3S   Home   Job Manager

Kernal Job Manager

Cluster Level Details
Max Runs(Cores): 127
Ram(MB): 1848.774656
Utilization: 0.00%
Jobs Running: 0
Jobs Queued: 0
Jobs Complete: 0

Kernal Services

| Name | Cores | Ram(MB) | Utilization | WorkersActive |
|---|---|---|---|---|
| Node7 | 5 | 1848.774656 | 0.00% | 1 |
| Node0 | 39 | 0 | 0.00% | 0 |
| Node6 | 11 | 0 | 0.00% | 0 |
| Node1 | 11 | 0 | 0.00% | 0 |
| Node8 | 11 | 0 | 0.00% | 0 |
| Node3 | 9 | 0 | 0.00% | 0 |
| Node4 | 15 | 0 | 0.00% | 0 |
| Node5 | 15 | 0 | 0.00% | 0 |
| Node2 | 11 | 0 | 0.00% | 0 |

Jobs

| Nickname | Id | State | Abort | Delete |
|---|---|---|---|---|

FIG. 18

BUILDING AUTOMATION SYSTEM WITH A PARALLEL RELATIONSHIP COMPUTATION ENGINE

CROSS-REFERENCE TO RELATED PATENT APPLICATION

This application claims the benefit of and priority to U.S. Provisional Patent Application No. 62/469,246 filed Mar. 9, 2017, the entirety of which is incorporated by reference herein.

BACKGROUND

The present disclosure relates generally to heating, ventilation, and air conditioning (HVAC) systems. The present disclosure relates more particularly to systems and methods for modeling and controlling building equipment.

In a building, various HVAC systems cause the building to be heated or cooled. In some buildings, a building controller can operate to cause the HVAC systems to heat and/or cool the building. The building controller can utilize various control algorithms when controlling the HVAC systems. A developer can create the control algorithm. However, whenever a developer wishes to make changes to the algorithms or generate new algorithms, an entire rebuild of the algorithm may be required. Deploying and testing an algorithm may need to be done iteratively, i.e., build the algorithm, deploy the algorithm, makes changes to the algorithm, and then repeat the process. Such a rebuild or iterative algorithm testing and deployment can be inefficient. Therefore, a robust and efficient method for developing algorithms may be desired.

SUMMARY

Parallel Computation Engine

One implementation of the present disclosure is a method for executing computations in parallel for a building management system of a building. The method includes receiving, via a processing circuit of the building management system, a computing job request to determine values for one or more particular properties and receiving, via the processing circuit of the building management system, a property model indicating dependencies between multiple properties, the properties including the particular properties. The properties include building data for the building. The method further includes generating, via the processing circuit of the building management system, computing threads based on the property model, where each computing thread includes a sequence of computations for determining values for the plurality of properties and executing, via the processing circuit of the building management system, the computing threads in parallel to determine the values for the particular properties.

In some embodiments, the method includes controlling, via the processing circuit of the building management system, building equipment of the building to control an environmental condition of the building based on the determined values for the particular properties.

In some embodiments, the dependencies between the properties includes a computational relationship between the plurality of properties, where the computational relationship between the properties indicates that a value of a first property of the properties relies on a value of a second property of the properties.

In some embodiments, executing, via the processing circuit of the building management system, the computing threads in parallel includes performing one or more determinations of the values of the properties of the computing threads and pausing the execution of one of the computing threads in response to determining that not all dependencies between the one of the computing threads and another of the computing threads for a current computation of the one computing thread has been satisfied.

In some embodiments, the method further includes identifying, via the processing circuit of the building management system, recursion in the dependencies of the properties of the property model and generating, via the processing circuit of the building management system, the computing threads to include one or more computing steps associated with the recursion at the end of the computing threads.

In some embodiments, the method includes determining, via the processing circuit of the building management system, whether the computing threads including the recursion create an infinite recursive loop and returning, via the processing circuit of the building management system, an empty result for the properties associated with the infinite recursive loop.

In some embodiments, the properties include raw properties, where the raw properties include data that has not been processed, where the raw properties include environmental data collected by building equipment of the building.

In some embodiments, executing, via the processing circuit of the building management system, the computing threads in parallel includes generating the values for the properties based on the relationships between the plurality of properties. In some embodiments, the raw properties are first properties used in a first determination of the sequence computations of the computing threads, where the values for the plurality of properties depend on values for the raw properties.

In some embodiments, generating, via the processing circuit of the building management system, the one or more computing threads based on the property model includes determining, for each of the one or more properties, a greatest dependency distance from the property to the raw properties and ordering computations of the properties in the computing threads based on the greatest dependency distances of each of the plurality of properties.

In some embodiments, determining, via the processing circuit of the building management system, for each of the one or more properties, the greatest dependency distance from the property to the raw properties includes determining a number of dependencies between the property to each of the raw properties and determining the greatest dependency distance from the property to the raw properties by comparing each of the number of dependencies between the property to each of the raw properties, wherein the greatest dependency distances is one of the number of dependencies that is the greatest number of dependencies.

Another implementation of the present disclosure is a building management system of a building for executing computations in parallel. The building management system includes a processing circuit configured to receive a computing job request to determine values for one or more particular properties and receive a property model indicating dependencies between multiple properties, the properties including the one or more particular properties, wherein the properties include building data for the building. The processing circuit is configured to generate computing threads based on the property model, wherein each computing thread includes a sequence of computations for determining values for the plurality of properties. The processing circuit is configured to execute the computing threads in parallel to determine the values for particular the properties.

In some embodiments, the processing circuit is configured to control one or more pieces of building equipment of the building to control an environmental condition of the building based on the determined values for the properties.

In some embodiments, the dependencies between the properties include a computational relationship between one or more of the properties, wherein the computational relationship between the one or more of the plurality of properties indicates that a value of a first property of the properties relies on a value of a second property of the properties.

In some embodiments, the properties include raw properties, wherein the raw properties include data that has not been processed, wherein the raw properties include environmental data collected by building equipment of the building.

In some embodiments, the processing circuit is configured to execute the computing threads in parallel by generating the values for the plurality of properties based on the relationships between the properties, wherein the raw properties are first properties used in a first determination of the sequence computations of the computing threads, wherein the values for the plurality of properties depend on values for the raw properties.

In some embodiments, the processing circuit is configured to generate the one or more computing threads based on the property model by determining, for each of the properties, a greatest dependency distance from the property to the raw properties and ordering computations of the properties in the computing threads based on the greatest dependency distances of each of the plurality of properties.

In some embodiments, determining, for each of the one or more properties, the greatest dependency distance from the property to the raw properties includes determining a number of dependencies between the property to each of the raw properties and determining the greatest dependency distance from the property to the raw properties by comparing each of the number of dependencies between the property to each of the raw properties, wherein the greatest dependency distances is one of the number of dependencies that is the greatest number of dependencies.

Another implementation of the present disclosure is a non-transitory computer readable medium having machine instructions stored therein, the instructions being executable by a processor of a building management system to perform operations including receiving a computing job request to determine values for one or more particular properties. The operations include receiving a property model indicating dependencies between a plurality of properties, the plurality of properties include the one or more particular properties, the properties include building data for the building, the plurality of properties include raw properties, wherein the raw properties include data that has not been processed, wherein the raw properties include environmental data collected by building equipment of the building. The operations further include generating computing threads based on the property model, wherein each computing thread includes a sequence of computations for determining values for the plurality of properties, wherein generating, via the processing circuit of the building management system, the one or more computing threads based on the property model including determining, for each of the one or more properties, a greatest dependency distance from the property to the raw properties, ordering computations of the properties in the computing threads based on the greatest dependency distances of each of the plurality of properties, and executing the computing threads in parallel to determine the values for the particular properties.

In some embodiments, executing the computing threads in parallel includes generating the values for the properties based on the relationships between the properties. In some embodiments, the raw properties are first properties used in a first determination of the sequence computations of the computing threads, wherein the values for the properties depend on values for the raw properties.

In some embodiments, determining, for each of the properties, the greatest dependency distance from the property to the raw properties includes determining a number of dependencies between the property to each of the raw properties and determining the greatest dependency distance from the property to the raw properties by comparing each of the number of dependencies between the property to each of the raw properties, wherein the greatest dependency distances is one of the number of dependencies that is the greatest number of dependencies.

In some embodiments, a method of the present disclosure includes finding the shortest computational time of a relational data graph with randomly placed raw data by breaking the relationships into a graph of distance to raw data locations, scanning the graph for dependencies to locate the critical paths, and create a thread pool that executes on each critical path.

Hybrid Cluster Optimization

Another implementation of the present disclosure is a method for allocating computing jobs among multiple nodes of a building management system of a building. The method includes receiving, by a first building management system node, a computing job for determining values for the building management system and generating, by the first building management system node, an objective function for the building management system nodes, wherein the objective function indicates a cost for determining, by each of the plurality of building management system nodes, the values. The method includes optimizing, by the first building management system node, the objective function to select a second of the building management system nodes for determining the one or more values, wherein optimizing the objective function selects the second of the building management system nodes associated with an optimal cost and sending, by the first building management system node, the computing job to the second building management system node.

In some embodiments, the building management system nodes control building equipment associated with the building to control an environmental condition of the building based on the one or more values determined by the second building management system node.

In some embodiments, the method includes sending, by the second building management system node, the one or more values, to the first building management system node in response to generating, by the second building management system node, the one or more values.

In some embodiments, building management system nodes include on-premises nodes, where the on-premises nodes are computing devices located within the building, where the on-premises nodes are associated with a first cost indicated by the objective function and off-premises nodes, where the off-premises nodes are computing devices located outside the building that are part of a cloud computing system, where the off-premises nodes are associated with a second cost indicated by the objective function, wherein the second cost is greater than the first cost.

In some embodiments, optimizing the objective function includes optimizing the objective function with multiple constraints, where the constraints include an inequality constraint comparing a criticality level for the computing job and a success probability of each of the plurality of building management system nodes, wherein optimizing the objective function selects the second of the plurality of building management system nodes associated with an optimal success probability.

In some embodiments, optimizing the objective function includes optimizing the objective function with a multiple constraints, wherein the constraints include an equality constraint causing the optimization of the objective function to select only one node of the plurality of building management system nodes, the second node of the building management system.

In some embodiments, wherein optimizing the objective function includes optimizing the objective function with constraints, wherein the constraints include an inequality constraint indicative of computing time for each of the plurality of building management system nodes, wherein optimizing the objective function selects the second of the plurality of building management system nodes associated with an optimal computing time.

In some embodiments, the method further includes determining, by the first building management system node, the computing times for each of the nodes based on the computing job and an indication of an amount of available resources of each of the plurality of nodes.

In some embodiments, the method further includes querying, by the first building management system node, the building management system nodes for the indication of the amount of available resources of each of the plurality of nodes and receiving, by the first building management system node, the indication of the amount of available resources of each of the building management system nodes from the building management system nodes.

Another implementation of the present disclosure is a building management system for a building, the building management system including a first building management system node. The first building management system node includes a processing circuit configured to receive a computing job for determining one or more values for the building management system and generate an objective function for the building management system nodes, wherein the objective function indicates a cost for determining, by each of the plurality of building management system nodes, the one or more values. The processing circuit is configured to optimize the objective function to select a second of the plurality of building management system nodes for determining the one or more values, wherein optimizing the objective function selects the second of the plurality of building management system nodes associated with an optimal cost and send the computing job to the second building management system node.

In some embodiments, the processing circuit is configured to control an environmental condition of the building based on the one or more values determined by the second building management system node.

In some embodiments, the plurality of building management system nodes include on-premises nodes, wherein the one or more on-premises nodes are computing devices located within the building, wherein the one or more on-premises nodes are associated with a first cost indicated by the objective function and off-premises nodes, wherein the one or more off-premises nodes are computing devices located outside the building that are part of a cloud computing system, wherein the one or more off-premises nodes are associated with a second cost indicated by the objective function, wherein the second cost is greater than the first cost.

In some embodiments, the processing circuit is configured to optimize the objective function by optimizing the objective function with a plurality of constraints, wherein the plurality of constraints include an inequality constraint comparing a criticality level for the computing job and a success probability of each of the plurality of building management system nodes, wherein the processing circuit is configured to optimize the objective function to select the second of the building management system nodes associated with an optimal success probability.

In some embodiments, the processing circuit is configured to optimize the objective function by optimizing the objective function with constraints, wherein the constraints include a single node selection constraint causing the optimization of the objective function to select only one node of the plurality of building management system nodes, the second node of the building management system.

In some embodiments, the processing circuit is configured to optimize the objective function by optimizing the objective function with constraints, wherein the constraints include indications of computing time for each of the plurality of building management system nodes, wherein the processing circuit is configured to optimize the objective function to select the second of the plurality of building management system nodes associated with an optimal computing time.

In some embodiments, the processing circuit is configured to determine the computing times for each of the nodes based on the computing job and an indication of an amount of available resources of each of the plurality of nodes.

In some embodiments, wherein the processing circuit is configured to query the plurality of building management system nodes for the indication of the amount of available resources of each of the plurality of nodes and receiving, by the first building management system node, the indication of the amount of available resources of each of the plurality of building management system nodes from the plurality of building management system nodes.

Another implementation of the present disclosure is a non-transitory computer readable medium having machine instructions stored therein, the instructions being executable by a processor of a first building management system node of a plurality of building management system nodes of a building management system to perform operations including receiving a computing job for determining one or more values for the building management system and generating an objective function for the plurality of building management system nodes, wherein the objective function indicates a cost for determining, by each of the plurality of building management system nodes, the one or more values. The operations include optimizing the objective function to select a second of the building management system nodes for determining the values, wherein optimizing the objective function selects the second of the building management system nodes associated with an optimal cost, wherein optimizing the objective function includes optimizing the objective function with constraints, wherein the constraints include a criticality level for the computing job and a success probability of each of the plurality of building management system nodes, wherein optimizing the objective function selects the second of the plurality of building management system nodes associated with an optimal success probability. The operations further include sending the computing job to the second building management system node.

In some embodiments, wherein the operations further include controlling building equipment associated with the building to control an environmental condition of the building based on the one or more values determined by the second building management system node.

In some embodiments, the building management system nodes include on-premises nodes, wherein the on-premises nodes are computing devices located within the building, wherein the on-premises nodes are associated with a first cost indicated by the objective function and off-premises nodes, wherein the off-premises nodes are computing devices located outside the building that are part of a cloud computing system, wherein the one or more off-premises nodes are associated with a second cost indicated by the objective function, wherein the second cost is greater than the first cost.

In some embodiments, another implementation of the present disclosure is a method for optimizing the cost-risk profile for the parallel execution of a plurality of algorithms executing within and between computational computer clusters while maintaining the ability for those algorithms to interact, the method includes determining the available resources amongst the clusters, collecting cost information about each resource, generating a cost function, solving an optimization function to distribute the required algorithms across the various computation resources, wherein the cost function depends on the price of computation and the expected time spend computing, wherein the cost function depends on the probability of obtaining a successful run in the required amount of time, wherein the algorithms have a specific order in which they have to be solved and may pause each other to complete execution.

Hybrid Cluster Disaster Recovery

Another implementation of the present disclosure is a method for managing failures in nodes of a building management system of a building, the method includes selecting, by a first building management system node, a second building management system node from the plurality of building management system nodes to perform a computing job to determine one or more values for the building management system and sending, by the first building management system node, the computing job to the second building management system node for the second building management system node to determine the one or more values for the building management system. The method includes receiving, by the first building management system node, progress messages from the second building management system node, wherein the progress messages indicate the status of the second building management system node for determining the one or more values and selecting, by the first building management system node, a third building management system node from the plurality of building management system nodes to perform the computing job in response to the progress messages indicating that the second node has failed to determine the one or more values.

In some embodiments, the method includes controlling, by the building management system nodes, building equipment associated with the building to control an environmental condition of the building based on the one or more values determined by the third building management system node.

In some embodiments, the method further includes determining, by the first building management system node, whether the second building management system node has failed based on at least one of a length of time since sending, by the first building management system node, the computing job to the second building management system node and a length of time since receiving, by the first building management system node, a most recent progress message from the second building management system node.

In some embodiments, the method further includes determining, by the first building management system node, whether the second building management system node has failed by determining, based on the progress messages, whether the second building management system node will complete the computing job, wherein the progress message indicates that the second building management system has failed to complete the computing job.

In some embodiments, selecting, by the first building management system node, the second building management system node includes performing an optimization to determine an optimal building management system node of the plurality of building management system nodes to perform the computing job by generating, by the first building management system node, an objective function for the plurality of building management system nodes, wherein the objective function indicates a cost for determining, by each of the plurality of building management system nodes, the one or more values and optimizing, by the first building management system node, the objective function to select a second of the plurality of building management system nodes for determining the one or more values, wherein optimizing the objective function selects the second of the plurality of building management system nodes associated with an optimal cost.

In some embodiments, selecting, by the first building management system node, the third building management system node from the plurality of building management system nodes includes performing a second optimization to determine a second optimal building management system node of the plurality of building management system nodes to perform the computing job, wherein the second optimization does not consider the second building management system node.

In some embodiments, the third building management system node includes computing devices, wherein the method includes determining, by the computing devices of the third building management system node, the one or more values for the building management system.

In some embodiments, the method further includes determining, by the third building management system node, whether one or more of the plurality of computing devices of the third building management system have encountered a failure, sending, by the third node, one or more job components of the computing job to a fourth building management system node, receiving, by the third building management system node, the results for the one or more job components of the computing job performed by the fourth node, generating, the one or more values for the computing job based on the results for the one or more job components received from the fourth building management system node, and sending, by the third building management system node, the values of the computing job to the first building management system node.

Another implementation of the present disclosure is a building management system of a building for managing failures in nodes of the building management system including a first building management system node. The first building management system node includes a processing circuit configured to select a second building management system node from the plurality of building management system nodes to perform a computing job to determine one or more values for the building management system and send the computing job to the second building management system node for the second building management system node to determine the one or more values for the building management system. The processing circuit is configured to receive progress messages from the second building management system node, wherein the progress messages indicate the status of the second building management system node for determining the one or more values and select a third building management system node from the plurality of building management system nodes to perform the computing job in response to the progress messages indicating that the second node has failed to determine the one or more values.

In some embodiments, the processing circuit of the first building management system node is configured to control building equipment associated with the building to control an environmental condition of the building based on the values determined by the third building management system node.

In some embodiments, the processing circuit of the first building management system node is configured to determine whether the second building management system node has failed based on at least one of a length of time since sending the computing job to the second building management system node and a length of time since receiving a most recent progress message from the second building management system node.

In some embodiments, the processing circuit of the first building management system node is configured to determine whether the second building management system node has failed by determining, based on the progress messages, whether the second building management system node will complete the computing job, wherein the progress message indicates that the second building management system has failed to complete the computing job.

In some embodiments, the processing circuit of the first building management system node is configured to select the second building management system node by performing an optimization to determine an optimal node of the plurality of nodes to perform the computing job by generating an objective function for the plurality of building management system nodes, wherein the objective function indicates a cost for determining, by each of the plurality of building management system nodes, the one or more values and optimizing the objective function to select a second of the plurality of building management system nodes for determining the one or more values, wherein optimizing the objective function selects the second of the plurality of building management system nodes associated with an optimal cost.

In some embodiments, the processing circuit of the first building management system node is configured to select the third building management system node from the plurality of nodes by performing a second optimization to determine a second optimal node of the plurality of nodes to perform the computing job, wherein the second optimization does not consider the second building management system node.

In some embodiments, wherein the third building management system node includes a plurality of computing devices configured to determine the one or more values for the building management system.

In some embodiments, wherein third building management system node includes a processing circuit configured to determine whether one or more of the plurality of computing devices of the third building management system node have encountered a failure, send one or more job components of the computing job to a fourth building management system node, receive the results for the one or more job components of the computing job performed by the fourth node, generate the one or more values for the computing job based on the results for the one or more job components received from the fourth building management system node, and send the one or more values of the computing job to the first building management system node.

Another implementation of the present disclosure is a computer implemented method for managing failures in a plurality of nodes of a building management system of a building. The method includes selecting, by a processing circuit of a first building management system node, a second building management system node from the plurality of building management system nodes to perform a computing job to determine one or more values for the building management system and sending, by the processing circuit of the first building management system node, the computing job to the second building management system node for the second building management system node to determine the one or more values for the building management system. The method further includes receiving, by the processing circuit of the first building management system node, progress messages from the second building management system node, wherein the progress messages indicate the status of the second building management system node for determining the one or more values. The method further includes determining, by the processing circuit of the first building management system node, whether the second building management system node has failed based on at least one of a length of time since sending, by the first building management system node, the computing job to the second building management system node and a length of time since receiving, by the first building management system node, a most recent progress message from the second building management system node and selecting, by the processing circuit of the first building management system node, a third building management system node from the plurality of building management system nodes to perform the computing job in response to the determining that the second node has failed to determine the one or more values.

In some embodiments, the method further includes controlling, by one or more of the building management system nodes, building equipment associated with the building to control an environmental condition of the building based on the one or more values determined by the third building management system node.

In some embodiments, selecting, by the processing circuit of the first building management system node, the second building management system node includes performing an optimization to determine an optimal node of the plurality of nodes to perform the computing job by generating, by the processing circuit of the first building management system node, an objective function for the plurality of building management system nodes, wherein the objective function indicates a cost for determining, by each of the plurality of building management system nodes, the one or more values and optimizing, by the processing circuit of the first building management system node, the objective function to select a second of the plurality of building management system nodes for determining the one or more values, wherein optimizing the objective function selects the second of the plurality of building management system nodes associated with an optimal cost.

In some embodiments, the third building management system node includes multiple computing devices. In some embodiments, the method further includes determining, by the of computing devices of the third building management system node, one or more values for the building management system, determining, by a processing circuit of the third building management system node, whether one or more of the plurality of computing devices of the third building management system have encountered a failure, sending, by the processing circuit of the third node, one or more job components of the computing job to a fourth building management system node, receiving, by the processing circuit of the third building management system node, the results for the one or more job components of the computing job performed by the fourth node, generating, the processing circuit of the third building management system node, values for the computing job based on the results for the one or more job components received from the fourth building management system node, and sending, by the third building management system node, the one or more values of the computing job to the first building management system node.

In some embodiments, the present disclosure relates to a method for incorporating redundancy into a system for optimally allocating computer resources among many computation computer clusters that execute in parallel a plurality of algorithms that may interact. In some embodiments, the method includes performing an optimization routine for distribution of algorithm execution across many computation resources where upon noticing an algorithm failed unexpectedly, the optimization degrades the reliability of the node and redirects the algorithm to another source.

Dynamic Cloud Based Control Framework

Another implementation of the present disclosure is a method for dynamic cloud based control of building equipment of a building site via a cloud based building management system. The method includes instantiating, by the cloud based building management system, a sequencer in response to receiving a startup request, receiving, via the cloud based building management system, a sequence package, wherein the sequence package includes configuration information for interfacing the cloud based building management system with the building site, and collecting, via the sequencer instantiated by cloud based building management system, building data from the building equipment of the building site based on the sequence package. The method further includes causing, via the sequencer instantiated by the cloud based building management system, a control process to execute based on the collected data and dispatching, via the sequencer instantiated by the cloud based building management system, a command to the building equipment based on a result of the execution of the control process, wherein the command includes a command to control the building equipment to control an environmental condition of the building.

In some embodiments, the method further includes determining, by the cloud based building management system, whether the sequencer has encountered a failure and instantiating, by the cloud based building management system, a second sequencer to continue operations of the failed sequencer in response to determining that the sequencer has encountered the failure.

In some embodiments, the sequencer is executable on one or more of a plurality of different computing systems. In some embodiments, instantiating the sequencer includes determining whether to instantiate the sequencer on a computing system located off-premises from the building site and an on-premises computing system located within the building site and instantiating the sequencer on the computing system located off-premises from the building site and the on-premises computing system located within the building based on the result of the determination.

In some embodiments, the method further includes updating, via the sequencer, a data model stored by the cloud based building management system based on the collected data of the building equipment, wherein the data model includes information for the building site and the building equipment of the building site. In some embodiments, the method includes generating a user interface for a user based on the model, wherein the user interface indicates information pertaining to the building and the building equipment based on the model.

In some embodiments, the sequence package includes execution information indicating when the sequencer should collect the building data from the building equipment and when the sequencer should cause the control process to execute In some embodiments, the execution information includes an indication to recursively collect from or dispatch to a particular building data point at a particular period. In some embodiments, the indication is an indication to collect from or dispatch to the particular building data point in response to a particular value of the building site changing by a predefined amount. In some embodiments, the execution information further includes an indication to execute the control process at the particular period and an indication to execute the control process in response to the particular value of the building site changing by the predefined amount.

In some embodiments, the sequence package includes data linkage information, wherein the data linkage information includes a tuple pair indicating a link between a physical data point of the building site and a digital data point of the data model. In some embodiments, collecting, via the sequencer instantiated by cloud based building management system, the building data from the building equipment of the building site includes retrieving, based on the linkage information, a data value for the digital data point by retrieving a data value of the physical data point.

In some embodiments, collecting, via the sequencer instantiated by the cloud based building management system, the building data from the building equipment of the building site includes communicating with a collector-dispatcher system located within the building site.

In some embodiments, collecting, via the sequencer instantiated by cloud based building management system, the building data from the building equipment of the building site includes sending a request for input data for the physical data point to the collector-dispatcher system, receiving, via the collector-dispatcher, the input data for the physical data point, and storing the received input data for the physical data point in the data model as the digital data point.

Another implementation of the present disclosure is a cloud based building management system for dynamically controlling building equipment of a building site. The cloud based building management system includes a processing circuit configured to instantiate a sequencer in response to receiving a startup request, receive, via the sequencer, a sequence package, wherein the sequence package includes configuration information for interfacing the cloud based building management system with the building site, collect, via the sequencer, building data from the building equipment of the building site based on the sequence package, cause, via the sequencer, a control process to execute based on the collected data, and dispatch, via the sequencer, a command to the building equipment based on a result of the execution of the control process, wherein the command includes a command to control the building equipment to control an environmental condition of the building site.

In some embodiments, the processing circuit is configured to determine whether the sequencer has encountered a failure and instantiate a second sequencer to continue operations of the failed sequencer in response to determining that the sequencer has encountered the failure.

In some embodiments, the sequencer is executable on one or more of a plurality of different computing systems. In some embodiments, instantiating the sequencer includes determining whether to instantiate the sequencer on a computing system located off-premises from the building site and an on-premises computing system located within the building site and instantiating the sequencer on the computing system located off-premises from the building site and the on-premises computing system located within the building based on the result of the determination.

In some embodiments, the processing circuit is configured to update a data model stored by the cloud based building management system based on the collected data of the building equipment, wherein the data model includes information for the building site and the building equipment of the building site and generating a user interface for a user based on the model, wherein the user interface indicates information pertaining to the building and the building equipment based on the model.

In some embodiments, the sequence package includes execution information indicating when the sequencer should collect the building data from the building equipment and when the sequencer should cause the control process to execute.

In some embodiments, the execution information includes an indication to collect from or dispatch to a particular building data point at a particular period and an indication to collect from or dispatch to the particular building data point in response to a particular value of the building site changing by a predefined amount. In some embodiments, the execution information further includes an indication to execute the control process at the particular period and an indication to execute the control process in response to the particular value of the building site changing by the predefined amount.

In some embodiments, the sequence package includes data linkage information, wherein the data linkage information includes a tuple pair indicating a link between a physical data point of the building site and a digital data point of the data model. In some embodiments, the processing circuit is configured to collect, via the sequencer, the building data from the building equipment of the building site by retrieving, based on the linkage information, a data value for the digital data point by retrieving a data value of the physical data point.

In some embodiments, the processing circuit is configured to collect, via the sequencer, the building data from the building equipment of the building site by communicating with a collector-dispatcher system located within the building site.

In some embodiments, the processing circuit is configured to collect, via the sequencer instantiated by cloud based building management system, the building data from the building equipment of the building site by sending a request for input data for the physical data point to the collector-dispatcher system, receiving, via the collector-dispatcher, the input data for the physical data point, and storing the received input data for the physical data point in the data model as the digital data point.

Another implementation of the present disclosure is a non-transitory computer readable medium having machine instructions stored therein, the instructions being executable by a processor of a cloud based building management system, the operations include instantiating a sequencer in response to receiving a startup request, receiving, a sequence package, wherein the sequence package includes configuration information for interfacing the cloud based building management system with the building site, collecting, via the sequencer instantiated by cloud based building management system, building data from the building equipment of the building site based on the sequence package, causing, via the sequencer instantiated by the cloud based building management system, a control process to execute based on the collected data, dispatching, via the sequencer instantiated by the cloud based building management system, a command to the building equipment based on a result of the execution of the control process, wherein the command includes a command to control the building equipment, determining whether the sequencer has encountered a failure, and instantiating a second sequencer to continue operations of the failed sequencer in response to determining that the sequencer has encountered the failure.

In some embodiments, the sequence package includes execution information indicating when the sequencer should collect the building data from the building equipment and when the sequencer should cause the control process to execute.

In some embodiments, another implementation of the present disclosure is a method to upload and execute control strategies of a remote system to a cloud deployed solution allowing cloud based control of the underlying remote system including a sequence diagram, connection details, and mapping details between the remote system and the cloud solution, the method including allowing the sequence diagram to be updated during operation without impact to the remote system and allowing the underlying control algorithms to change during operation without impact to the remote system.

In some embodiments, the remote system is an HVAC facility including at least one of chillers, boilers, and batteries; wherein the cloud deployed solution is deployed on premise.

Algorithmic Interface Application Designer

Another implementation of the present disclosure is a method for generating and updating a live dashboard of a building management system for a building. The method includes generating, by the building management system, a dashboard designer interface and causing the dashboard designer interface to be displayed on a user device of a user, receiving, by the building management system via the dashboard designer interface, a graphic element from the user, wherein the graphic file supports animation and user interaction. The method further includes generating, by the building management system, a widget by binding the graphic element received from the user to a widget of the live dashboard, binding, by the building management system, a data point to the widget based on a user selection via the dashboard designer interface, wherein the data point being a data point of building equipment of the building, receiving, by the building management system, a value for the data point from the building equipment, and displaying, by the building management system, the widget in the live dashboard, the widget including an indication of the value for the data point.

In some embodiments, the method further includes receiving, via the widget, user entered data and controlling, by the building management system, the building equipment to control an environmental condition of the building based on the user entered data.

In some embodiments, the data point bound to the widget is not bound to any other widget of the live dashboard, wherein the live dashboard includes a plurality of pages, each page including a particular widget.

In some embodiments, the graphic element is a Scalable Vector Graphic (SVG) file, wherein the dashboard designer interface allows a user to upload the SVG to the building management system.

In some embodiments, the method further includes adjusting, by the building management system, an opacity value of the widget based on the value for the data point and a plurality of thresholds for the data point, wherein the opacity value is a function of the value for the data point and the plurality of thresholds. In some embodiments, the method further includes displaying, by the building management system, the widget in the live dashboard based on the adjusted opacity value.

In some embodiments, the method further includes changing a color of the widget based on the received value for the data point and a color map, wherein the color map includes a relationship between potential values for the data point and a corresponding color for the widget.

In some embodiments, the method further includes causing, by the building management system, the widget to be displayed on a page of the live dashboard in response to determining that the value of the data point is greater than a predefined amount and causing, by the building management system, the widget to not be displayed on the page of the live dashboard in response to determining that the value of the data point is less than the predefined amount.

In some embodiments, the application designer interface displays a selectable point list including a multiple data points, wherein the multiple data points include the data point. In some embodiments, the method further includes receiving the user selection by receiving a selection of the data point from the plurality of data points of the selectable point list.

In some embodiments, the method further includes causing, by the building management system, the user device to display the live dashboard, wherein the live dashboard includes a first pane and a second pane displayed simultaneously within the live dashboard. In some embodiments, the first pane includes a selectable page list including multipole pages, wherein each page is associated with one of a plurality of widgets, wherein a first page of the plurality of pages is associated with the widget. In some embodiments, the second pane includes a display of a selected widget of the plurality of widgets selected via the selectable page list.

In some embodiments, the application designer interface displays a selectable graphic element list including multiple graphic elements, wherein the graphic elements include the graphic element. In some embodiments, the method further includes receiving a user selection of the graphic element from the plurality of graphic elements of the selectable graphic element list and displaying, via the application designer interface, the graphic element in an editable mode to the user.

In some embodiments, the application designer interface includes a first interface pane, a second interface pane, and a third interface pane, wherein the application designer interface simultaneously displays the first interface pane, the second interface pane, and the third interface pane in the application designer interface. In some embodiments, the first interface pane includes a selectable point list including multiple data points, wherein the data points include the data point. In some embodiments, the second interface pane includes the selectable graphic element list. In some embodiments, the third interface pane includes a display of the graphic element in an editable mode.

Another implementation of the present disclosure is a building management system of a building for generating and updating a live dashboard. The building management system includes a processing circuit configured to generate a dashboard designer interface and cause the dashboard designer interface to be displayed on a user device of a user, receive, via the dashboard designer interface, a graphic element from the user, wherein the graphic file supports animation and user interaction, generate a widget by binding the graphic element received from the user to a widget of the live dashboard, bind a data point to the widget based on a user selection via the dashboard designer interface, wherein the data point being a data point of building equipment of the building, receiving, by the building management system, a value for the data point from the building equipment, and displaying, by the building management system, the widget in the live dashboard, the widget including an indication of the value for the data point.

In some embodiments, the processing circuit is configured to receive, via the widget, user entered data and controlling, by the building management system, the building equipment to control an environmental condition of the building based on the user entered data.

In some embodiments, the data point bound to the widget is not bound to any other widget of the live dashboard, wherein the live dashboard includes multiple pages, each page including a particular widget.

In some embodiments, the application designer interface displays a selectable point list including multiple data points, wherein the data points include the data point. In some embodiments, the processing circuit is configured to receive the user selection by receiving a selection of the data point from the multiple data points of the selectable point list.

In some embodiments, the method further includes causing, by the building management system, the user device to display the live dashboard, wherein the live dashboard includes a first pane and a second pane displayed simultaneously within the live dashboard. In some embodiments, the first pane includes a selectable page list including multiple pages, wherein each page is associated with one of multiple widgets, wherein a first page of the pages is associated with the widget. In some embodiments, the second pane includes a display of a selected widget of the plurality of widgets selected via the selectable page list.

In some embodiments, the application designer interface displays a selectable graphic element list including multiple graphic elements, wherein the graphic elements include the graphic element. In some embodiments, the processing circuit is configured to receive a user selection of the graphic element from the plurality of graphic elements of the selectable graphic element list and display, via the application designer interface, the graphic element in an editable mode to the user.

In some embodiments, the application designer interface includes a first interface pane, a second interface pane, and a third interface pane. In some embodiments, the application designer interface simultaneously displays the first interface pane, the second interface pane and the third interface pane in the application designer interface. In some embodiments, the first interface pane includes a selectable point list including multiple data points, wherein the data points include the data point. In some embodiments, the second interface pane includes the selectable graphic element list. In some embodiments, the third interface pane includes a display of the graphic element in an editable mode.

Another implementation of the present disclosure is a non-transitory computer readable medium having machine instructions stored therein, the instructions being executable by a processor of a building management system of a building to perform operations. The operations include generating a dashboard designer interface and cause the dashboard designer interface to be displayed on a user device of a user, wherein the application designer interface displays a selectable point list including a plurality of data points, wherein the plurality of data points include the data point. The operations further include receiving, via the dashboard designer interface, a graphic element from the user, wherein the graphic file supports animation and user interaction and generating a widget by binding the graphic element received from the user to a widget of a live dashboard. The operations further include receiving a user point selection by receiving a selection of a data point from the plurality of data points of the selectable point list, binding the data point to the widget based on the user selection via the dashboard designer interface, wherein the data point is a data point of building equipment of the building, receiving, by the building management system, a value for the data point from the building equipment, and displaying, by the building management system, the widget in the live dashboard, the widget including an indication of the value for the data point.

In some embodiments, the operations further include receiving, via the widget, user entered data and controlling, by the building management system, the building equipment to control an environmental condition of the building based on the user entered data.

In some embodiments, another implementation of the present disclosure is a method to allow client-defined rendering and animation of scalable vector graphics (SVGs) within HTML5 to provide customizable dashboards including any SVG drawn by the client uploaded to the client application, an in-browser SVG editor that allows the client to select root level SVG elements to convert them into widgets that the client application can then render, a widget that relies on client defined points that relate to the underlying system and allows any type of animation or rendering available to HTML5 browsers or its third-party libraries, and a point that the client defines with an ID for use in their widgets that has a link to an underlying point in the system, or provides a mathematical expression that binds multiple points together, e.g., A+B+C.

In some embodiments, the widget may be a single text field whose size, and decimal precision is used to show the current value of a point within the underlying system; wherein the widget may be an opacity changer based on threshold values of a point within the underlying system; wherein the widget may be a motion tween activator based on threshold values of a point within the underlying system; wherein the widget may be a visibility controller based on a threshold value of a point within the underlying system; wherein the widget may be a table that allows overriding input data present within the underlying system; wherein the widget may be a navigation tool that allows the client to switch between uploaded SVGs.

Energy Optimization Builder and Generic Data Model Designer

Another implementation of the present disclosure is a building management system for generating a building model for a building and operating building equipment of the building based on the building model. The building management system includes a processing circuit configured to receive a context, wherein the context includes metadata defining the building model for the building, generate a building model editor interface for viewing and editing the received context, wherein the building model interface includes building elements for the building model, wherein the building elements are based on the received context and represent the building equipment, receive user edits of the context via the building model interface, wherein the user edits include edits to the building elements. The processing circuit is configured to generate an updated context based on the user edits of the context and deploy the updated context to control environmental conditions of the building with the building equipment based on the updated context.

In some embodiments, the processing circuit is configured to display the building model interface on a display of a user device, wherein the building model interface includes a canvas for displaying the building elements of the context and a palate for displaying potential building elements for the context. In some embodiments, the processing circuit is configured to receive a command to place one of the potential building elements of the palate on the canvas from the user device, wherein the potential building elements and the building elements each indicate at least one of a utility that generates a resource, the resource, and a sub-plant that consumes the resource and generates another resource. In some embodiments, the processing circuit is configured to receive connections between the building elements from the user device and generate the updated context based on the placements of the building elements and the connections between the building elements.

In some embodiments, the potential building elements are based on the context, wherein the potential elements are generated based on possible building elements indicated by the context. In some embodiments, the connections between the building elements are controlled by the context, wherein the building management system allows some connections but not other connections based on connections allowed by the context.

In some embodiments, the processing circuit is configured to receive an interaction with one building element of the building elements canvas from the user device, display an attribute interface on the building model editor interface, wherein the attribute interface including attribute options for the one building element, receive an adjustment to the attribute option from the user device, and generate the updated context based on the adjustment to the attribute option.

In some embodiments, the attribute options include an out of service date range, wherein the date range indicates the period of time that the building element will not be operating.

In some embodiments, the attribute options for the one building element are based on allowed attribute options for the associated element defined by the context. In some embodiments, the processing circuit is configured to determine the allowed attribute options for the one building element based on the context and cause the attribute options to be the allowed attribute options.

In some embodiments, the processing circuit is configured to display connection wires between the building elements based on the received connections, wherein the connection wires indicate the flow of a particular resource between the building elements, wherein the wires include a color associated with a type of the particular resource.

In some embodiments, the processing circuit is configured to generate an optimization problem based on the user edits of the context, perform the optimization problem to generate control settings for the building equipment, and operate the building equipment based on the generated control settings.

In some embodiments, the processing circuit is configured to generate the optimization problem based on the user edits of the context by generating optimization constraints based on the user edits of the context. In some embodiments, the processing circuit is configured to perform the optimization problem to generate the control settings for the building equipment by performing the optimization problem with the optimization constraints.

In some embodiments, the processing circuit is configured to generate the optimization constraints based on the user edits of the context by generating the optimization constraints based on the command to place the building elements of the palate on the canvas, the connections between the building elements, and the adjustment to the attribute options.

Another implementation of the present disclosure is a method for generating a building model for a building by a building management system for operating building equipment of the building. The method includes receiving, via the building management system, a context, wherein the context includes metadata defining the building model for the building. The method further includes generating, via the building management system, a building model editor interface for viewing and editing the received context, wherein the building model interface includes building elements for the building model, wherein the building elements are based on the received context and represent the building equipment. The method further includes receiving, by the building management system, user edits of the context via the building model interface, wherein the user edits include edits to the building elements, generating, by the building management system, an updated context based on the user edits of the context, and deploying, by the building management system, the updated context to control environmental conditions of the building with the building equipment based on the updated context.

In some embodiments, the method further includes displaying, by the building management system, the building model interface on a display of a user device, wherein the building model interface includes a canvas for displaying the building elements of the context and a palate for displaying potential building elements for the context and receiving, by the building management system, a command to place one of the potential building elements of the palate on the canvas from the user device, wherein the potential building elements and the building elements each indicate at least one of a utility that generates a resource, the resource, and a sub-plant that consumes the resource and generates another resource. In some embodiments, the method further includes receiving, by the building management system, connections between the building elements from the user device and generating, by the building management system, the updated context based on the placements of the building elements and the connections between the building elements.

In some embodiments, the potential building elements are based on the context, wherein the potential elements are generated based on possible building elements indicated by the context. In some embodiments, the connections between the building elements are controlled by the context, wherein the building management system allows some connections but not other connections based on connections allowed by the context.

In some embodiments, the method further includes receiving, by the building management system, an interaction with one building element of the building elements canvas from the user device, displaying, by the building management system, an attribute interface on the building model editor interface, wherein the attribute interface including attribute options for the one building element, receiving, by the building management system, an adjustment to the attribute option from the user device, and generating, by the building management system, the updated context based on the adjustment to the attribute option.

In some embodiments, the attribute options for the one building element are based on allowed attribute options for the associated element defined by the context. In some embodiments, the method further includes determining, by the building management system, the allowed attribute options for the one building element based on the context and causing, by the building management system, the attribute options to be the allowed attribute options.

In some embodiments, the method further includes generating, by the building management system, an optimization problem based on the user edits of the context, performing, by the building management system, the optimization problem to generate control settings for the building equipment, and operating, by the building management system, the building equipment based on the generated control settings.

In some embodiments, generating, by the building management system, the optimization problem based on the user edits of the context includes generating optimization constraints based on the user edits of the context. In some embodiments, performing, by the building management system, the optimization problem to generate the control settings for the building equipment includes performing the optimization problem with the optimization constraints.

In some embodiments, generating, by the building management system, the optimization constraints based on the user edits of the context include generating the optimization constraints based on the command to place the building elements of the palate on the canvas, the connections between the building elements, and the adjustment to the attribute options.

Another implementation of the present disclosure is a non-transitory computer readable medium having machine instructions stored therein, the instructions being executable by a processor of a building management system of a building to perform operations. The operations include receiving a context, wherein the context includes metadata defining the building model for the building. In some embodiments, the operations further include generating a building model editor interface for viewing and editing the received context, wherein the building model interface includes building elements for the building model, wherein the building elements are based on the received context and represent building equipment of the building. In some embodiments, the operations further include receiving user edits of the context via the building model interface, wherein the user edits include edits to the building elements, generating an updated context based on the user edits of the context, deploying the updated context to control environmental conditions of the building with the building equipment based on the updated context, and generating an optimization problem based on the user edits of the context. In some embodiments, the method further includes performing the optimization problem to generate control settings for the building equipment and operating the building equipment based on the generated control settings.

In some embodiments, the operations further include displaying the building model interface on a display of a user device, wherein the building model interface includes a canvas for displaying the building elements of the context and a palate for displaying potential building elements for the context, receiving a command to place one of the potential building elements of the palate on the canvas from the user device, wherein the potential building elements and the building elements each indicate at least one of a utility that generates a resource, the resource, and a sub-plant that consumes the resource and generates another resource, receiving connections between the building elements from the user device, and generating the updated context based on the placements of the building elements and the connections between the building elements. In some embodiments, generating the optimization constraints based on the user edits of the context includes generating the optimization constraints based on the command to place the building elements of the palate on the canvas, the connections between the building elements, and the adjustment to the attribute options.

In some embodiments, another implementation of the present disclosure is a method for graphically describing and simulating an optimization problem, the method includes arranging plants that represent the ability to convert one or more resources to a different set of one or more resources, arranging loads that represent a need for the resource that must be met, connecting the plants to resources to describe how the loads can be met by the plants, connecting suppliers or utilities to the resources to indicate the ability to purchase the resource, converting the arrangement of plants loads suppliers and connections to optimization description that is capable of being solved.

In some embodiments, the method further includes modifying properties of any plant, supplier, or resource.

In some embodiments, another implementation of the present disclosure is a method for graphically describing and simulating any algorithm and data model, the method includes receiving patterns that are presented on a palette that may be dragged onto a canvas, placing patterns inside other patterns to describe a hierarchical relationship, connecting patterns to other patterns to describe other associations, providing the ability to generically edit the properties of those entities through the user of masks defined by the entity.

Live Memory Technique

Another implementation of the present disclosure is a method for reducing the memory usage of a memory device of a building management system of a building. The method includes receiving, by the building management system, a request for a property of a data model stored in the memory device, wherein the data model includes a plurality of relationships, wherein each relationship links one of a plurality of properties to serialized building data stored within the memory device. The method further includes receiving, by the building management system, a request for a property of the data model and generating, by the building management system, de-serialized data for the requested property in response to receiving the request by retrieving the serialized data from the memory device based on the plurality of relationships of the data model and de-serializing the retrieved serialized data.

In some embodiments, the method further includes controlling, by the building management system, building equipment of the building based on the de-serialized data by controlling an environmental condition of the building with the building equipment based on the de-serialized data.

In some embodiments, the relationships of the data model includes multiple handles, wherein each of the handles link one of the plurality of properties of the data model to a storage object including the serialized data.

In some embodiments, the method further includes determining a key based on the plurality of handles by identifying one of the handles that corresponds to the property of the request. In some embodiments, retrieving the serialized data from the memory device based on the plurality of relationships of the data model includes retrieving the serialized data from the memory device by retrieving the serialized data referenced by the key.

In some embodiments, the method further includes receiving data for the property of the data model, generating the serialized data for the property of the data model by serializing the received data, and storing the serialized data in the memory device, wherein the relationships link the property of the data model to the serialized data.

In some embodiments, the method further includes compressing the serialized data for the property and causing the memory device to store the compressed and serialized data.

In some embodiments, the method further includes generating the de-serialized data for the requested property by retrieving the serialized and compressed data from the memory device based on the plurality of relationships of the data model and generating the serialized data by decompressing the serialized and compressed data and de-serializing the generated serialized data.

In some embodiments, generating the de-serialized data includes generating a transport object including the de-serialized data based on a storage object that stores the serialized data, wherein the storage object stores the serialized data as byte array, wherein generating the de-serialized data includes generating the transport object from the byte array.

In some embodiments, the method further includes updating one or more values of the de-serialized data of the transport object, generating an updated storage object based on the de-serialized data by serializing the transport object, and causing the memory device to store the updated storage object.

Another implementation of the present disclosure is a building management system of a building for reducing the memory usage of a memory device. The building management system includes a processing circuit configured to receive a request for a property of a data model stored in the memory device, wherein the data model includes a plurality of relationships, wherein each relationship links one of a multiple properties to serialized building data stored within the memory device. The processing circuit can be configured to receive a request for a property of the data model and generate de-serialized data for the requested property in response to receiving the request by retrieving the serialized data from the memory device based on the plurality of relationships of the data model and de-serializing the retrieved serialized data.

In some embodiments, the processing circuit is configured to control building equipment of the building based on the de-serialized data by controlling an environmental condition of the building with the building equipment based on the de-serialized data.

In some embodiments, the relationships of the data model includes multiple handles, wherein each of the handles link one of the plurality of properties of the data model to a storage object including the serialized data.

In some embodiments, the processing circuit is configured to determine a key based on the handles by identifying one of the handles that corresponds to the property of the request. In some embodiments, the processing circuit is configured to retrieve the serialized data from the memory device based on the relationships of the data model by retrieving the serialized data from the memory device by retrieving the serialized data referenced by the key.

In some embodiments, the processing circuit is configured to receive data for the property of the data model, generating the serialized data for the property of the data model by serializing the received data, and store the serialized data in the memory device, wherein the relationships link the property of the data model to the serialized data.

In some embodiments, the processing circuit is configured to compress the serialized data for the property and cause the memory device to store the compressed and serialized data.

In some embodiments, the processing circuit is configured to generate the de-serialized data for the requested property by retrieving the serialized and compressed data from the memory device based on the plurality of relationships of the data model and generating the serialized data by decompressing the serialized and compressed data and de-serializing the generated serialized data.

In some embodiments, the processing circuit is configured to generate the de-serialized data by generating a transport object including the de-serialized data based on a storage object that stores the serialized data, wherein the storage object stores the serialized data as byte array, wherein generating the de-serialized data includes generating the transport object from the byte array.

Another implementation of the present disclosure is a non-transitory computer readable medium having machine instructions stored therein, the instructions being executable by a processor of a building management system of a building to perform operations including receiving data for a property of a data model, generating serialized data for the property of the data model by serializing the received data, storing the serialized data in a memory device, wherein the plurality of relationships link the property of the data model to the serialized data, receiving a request for a property of a data model stored in the memory device, wherein the data model includes relationships, wherein each relationship links one of a plurality of properties to serialized building data stored within the memory device, receiving a request for a property of the data model, and generating de-serialized data for the requested property in response to receiving the request by retrieving the serialized data from the memory device based on the plurality of relationships of the data model and de-serializing the retrieved serialized data.

In some embodiments, the operations further include compressing the serialized data for the property and causing the memory device to store the compressed and serialized data.

In some embodiments, the operations further include generating the de-serialized data for the requested property by retrieving the serialized and compressed data from the memory device based on the plurality of relationships of the data model and generating the serialized data by decompressing the serialized and compressed data and de-serializing the generated serialized data.

In some embodiment, another implementation of the present disclosure is a method for providing high throughput and low memory footprint for a traditional relational data model by storing large relational models into RAM and compressing and serializing property data into chunks tied into the relational model and accessed on demand. In some embodiments, the method includes storing hierarchy of handles into RAM and upon request accessing those handles to obtain a key to the serialized data that is de-serialized and used by an algorithm.

In some embodiments, the method further includes reducing in memory foot print by storing the relationships between properties instead of the values of those properties.

Context Driven Development

Another implementation of the present disclosure is a method for dynamically updating a building management system (BMS) control platform for a building. The method includes receiving, by the BMS control platform, a context, wherein the context includes metadata defining a data model for the building and equipment of the building, wherein the metadata describes the data model with a common modeling language (CML). The method further includes implementing, by the BMS control platform, the data model of the context via the CML, wherein the BMS control platform implements the data model during the runtime of the BMS control platform and does not require redeployment of the BMS control platform. The method further includes controlling, by the BMS control platform, the equipment of the building based on the implemented data model to control an environmental condition of the building.

In some embodiments, the method further includes receiving, by the BMS control platform, a kernel and a sequence, wherein the kernel includes metadata defining a control process for controlling the equipment of the building and the sequence includes metadata defining operational requirements for performing the control process defined by the metadata of the kernel. In some embodiments, the method further includes controlling, by the BMS control platform, the building equipment based on the implemented data model, the kernel, and the sequence, wherein the BMS control platform controls the building equipment based on the implemented data model, the kernel, and the sequence without requiring redeployment of the BMS control platform.

In some embodiments, the metadata of the kernel indicates a control process, input data of the implemented data model for the control process, and output data of the implemented data model for the control process.

In some embodiments, the metadata of the sequence includes execution information indicating when the BMS control platform should collect data from the building equipment for the control process and when the BMS control platform should cause the control process to execute.

In some embodiments, implementing, by the BMS control platform, the data model is based on the metadata of the context and the CML, wherein the metadata of the context is implemented with a class structure of the CML.

In some embodiments, the class structure of the CML includes a prototype class, an entity class, and an attribute class. In some embodiments, the prototype class tracks a hierarchy of entities defined based on the entity class via references tags. In some embodiments, the entity class represents elements of the building, wherein the elements include weather, zones, the building, and the equipment of the building. In some embodiments, the attribute class includes data storage for the entities defined based on the entity class.

In some embodiments, the entity class is implemented as a child entity and a component entity, wherein the component entity represents one of the elements of the building, wherein the child entity is a separate instantiation of the component entity and is bound to a particular component entity as a dependent of the particular component entity.

In some embodiments, implementing the data model based on the context and the CML includes generating a building entity based on the entity class, generating a zone entity based on the entity class, and generating multiple zone entities based on the child class of the CML and the generated zone entity, wherein the zone entities are bound to the building entity.

Another implementation of the present disclosure is a dynamically updatable building management system (BMS) control platform for a building. The BMS control platform includes a processing circuit configured to receive a context, wherein the context includes metadata defining a data model for the building and equipment of the building, wherein the metadata describes the data model with a common modeling language (CML). The processing circuit is configured to implement the data model of the context via the CML, wherein the processing circuit implements the data model during the runtime of the BMS control platform and does not require redeployment of the BMS control platform. The processing circuit is configured to control the equipment of the building based on the implemented data model to control an environmental condition of the building.

In some embodiments, the processing circuit is configured to receive a kernel and a sequence, wherein the kernel includes metadata defining a control process for controlling the equipment of the building and the sequence includes metadata defining operational requirements for performing the control process defined by the metadata of the kernel. In some embodiments, the processing circuit is configured to control the building equipment based on the implemented data model, the kernel, and the sequence, wherein the processing circuit is configured to control the building equipment based on the implemented data model, the kernel, and the sequence without requiring redeployment of the BMS control platform.

In some embodiments, the metadata of the kernel indicates a control process, input data of the implemented data model for the control process, and output data of the implemented data model for the control process.

In some embodiments, the metadata of the sequence includes execution information indicating when the processing circuit should collect data from the building equipment for the control process and when the processing circuit should cause the control process to execute.

In some embodiments, implementing, by the BMS control platform, the data model is based the metadata of the context and the CML, wherein the metadata of the context is implemented with a class structure of the CML.

In some embodiments, the class structure of the CML includes a prototype class, an entity class, and an attribute class. In some embodiments, the prototype class tracks a hierarchy of entities defined based on the entity class via references tags, the entity class represents elements of the building, wherein the elements includes weather, zones, the building, and the equipment of the building, and the attribute class includes data storage for the entities defined based on the entity class.

In some embodiments, the entity class is implemented as a child entity and a component entity, wherein the component entity represents one of the elements of the building, wherein the child entity is a separate instantiation of the component entity and is bound to a particular component entity as a dependent of the particular component entity.

In some embodiments, implementing the data model based on the context and the CML includes generating a building entity based on the entity class, generating a zone entity based on the entity class and generating multiple zone entities based on the child class of the CML and the generated zone entity, wherein the zone entities are bound to the building entity.

Another implementation of the present disclosure is a non-transitory computer readable medium having machine instructions stored therein. The instructions are executable by a processor of a dynamically updatable building management system (BMS) control platform for a building to perform operations. The operations receiving a context, a kernel and a sequence, wherein the context includes metadata defining a data model for the building and equipment of the building, wherein the metadata describes the data model with a common modeling language (CML), wherein the kernel includes metadata defining a control process for controlling the equipment of the building and the sequence includes metadata defining operational requirements for performing the control process defined by the metadata of the kernel. The operations further include implementing the data model of the context via the CML, wherein the BMS control platform implements the data model during the runtime of the BMS control platform and does not require redeployment of the BMS control platform and controlling the equipment of the building based on the implemented data model, the kernel, and the sequence, wherein the BMS control platform controls the building equipment based on the implemented data model, the kernel, and the sequence without requiring redeployment of the BMS control platform to control an environmental condition of the building.

In some embodiments, the metadata of the kernel indicates a control process, input data of the implemented data model for the control process, and output data of the implemented data model for the control process.

In some embodiments, the metadata of the sequence includes execution information indicating when the BMS control platform should collect data from the building equipment for the control process and when the BMS control platform should cause the control process to execute.

In some embodiments, implementing, by the BMS control platform, the data model is based the metadata of the context and the CML, wherein the metadata of the context is implemented with a class structure of the CML, wherein the class structure of the CML includes a prototype class, an entity class, and an attribute class. In some embodiments, the prototype class tracks a hierarchy of entities defined based on the entity class via references tags. In some embodiments, the entity class represents elements of the building, wherein the elements includes weather, zones, the building, and the equipment of the building. In some embodiments, the attribute class includes data storage for the entities defined based on the entity class.

In some embodiments, another implementation of the present disclosure is a method for deploying new features and functionality to an existing building automation system providing closed loop control. In some embodiments, the system includes a REST API with registration endpoints for the runtime binding of an external package containing DLLs that describe the data model, algorithm, and control strategy of the new feature or functionality where the deployment can be done without interrupting the existing closed loop control.

In some embodiments, another implementation of the present disclosure is a system that allow users to extend the provided relational data model of a building automation system. In some embodiments, the system can be configured to obtain from the user a script, verify that the script for unit cohesion and language features, and execute the script as part of the original data model.

Verifiable Relationship Building Language

A method for verifying and running a script for a building management system of a building includes receiving, by the building management system, the script, wherein the script indicates one or more operations to be performed with one or more data points of a data model of the building. The method further includes determining, by the building management system, whether there is unit cohesion within the received script, wherein the unit cohesion indicates that a result value of executing the script with the one or more data points include units that match desired units and determining, by the building management system, the result value by executing the script with the one or more data points in response to determining that there is unit cohesion.

In some embodiments, the method further includes causing, by the building management system, building equipment of the building to control an environmental condition of the building based on the determined result value.

In some embodiments, the method includes determining, by the building management system, whether there is unit cohesion includes determining whether a result unit of the result value is not a unit, wherein not a unit is the result of adding or subtracting one or more particular values of different units in the script.

In some embodiments, wherein the script indicates operations to be performed with a particular data point associated with a particular time of a time-series data vector of the data model of the building. In some embodiments, the method further includes determining, by the building management system, whether signal repair is required for the time-series data vector by determining whether the time-series data vector includes the particular data point associated with the particular time, determining, by the building management system, the particular data point associated with the particular time by performing interpolation of the time-series data vector in response to determining that the time-series data vector does not include the particular data point associated with the particular time, and determining, by the building management system, the result values based on the interpolated particular data point.

In some embodiments, the method includes receiving, by the building management system, the script include receiving the script from a user interface of a user device, wherein the method further includes underlining, by the building management system, one or more lines of the script on the user interface of the user device in response to determining that there is an error in unit cohesion in the script, wherein the underlined one or more lines are associated with the error in unit cohesion, wherein the one or more lines of the script associated with the error in unit cohesion include one or more operations that cause the error in unit cohesion.

In some embodiments, the script is an extension of the data model of the building, wherein the result value is a virtual point for the data model and indicates commissioning information for the building management system. In some embodiments, the method further includes determining, by the building management system, the result values by executing the script at runtime along with the data model of the building management system for performing commissioning of the building management system.

In some embodiments, the method includes receiving, by the building management system, a user input value associated with a first unit and determining, by the building management system, a one-to-one unit for the user input value, wherein the one-to-one unit includes an updated value for the user input value determined based on a conversion factor and an exponent array in base units determined from the first unit.

In some embodiments, the method further includes receiving, by the building management system, values for the one or more data points of the data model and determining, by the building management system, a one-to-one unit for each of the received values, wherein the one-to-one unit includes an exponent array indicating an exponent for a plurality of base units, wherein the building management system maps each of the values into the one-to-one units.

In some embodiments, determining, by the building management system, whether there is unit cohesion includes determining, by the building management system, a one-to-one unit for the result value based on the one-to-one units of the received values and determining that the one-to-one unit for the result value matches a predefined one-to-one unit for the result value.

In some embodiments, the method includes retrieving, by the building management system, the one or more data points from a data model for a building, wherein the data model indicates data collected for a building and determining, by the building management system, the result values based on the retrieved one or more data points retrieved from the data model.

In some embodiments, the method includes retrieving the one or more data points from the data model for the building includes retrieving the one or more data points from the data model based on one or more lines of the script, the each line including an identifier indicating the location of the one or more points within the data model. In some embodiments, the method further includes causing, by the building management system, the one or more results of executing the script to be stored in the data model.

Another implementation of the present disclosure is a building management system of a building for verifying and running a script. The building management system includes a processing circuit configured to receive the script, wherein the script indicates one or more operations to be performed with one or more data points of a data model of the building, determine whether there is unit cohesion within the received script, wherein the unit cohesion indicates that a result value of executing the script with the one or more data points include units that match desired units, and determine the result value by executing the script with the one or more data points in response to determining that there is unit cohesion.

In some embodiments, the processing circuit is configured to cause building equipment of the building to control an environmental condition of the building based on the determined result value.

In some embodiments, the processing circuit is configured to determine whether there is unit cohesion by determining whether a result unit of the result value is not a unit, wherein not a unit is the result of adding or subtracting one or more particular values of different units in the script.

In some embodiments, the script indicates operations to be performed with a particular data point associated with a particular time of a time-series data vector of the data model of the building. In some embodiments, the processing circuit is configured to determine whether signal repair is required for the time-series data vector by determining whether the time-series data vector includes the particular data point associated with the particular time, determine the particular data point associated with the particular time by performing interpolation of the time-series data vector in response to determining that the time-series data vector does not include the particular data point associated with the particular time, and determine the result values based on the interpolated particular data point.

In some embodiments, the processing circuit is configured to receive the script by receiving the script from a user interface of a user device. In some embodiments, the processing circuit is configured to underline one or more lines of the script on the user interface of the user device in response to determining that there is an error in unit cohesion in the script, wherein the underlined one or more lines are associated with the error in unit cohesion, wherein the one or more lines of the script associated with the error in unit cohesion include one or more operations that cause the error in unit cohesion.

In some embodiments, the processing circuit is configured to receive a user input value associated with a first unit and determine a one-to-one unit for the user input value, wherein the one-to-one unit includes an updated value for the user input value determined based on a conversion factor an exponent array in base units determined from the first unit.

In some embodiments, the method further includes receiving, by the building management system, values for the one or more data points of the data model and determining, by the building management system, a one-to-one unit for each of the received values, wherein the one-to-one unit includes an exponent array indicating an exponent for a plurality of base units, wherein the building management system maps each of the values into the one-to-one units. In some embodiments, determining, by the building management system, whether there is unit cohesion includes determining, by the building management system, a one-to-one unit for the result value based on the one-to-one units of the received values and determining that the one-to-one unit for the result value matches a predefined one-to-one unit for the result value.

Another implementation of the present disclosure is a non-transitory computer readable medium having machine instructions stored therein, the instructions being executable by a processor of a dynamically updatable building management system for a building to perform operations, the operations including receiving a script, wherein the script indicates one or more operations to be performed with one or more data points of a data model of the building. The operations further include determining whether there is unit cohesion within the received script, wherein the unit cohesion indicates that a result value of executing the script with the one or more data points include units that match desired units, wherein determining, by the building management system, whether there is unit cohesion includes determining whether a result unit of the result value is not a unit, wherein not a unit is the result of adding or subtracting one or more particular values of different units in the script. The operations further include determining the result value by executing the script with the one or more data points in response to determining that there is unit cohesion.

In some embodiments, the operations further include causing building equipment of the building to control an environmental condition of the building based on the determined result value.

In some embodiments, another implementation of the present disclosure is a method to allow the user to building virtual points during the commissioning of a building automation system including obtaining from the user a script, verifying that the script for unit cohesion and language features, and executing the script as part of the original data model, wherein the containing system of the script may provide possible actions that can be incorporated in the script and executed at runtime of the script.

Another implementation of the present disclosure is a method for creating an infinite time resolution signal from many randomly sampled time varying signals including a set of kernels for each input signal that perform interpolation given the provided taps, index seeking method that fills these taps relying only on the memory present in the original signals.

In some embodiments, the method includes finding the fewest number of executions of a function that maintain all information present in the input signals.

One Class Many Purposes

A method for running multiple algorithms within a building automation system that share the same data model, including a hierarchy of interfaces upon which algorithms can target where new interfaces may be added at runtime without interrupting active control and where upon running an algorithm requests only the necessary interfaces for it to run allowing the system to only send the necessary data allowing the system to store a single entity while transporting variants of the entity. In some embodiments, the data model dynamically updates upon changes to the interfaces.

BRIEF DESCRIPTION OF THE DRAWINGS

FIG. 13 is an interface illustrating the results of a simulation performed by a simulator of the RDS of FIGS. 7A and 7B, according to an exemplary embodiment.

FIG. 18 is an interface of the RDS of FIGS. 7A and 7B for illustrating kernel jobs of the A3S platform of FIGS. 7A and 7B, according to an exemplary embodiment.

DETAILED DESCRIPTION

Overview

Figure 1:
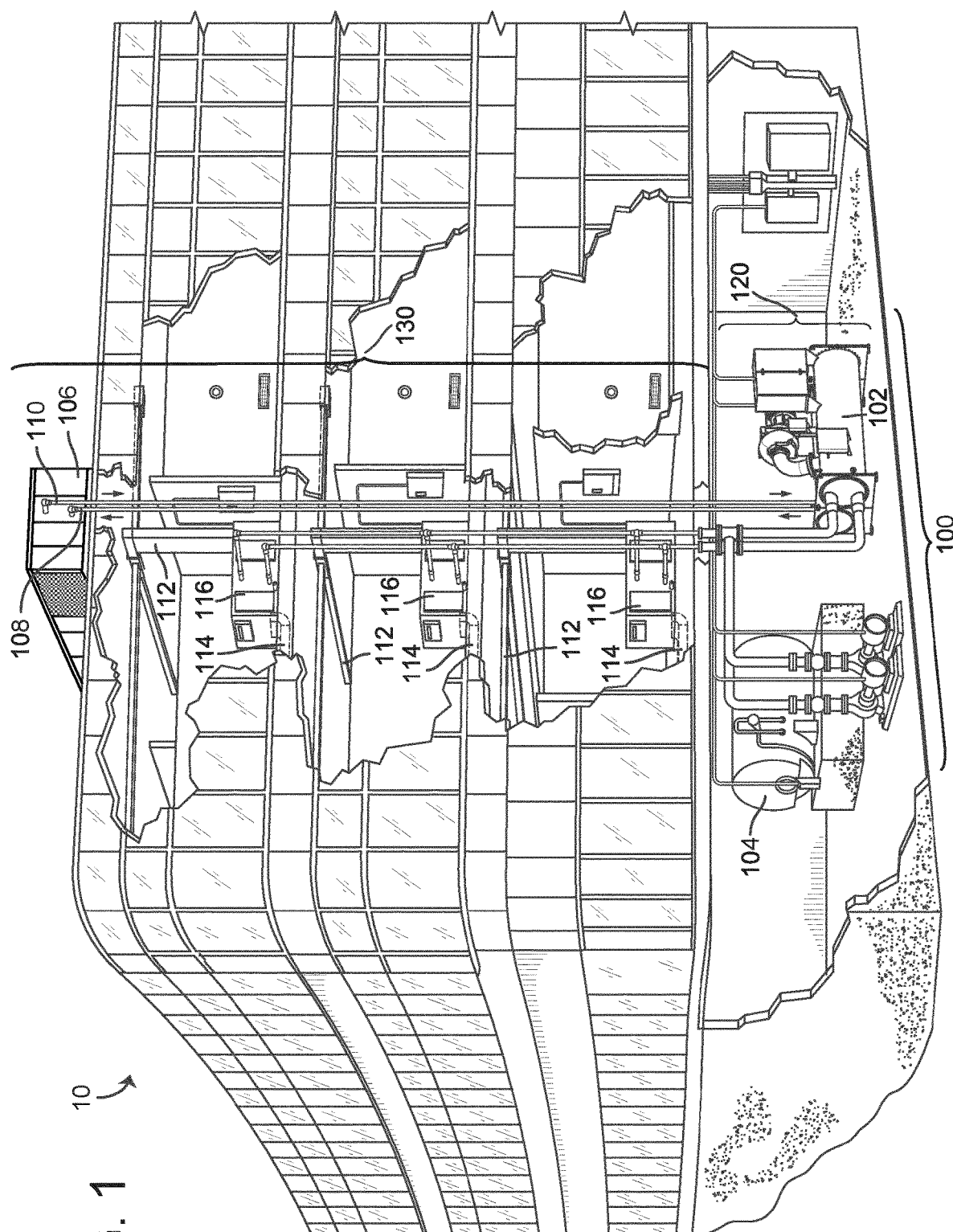
FIG. 1 is a drawing of a building equipped with a HVAC system, according to an exemplary embodiment.

Referring generally to the FIGURES, an Algorithms As A Service (A3S) platform is shown and described according to various exemplary embodiments. The A3S platform can be a platform for performing building management of building systems that can enable efficient and robust development of algorithms for controlling the building systems. As described in greater detail herein, the A3S platform can operate based on metadata packages, a context, a sequence, and a kernel.

The context can be metadata describing a particular building and building equipment for the building. The kernel can be metadata describing a control process that can operate with the context to control the building equipment. Finally, the sequence can be metadata indicating linkage information between digital and physical data points and timing information indicating when the kernel should run, when the A3S platform should collect data, etc. Based on the context, kernel, and sequence packages, efficient and robust development of a building management system can be implemented where a developer can generate and deploy the metadata packages to avoid redeployment or redevelopment of software for the building management system so that runtime injection of the metadata packages can occur.

The A3S platform can use a particular service, a sequencer, to implement running the kernels, the context, and the sequence. The A3S platform can implement a sequencer based on a received sequence. The sequencer can use the sequence to collect data points from a building at particular times, cause the kernels to run at particular times, and store information into a data model defined by the context. The sequencer can be a flexible component such that if the sequencer fails or crashes, the A3S platform can generate a new sequencer to continue the operations of the failed sequencer.

A user may wish to view collected or determined data for the building. In this regard, the A3S platform can includes interfaces with various widgets, animation based displays of the building data. However, a user may wish to be able to implement their own widgets in the A3S system so that custom displays can be utilized. The A3S platform can include a dashboard designer interface which allows for the customization of widgets for displaying information. The dashboard designer interface can allow a user to upload their own graphic animation files, link the graphic animation files to particular data points of the building data model, and view the animations of the animation files based on collected data of the building.

Furthermore, a user may wish to be able to generically edit the context for the building. For this reason, the A3S platform can include a data model building service. This service can allow the A3S platform to generate an interface based on a particular developer generated context and allow the user to update, adjust, or otherwise change the context to be appropriate for a particular building. The data modeler service can generate interfaces in a generic way since the specific information and development rules of the data model can be governed by the context. Once the user is satisfied with the updated context, the user can deploy the context to a real system to operate and control the building equipment of the system.

Furthermore, the A3S platform can be broken into various A3S nodes located on-premises or off-premises. In this regard, execution of a computing job can be either done locally within a building by an A3S node located within the building or by an A3S node located within a cloud server. The A3S platform, or a specific A3S node, can optimize the distribution of computing jobs by considering various factors such as the price of each of the A3S nodes. It may cost more to perform the computing job in the cloud than by the on-premises node. Furthermore, the A3S nodes can optimize the distribution of the computing jobs based on the importance of the computing job and the reliability of each of the A3S nodes. For example, critical computing job may be performed by a cloud based A3S node even though the cloud based A3S node is more expensive than an on-premises A3S node. In this regard, computing jobs can be distributed in an optimal manner.

The A3S nodes can, in some cases, crash or otherwise fail to complete the computing jobs which they may be assigned. For this reason, the systems and methods described herein can implement disaster recovery by first selecting a first A3S node to perform a computing job, monitoring the status of the first A3S node, and performing a second optimization to select a second A3S node if the first A3S node fails to complete the computing job. In this regard, an efficient computing system can operate such that any kind of failure of an A3S node does not prevent the A3S platform as a whole from performing computing jobs and operating the building.

The A3S platform can implement parallel execution of computations based on a property model indicating various dependencies between properties. The A3S platform may include a property model which may be (or may be based on) the context. The property model can indicate the dependencies between various properties where the properties are particular data points of building equipment or particular values determined from data gather from the building equipment. In this regard, the A3S platform can generate computing threads based on the dependencies of the property model which reduces computing time for determining values for the various properties.

Furthermore, the A3S platform can use a data model to reduce the size of stored data of the data model. This can be performed by serializing and/or compressing information for the data model, storing the serialized and/or compressed information into memory, and then using the data model to retrieve the serialized and/or compressed information from memory and then decompress and/or deserialized the data for use by the A3S platform. Such data size reduction can enable quick transportation of information and reduce memory usage by the A3S platform. Minimizing the size of data can help implement the A3S platform in the cloud by reducing the amount of data to communicate between various A3S platform nodes.

The A3S platform can implement scripts which extend the data model of the context. The A3S platform can handle the scripts so that incongruences in units, e.g., adding two different units or generating a result value which has units that do not match desired units, can be flagged for a developers attention. In this regard, the A3S platform can be improved since mistakes in unit math can be caught before a script is ever run. The script itself can be used to generate virtual data points which might not normally exist in the data model. In this regard, a user can run the script with the data model at a live system to generate commissioning information. Furthermore, in some cases, the results of the scripts can be used to control pieces of building equipment.

Building Automation System and HVAC System

Referring now to FIGS. 1-4, an exemplary building automation system (BAS) and HVAC system in which the systems and methods of the present invention can be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
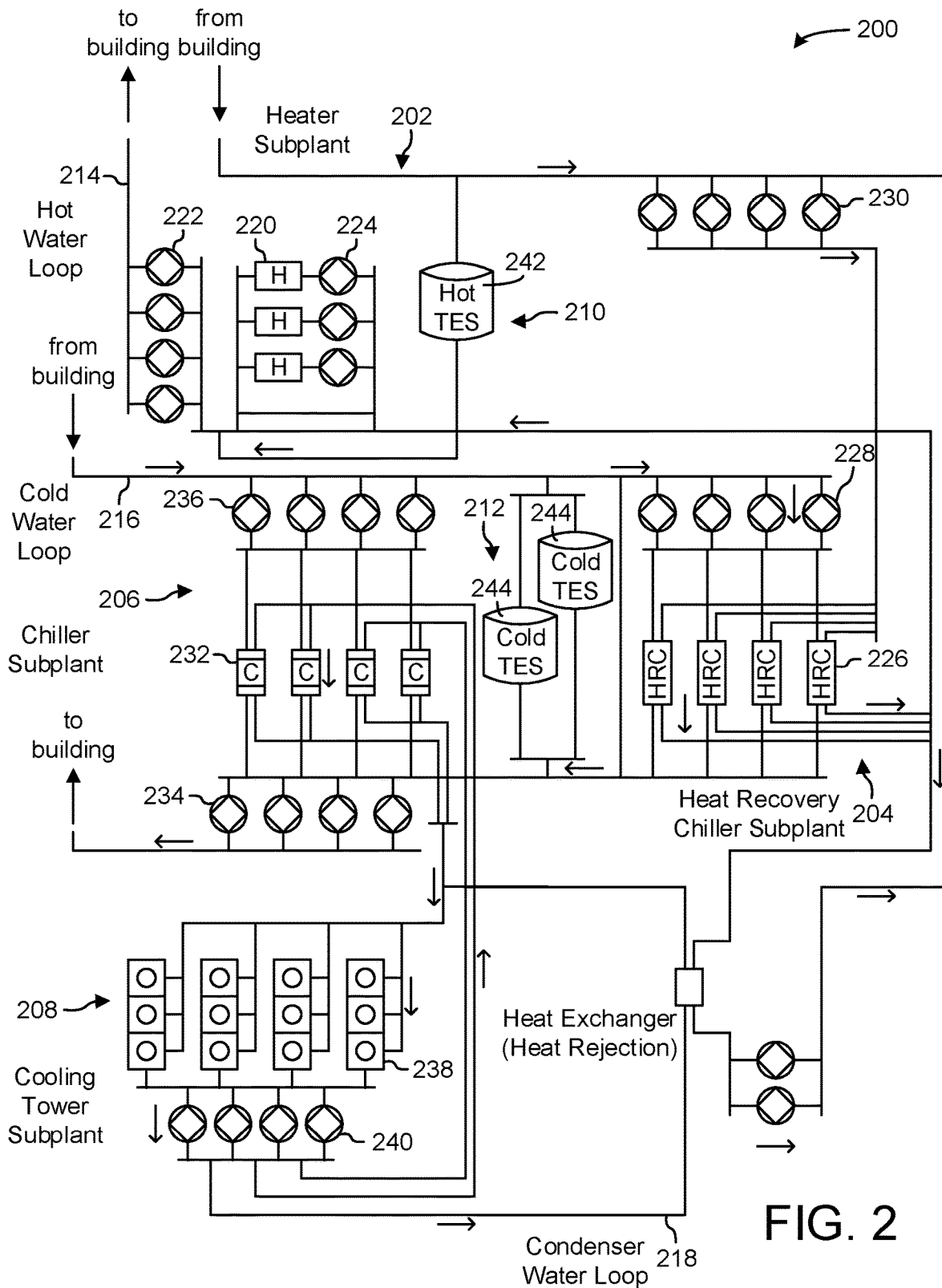
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
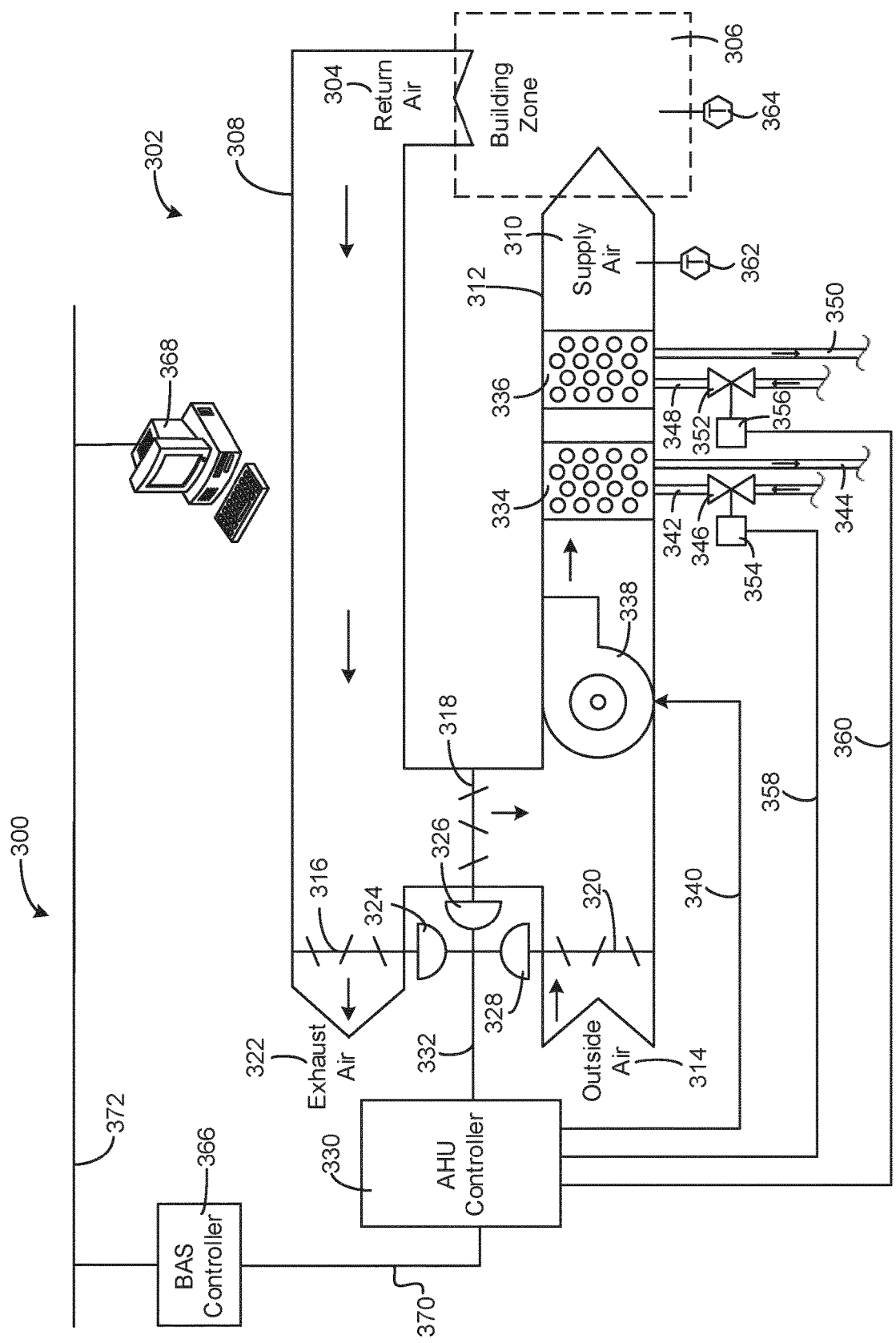
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200(e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
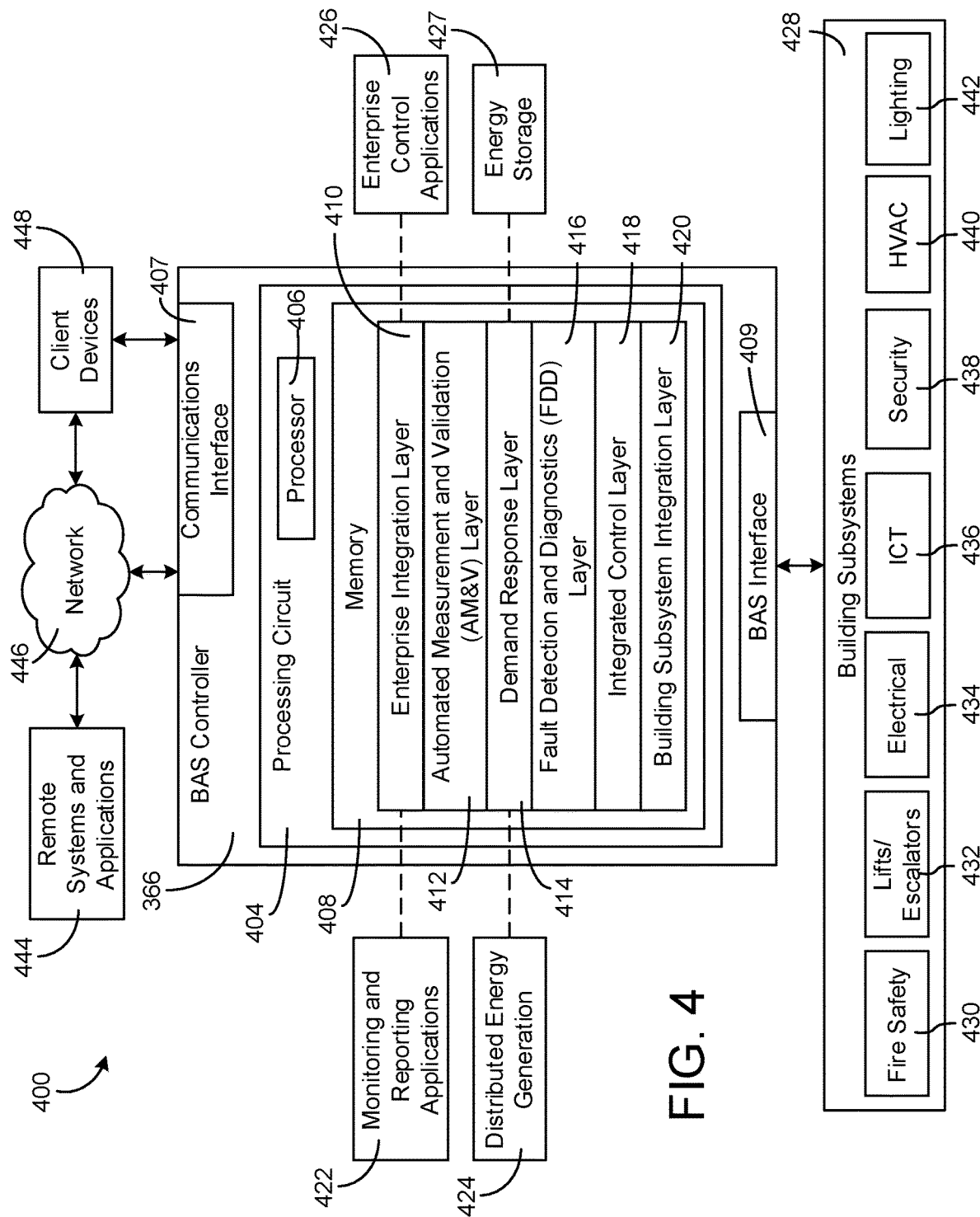
FIG. 4 is a block diagram of a building automation system (BAS) that may be used to monitor and/or control the building of FIG. 1, according to an exemplary embodiment.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, Extensible Markup Language (XML) files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Development Platform Including Common Modelling Language (CML), Rapid Deployment Suite (RDS), and Algorithms As A Service (A3S)

A development platform that generalizes design, development and deployment, in an advanced development setting, of any algorithm is described herein. This development platform avoids expensive "one-off" solutions for each new algorithm that is used. The proposed development platform captures the essence of executing and managing algorithms by enforcing a highly flexible design pattern. This pattern allows algorithms to be developed at minimal costs.

The key to generalizing algorithm-driven systems lies with the ability to separate the requirements into two categories, algorithm-specific needs and system-specific needs. All algorithms consist of input data, output data, and a procedure between them. To achieve a goal, the algorithm's platform must collect, store, manipulate, dispatch, and facilitate user interaction with data. This concept requires the transfer of expert knowledge from the algorithm's creator to the platform. Many methods achieve this through meetings, papers and other various forms of communication. This creates a large cost and is inefficient.

The developer of the transferred information may not have the domain knowledge necessary to create anything but "one-off" solutions that must be repeatedly scraped and rebuilt. These solutions do not manage the iterative nature of algorithm development, causing theoretically harmless iterations to propagate into the system. Two solutions exist to this problem, forcing the algorithm developer to commit to their interface, stubbing innovation, or creating a development platform capable of managing the iterations themselves. The development platform described herein uses the latter and is a system that operates on metadata provided by the algorithm developer at creation. This allows systems to remain stable even with constant changes to the algorithm it serves.

Figure 5:
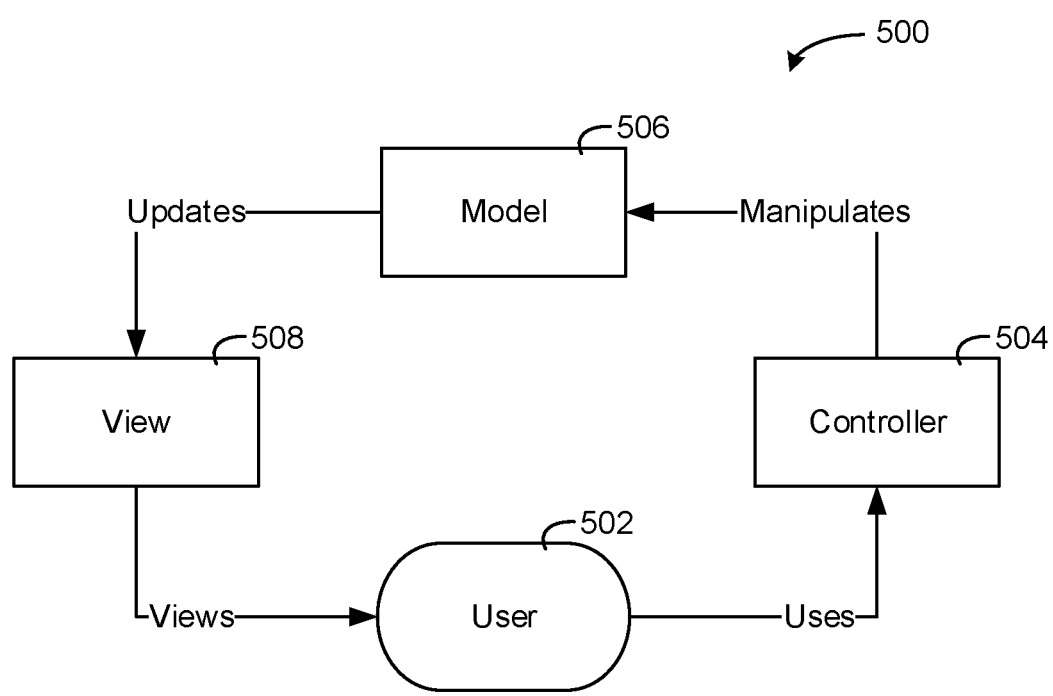
FIG. 5 is a block diagram of a model view controller, according to an exemplary embodiment.

Referring now to FIG. 5, a block diagram 500 of a model view controller (MVC) software architecture is shown. The pattern of the block diagram 500 shows a developer, user 502, how to properly split an application into a controller 504, a model 506, and a view 508, to enable good qualities such as the ability to swap out different views. The model 506 may be a central component that manages data, logic, and/or rules of an application. The view 508 may be any output that represents information (e.g., a chart or diagram). The controller 504 can accept input from the user 502 to command either the view 508 or the model 506. A design pattern like this allows strong communication between developers for a single well-described goal.

However, within algorithm development, no such design pattern exists. One goal of the systems and methods discussed herein is creating such a pattern that will allow full visibility to the reasoning behind the proposed architecture. The systems and methods discussed herein facilitate algorithm development and improve upon the MVC style approach to user interaction.

Figure 6:
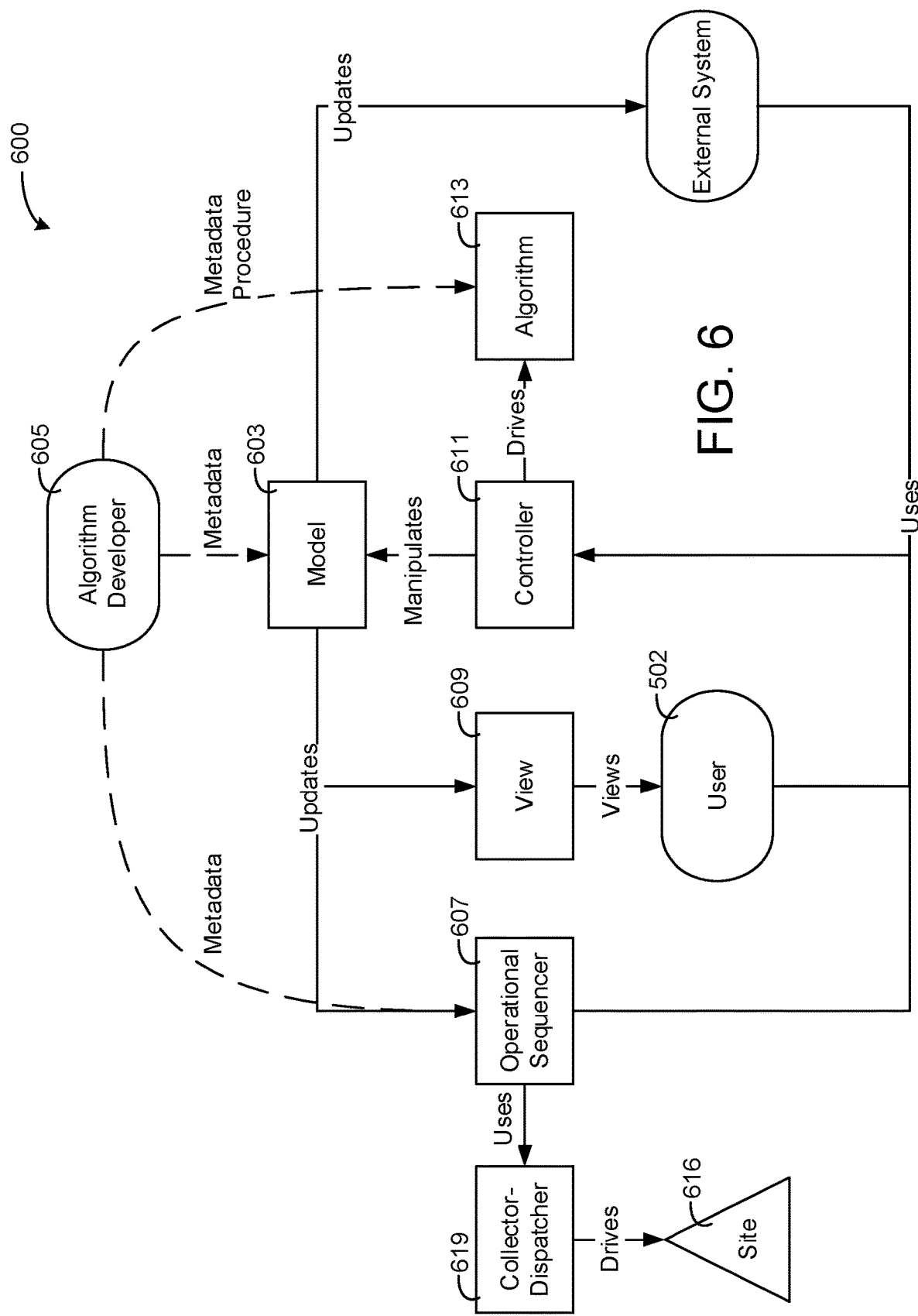
FIG. 6 is a block diagram of a control execution system that executes based on metadata, according to an exemplary embodiment.

Referring now to FIG. 6, a block diagram 600 of a design process for an algorithm execution system is shown, according to an exemplary embodiment. To solve the proposed design pattern generically, none of the rectangular boxes in FIG. 6 (i.e., collector-dispatcher 619, operational sequencer 607, view 609, controller 611, model 603, and algorithm 613) specifically reference any metadata provided by the algorithm developer 605, but instead rely only on methods provided by the controller 611. Regarding FIG. 6, one may break down the problem into three distinct subsystems, i.e., a model-controller combination library, a view system, and an algorithm system. These three components are described in FIG. 7A and FIG. 7B as a common modelling language (CML) 710, a RDS application 712, and a A3S platform 714.

Figure 7A:
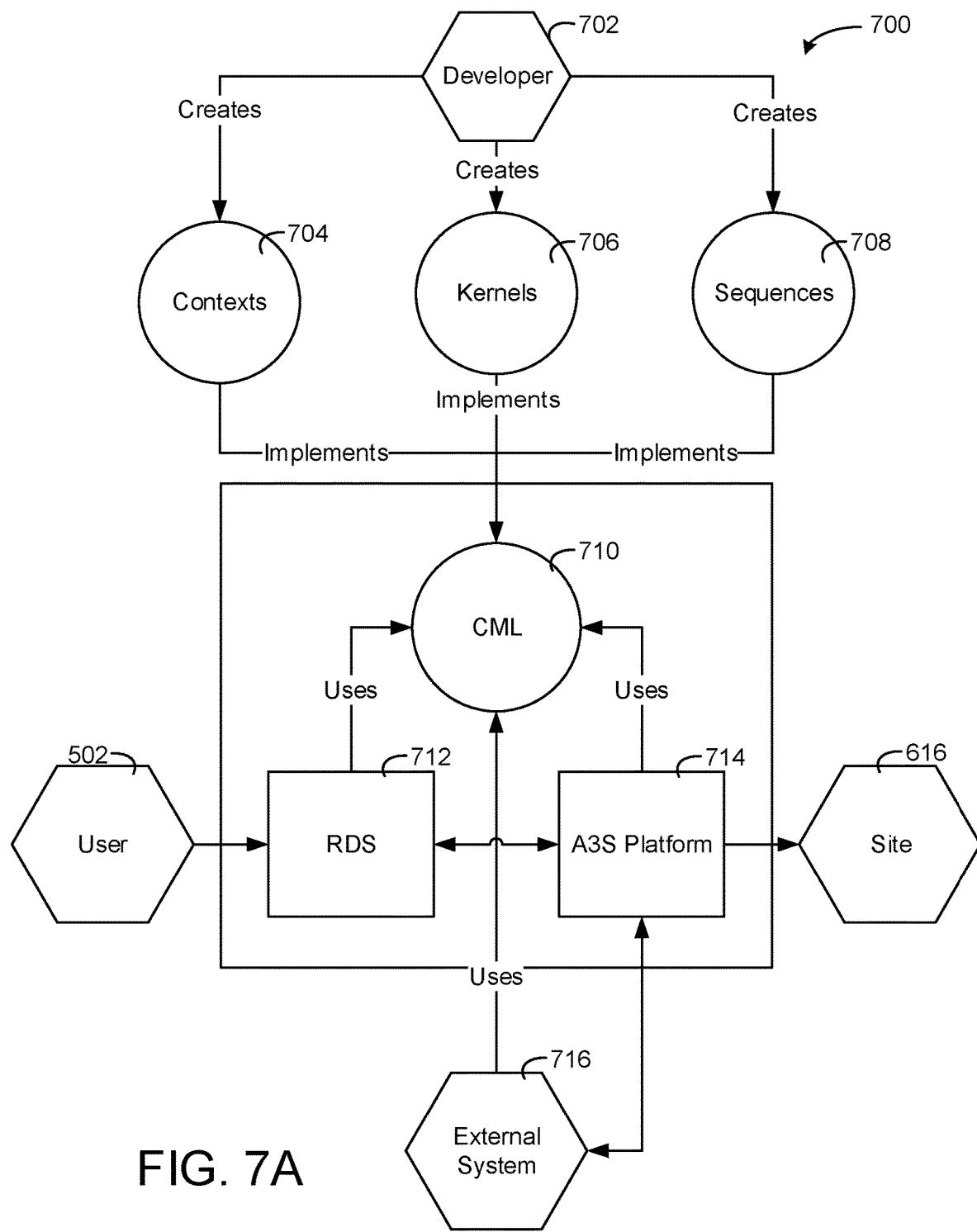
FIG. 7A is a block diagram of a model-controller platform including a common modeling language (CML), a rapid deployment suite (RDS), and an algorithm as a service (A3S) platform, according to an exemplary embodiment.

Referring now to FIG. 7A, a development platform 700 that includes a common modeling language (CML) 710, a rapid deployment suite (RDS) 712, and an algorithms as a service (A3S) platform 714, is shown, according to an exemplary embodiment. The system shown in FIG. 7A has three pieces, a model-controller setup as a physical library referred to herein as the CML 710, a view system, e.g., the RDS application 712, and an algorithm system referred to herein as the A3S platform 714. The RDS application 712 and the A3S platform 714 can both rely exclusively on the CML 710, and not the libraries that inherit from the CML 710 so that any new additions to a model implemented based on the CML 710 automatically occur in the RDS application 712 and the A3S platform 714.

FIG. 7A illustrates a working solution to the design process by creating a context-driven system. Each of the blocks shown in FIG. 7A demonstrate the goal of the development platform 700, enabling an algorithm developer 702 to create three components, a context 704, a kernel 706, and a sequence 708. The context 704 includes all the necessary metadata to model the data for the algorithm and is built in a familiar class form. The kernel 706 contains the metadata necessary to specify data requirements for input and output, along with the algorithm itself. Finally, the sequence 708 contains the necessary metadata to perform live execution of an algorithm on a site such as timing. With these three pieces, the platform 700 enables all the necessary requirements of an algorithm system by using the metadata available through the CML 710.

The RDS application 712 and the A3S platform 714 supply the necessary system functions mentioned by the design pattern. The RDS application 712 provides the view to a user whereas the A3S platform 714 serves the RDS application 712 by managing offline runs and live operational runs. In addition, the A3S platform 714 manages external systems that also use the CML 710 for algorithm execution. These two systems subcomponents all rely on the CML's controller and may be implemented by an external system however they choose, offering a way to not rely on the advanced development versions of RDS application 712 and the A3S platform 714.

Figure 7B:
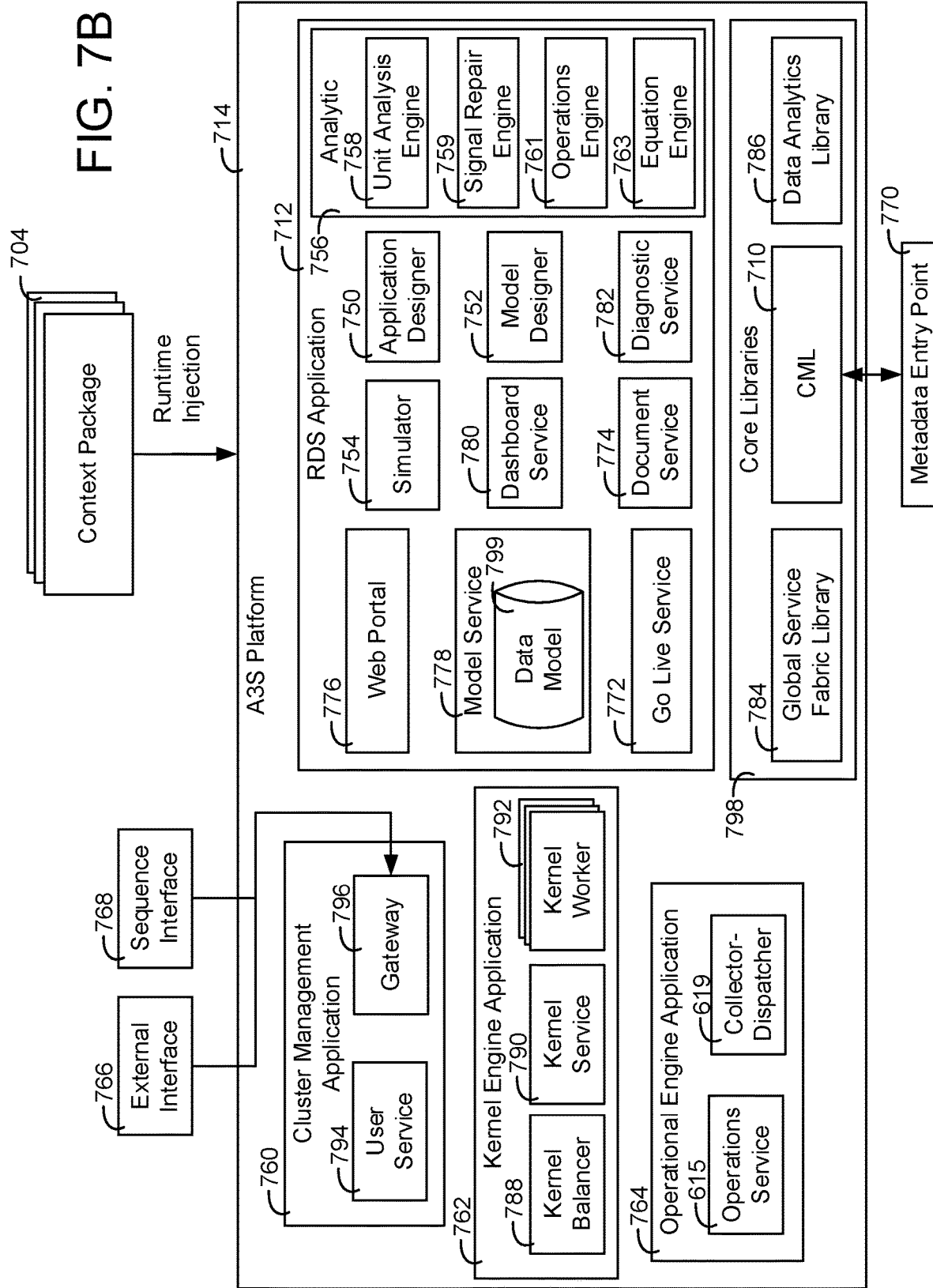
FIG. 7B is a block diagram of the A3S platform and the RDS of FIG. 7A, described in greater detail, according to an exemplary embodiment.

Referring now to FIG. 7B, the A3S platform 714 and the RDS application 712 are shown in greater detail, according to an exemplary embodiment. The A3S platform 714 may be a dynamically updatable platform that can receive metadata based updates from packages that is receives, the packages including the context 704. The data package and/or packages can also include the kernel 706 and the sequence 708. The A3S platform 714 and the various components of the A3S platform 714 shown in FIG. 7B and described herein can be implemented as microservices on various computing devices (e.g., cloud servers, desktop computers, data centers, etc.). The A3S platform 714 can be implemented with MICROSOFT® Service Fabric. MICROSOFT® Service Fabric is described with further reference to FIG. 15 and elsewhere herein. The A3S platform 714 can be implemented on one or more processing circuits (e.g., a processor and memory device) such as the processing circuit 404 of the BAS controller 366. However, the A3S platform 714 can be implemented in any cloud computing system, a data center, one or more desktop computers, a building server, a private cloud, a public cloud, etc.

The A3S platform 714 is shown to include a cluster management application 760, RDS application 712, kernel engine application 762, operational engine application 764, and core libraries 798. The cluster management application 760 can be configured to provide external interactivity for an A3S cluster including user accounts and gateway services. A cluster may be a specific implementation of the A3S platform 714 and/or particular services of the A3S platform 714. Multiple A3S platforms 714 and/or services of the A3S platforms 714 can be deployed as clusters in a private cloud, a desktop computer, a public cloud, etc., all of which can work together provide controls for a building and/or facility.

Cluster management application 760 is shown to include a user service 794 and a gateway 796. The user service 794 can be a microservice configured to provide the ability for the A3S platform 714 to identify a user whether identified through the gateway 796 or a built in user interface (UI). The user service 794 can be configured to provide users with login tokens, verify passwords, and/or otherwise manage user accounts and allow a user to access the A3S platform 714. The gateway 796 can be configured to route data between the A3S platform 714 to an external user device. The gateway 796 can provide an API (e.g., the external interface 766) for external systems to connect into. A developer can use the external interface 766 to connect to the A3S platform 714 through the gateway 796.

The kernel engine application 762 can be configured to manage distributed execution of the algorithms deployed into the A3S platform 714 across various available clusters. The kernel engine application 762 is described with further reference to FIGS. 16, 17A, 17B, 17C, and 18. The kernel engine application 762 can be configured to distribute computing jobs among various clusters to optimize executing of the algorithms and further can be configured to recover computing algorithms in response to a computing cluster crashing. These techniques, hybrid cluster optimization and hybrid disaster recovery, are described with further reference to FIGS. 20-23. Hybrid cluster optimization can optimize the use of externally available resources to reduce cost of deployment and execution of the algorithms.

The kernel balancer 788 can be configured to balance kernel execution for the A3S platform 714. The kernel balancer 788 can be configured to upload jobs into reliable storage, queue jobs, and balance jobs among various kernel services 790 running in various A3S platform 714 clusters. The kernel service 790 can be configured to execute a kernel and can be a microservice deployed in the cloud, in a data center, on one or more desktops, etc. Further detail regarding kernel balancing is described with reference to FIGS. 16-18. In some embodiments, the kernel balancer 788 can be configured to manage kernel execution using a cost function. Using the kernel balancer 788 to manage execution of kernels is described with reference to FIGS. 18-23.

The kernel service 790 can be configured to manage kernel execution processes (e.g., the kernel workers 792). In response to receiving a job from the kernel balancer 788, the kernel service 790 can be configured to scan the kernel workers 792 it has alive for any that are free and pass the job into the kernel worker 792 using named data pipes. If active jobs exist on all the active kernels workers 792, the kernel service 790 can be configured to create a new process (i.e., create a new kernel worker 792). During the execution of the job on the kernel worker 792, the kernel worker 792 can be configured to return progress updates and errors back through the named data pipe. Once received, the kernel service 790 can be configured to forward a notification back to the kernel balancer 788.

The operational engine application 764 can be configured to provide the A3S implementation of a sequence engine, a system that provides caching and algorithm execution of closed loop control. The operational engine application 764 can maintain snapshots of raw data flowing on the target platform to ensure algorithms performance requirements are achieved. The operational engine application 764 is shown to include operations service 615 and collector-dispatcher 619. Operations service 615 can be configured to collect data from kernel workers 792 and provide the collected data to the collector-dispatcher 619 to execute control of building equipment. Similarly, the data that the collector-dispatcher 619 collects from the building equipment can be provided to the kernel worker 792 via the operations service 615.

The RDS application 712 can be configured to provide the user experience for the users of A3S's various target uses: deployment configuration, commissioning, creating generic live dashboards, editing deployed context model, maintaining and diagnosing live executions, simulating, monitoring, etc. The RDS application 712 is shown to include a web portal 776, a model service 778, a simulator 754, an analytic 756, an application designer 750, a dashboard service 780, a diagnostic service 782, a go live service 772, a document service 774, and a model designer 752.

The web portal 776 can be configured to provide one or more web interfaces to a user for accessing the A3S platform 714. The web portal 776 can be configured to allow a user to enter data into the A3S platform 714 (e.g., add a context 704, a kernel 706, and/or a sequence 708), view system information, and other interface based features for the RDS application 712.

The model service 778 can be configured to receive the context package 704 and generate the data model 799. In some embodiments, the data model 799 is the implementation of the metadata of the context package 704. Specifically, the data model 799 may be a data model of a building and/or equipment for the building that is implemented based on the CML 710. Specifically, the context package 704 may reference the various classes and the class structure of the CML 710. Therefore, the model service 778 can be configured to implement the data model 799 with the context 704 and the prototype, entity, and attribute class structure of the CML 710. This class structure is described with reference to FIG. 8 and elsewhere herein.

Simulator 754 can be configured to run an active data model (e.g., the data model 799) to provide experimental comparisons for testing algorithms against the data model 799. In some cases, a developer builds a model, edits the model's data, solves the model against some settings, analyzes results, and continues to edit the model, solve the model, and analyze the results until satisfied with the model. However, the simulator 754 enables a developer to test their algorithms against the current data model 799 of the A3S platform 714. The simulator 754 is described with greater detail to FIG. 13 and elsewhere herein.

The analytic 756 can be an engine that implements a scripting language that combines equations with actions implemented by a caller. The analytic 756 can include various engines that it uses to operate. These engines may be the unit analysis engine 758, the signal repair engine 759, the operations engine 761, and the equation engine 763.

The unit analysis engine 758 can be configured to provide a user with mathematical unit verification. In some embodiments, the unit analysis engine 758 can track units in a script or otherwise in the code of the A3S platform by mapping a user defined unit into a standard unit and verifying that a unit result for an operation matches an expected unit. The signal repair engine 759 can be configured to perform signal repair on various data sequences (e.g., time series data). The signal repair engine 759 can be configured to perform interpolation and/or generate infinite resolution signals based on data sequences.

The operations engine 761 may include various operations for execution for the analytic 756. The operations executed by the operations engine 761 can be timeseries executions, discrete data point execution, etc. These operations may be conventional operations or can be custom defined operations. The operations may be operations such as the operations found in FIGS. 9A and 9B of U.S. patent Ser. No. 15/409,489 filed Jan. 18, 2017, the entirety of which is incorporated by reference herein. The equation engine 763 can be configured to perform various operations based on the operations of a user defined script. The equation engine 763 can be configured to break a sequence of script operations down into individual operations and generate an appropriate order for the execution of the operations.

Figure 14A:
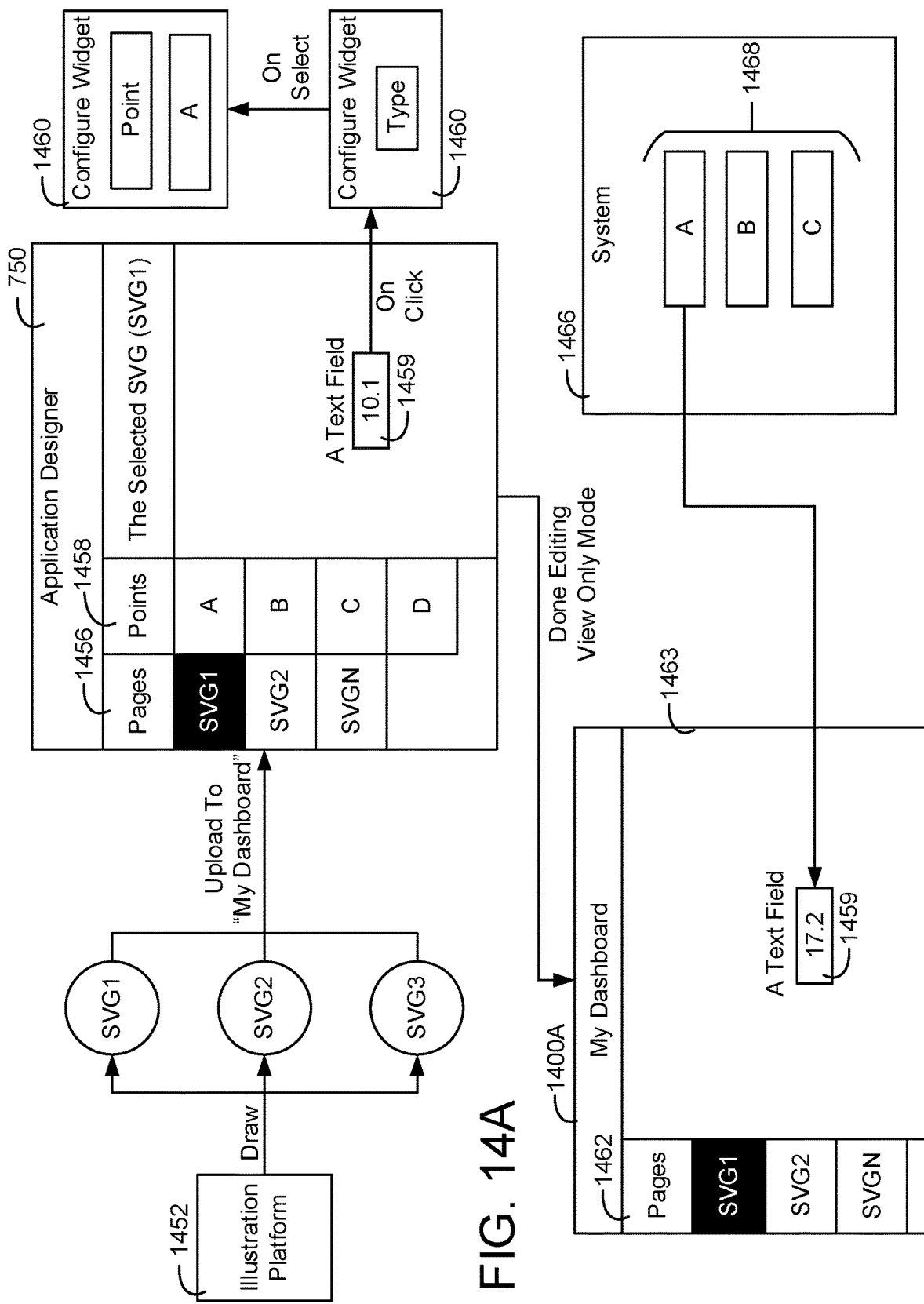
FIG. 14A is a block diagram of generating an interface page with a widget generated based on a scalable vector graphic (SVG) via an application designer of the RDS of FIGS. 7A and 7B, according to an exemplary embodiment.
Figure 14B:
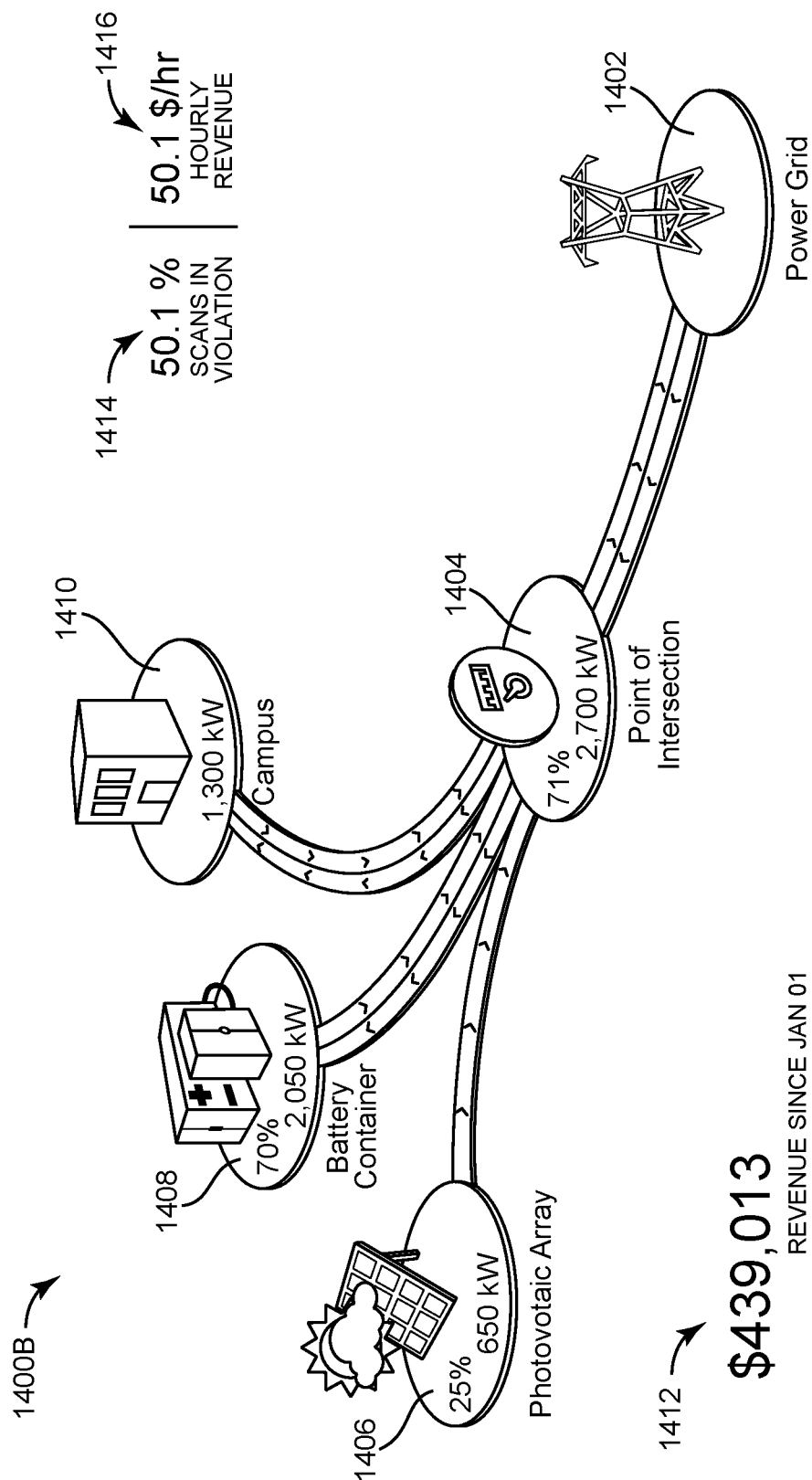
FIG. 14B is an interface that can be generated with the application designer of the RDS of FIGS. 7A and 7B, according to an exemplary embodiment.

The application designer 750 can be configured to generate interfaces for displaying information of the data model 799 to a user. The application designer 750 can be configured to receive user uploaded scalable vector graphics (SVGs) that a user can generate via an illustration platform (e.g., ADOBE ILLUSTRATOR®, INKSCAPE®, Gimp, etc.). An SVG may be an XML-based vector image format for two-dimensional graphics that support user interaction and animation. Based on the user uploaded SVGs, a user can bind the SVGs to widgets, include data points in the widgets, and display the widgets in various interface pages. The widgets may update their data points based on a link generated by a user between the data model 799 and the widget. FIGS. 14A and FIG. 14B provide an example of creating a widget and a widget displayed on a page that the application designer 750 can be configured to generate.

The dashboard service 780 can be configured to provide a user with a dashboard of their building or facility. For example, a dashboard that can be hosted by the dashboard service 780 is the interface 1400B as described with reference to FIG. 14B. The interfaces that the dashboard service 780 can be configure to host can be interfaces that include widgets generated by the application designer 750.

The diagnostic service 782 can be configured to enable administrators of the A3S platform 714 to have full views of their models for editing and overrides. This view essentially is the show all version of model designer without the ability to edit the configuration of connections or hierarchy. Via the diagnostic service 782, the administrator may commission data to the system not otherwise available from a custom app. It shows the current data, whenever requested, of the data model 799 within the real-time system.

The go live service 772, also referred to as the configuration tool herein, enables a user to bring the model they've created to a live system. The go live service 772 reduces the required user efforts necessary to go live by reducing the number of steps to cause a system to "go live," i.e., begin operating. Causing a system to go live may include defining input definitions, input analytics, output definitions, output analytics, sequence settings, and system settings.

The first four steps surround input and output definitions. The user, when taking a design live, must specify the intersection between the points within the site and points within the data model for the algorithm they choose to run. If points do not exist or map one to one, the user can use the analytic 756 to bridge the gap. In some embodiments, Johnson Controls (JCI) Logic Connector Tool (LCT) based logic covers this use case on sites. In the RDS application 712, the analytic 756 may not use a graphical approach and instead use a scripting language to cover this use case. In the analytic 756, the user can map filtered points or averages to single points within the data model 799.

Moreover, on output they may infer points in the site using many points within the data model 799. Once inputs and outputs exist, the user then simply must specify network settings, and custom options for the sequences provided by the CML 710. Once done, the system links into the A3S platform 714 and start execution.

The document service 774 can be configured to generate documentation for the data model 799. The document generated by the document service 744 can illustrate various data points, descriptions of the data points, units for the data points, and/or any other information for the data model 799. A user can view the documents generated by the document service 774 as a reference for updating and/or generating a new context 704.

The model designer 752 can be configured to provide a user with interfaces for generating and/or updating a context 704. The model designer 752 can be configured to allow a user to select between various models (e.g., the data model 799) and edit the model to change or add various pieces of equipment in the building or other information pertaining to the building. The model designer 752 is described with further reference to FIGS. 10-13.

The context package 704, as described with further reference to FIG. 7A, can be a data package containing the implemented classes reliant on the CML 710 that can be rendered by the A3S platform 714. The context package 704 can be metadata that can be used with the CML 710 to implement a data model (e.g., the data model 799). The data model 799 can then be used to control various facilities (e.g., building equipment). The CML 710 and the class structure of the CML 710 that can be used to implemented the context 704 as a data model is described with further reference to FIG. 8.

The A3S platform 714 may include various client integration points. These integration points may include the external interface 766, the sequence interface 768, and the metadata entry point 770. The external interface 766 can be configured to provides a REST/WCF style communication that services external to the A3S platform 714 utilize to interact. This includes any written "ports" that are used by target platforms to interact with the A3S platform 714.

The sequence interface 768 can be configured to implement the gateway 796 into the A3S platform 714 that a sequencer can use to drive close loop control calculations. The metadata entry point 770 may be a developer backdoor. The metadata entry point 770 can be found from the CML library in classes, providing the user with the ability to extract the metadata from the supplied context to reformate it into the users choice architecture.

The core libraries 798 can be various code libraries configured to enable the execution of the A3S platform 714. The core libraries 798 are shown to include a global service fabric library 784, a CML 710, and a data analytics 786 library. The global service fabric library 784 may be a library allowing the A3S platform 714 to implement the A3S platform 714 and/or the various components and services of the A3S platform 714 as microservices. Implementing the A3S platform 714 and its various components and services as microservices may include deploying the A3S platform 714 via MICROSOFT® Service Fabric, which the global service fabric library 784 may enable. The global service fabric library 784 may include one or more libraries enabling the A3S platform 714 to implemented as a microservice. MICROSOFT® Service Fabric is described with further reference to FIG. 15.

Figure 8:
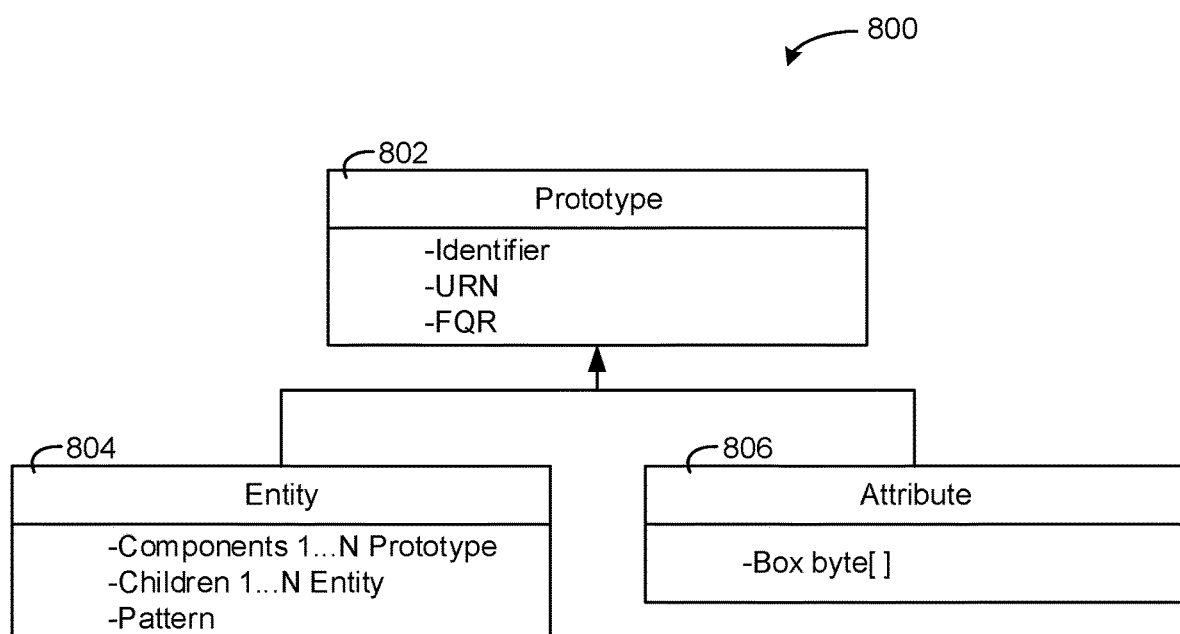
FIG. 8 is a block diagram of the class structure of the CML of FIG. 7A, according to an exemplary embodiment.

Referring now to FIG. 8, a block diagram 800 of the class structure of the CML 710 is shown, according to an exemplary embodiment. The CML 710 strives to solve a multi-dimensional problem because algorithm execution requires not only data and systems to move that data, but also data analytics and standards. This concept illustrates several goals of the CML 710: provide a generalized model and controller for algorithms and their system needs; simplify, standardize, and improve data analytics for all algorithms to leverage; create a context-driven environment where algorithm developers focus on algorithms and not the system; and maintain a low memory footprint, high throughput, robustness and upgradeability.

The CML 710 represents any form of data an algorithm may need and enables the rest of the system to utilize that data generically. In addition, the CML 710 can help standardize data types between algorithms to ensure a consistent user interface.

The prototype 802 provides identification for the CML 710 objects by tracking the hierarchy that exists within an entity 804 and providing an identifier. The entity 804 itself provides two forms of hierarchical design, components and children. A component affects the hierarchy and exists at construction time whereas children are simple references to other entities 804 bound by the user after construction. Finally, the attribute 806 represents the actual properties of the entity. The properties may be time series, quantities, string data, and/or any other data for the CML 710.

The prototype 802 provides the identification and location of anything within the entity hierarchy. One way to understand the class structure of the CML 710 is via an example of modelling zones in a building (e.g., the site 616). The hierarchy is:

Building
    Components
        Weather [Weather]
        Total Power Consumption [Timeseries]
    Children
        Zone1 [Zone]
        Zone2 [Zone]
        Zone3 [Zone]
Zone
    Components
        Temperature Setpoint [Timeseries]
        Temperature [Timeseries]
        Air Flow [Timeseries]
        Max Air Flow [Quantity]
Weather
    Components
        Wetbulb Temperature [Timeseries]
        Drybulb Temperature [Timeseries]
        Humidity [Timeseries]

The prototype 802 tracks this component hierarchy by using fully qualified references (FQRs). The FQR only tracks the component hierarchy since the children path creates only relationships. The FQR takes a simple form of EntityUserId:PatternName.Path1/Path2 . . . /PathN. Therefore, the FQR of the Wetbulb temperature is Building1: Building.Weather/Wetbulb Temperature, and the FQR of zone1's temperature setpoint is Zone1:Zone.Temperature Setpoint.

The prototype 802 using this mechanism allows quick searching of the resultant model for various points due to its ability to flatten the structure. If a user wanted to collect all the zone setpoints they could search via its universal reference notation (URN): Zone.Temperature Setpoint. However, if they wanted just zone1's setpoint they would use its FQR: Zone 1:Zone.Temperature Setpoint.

As shown with weather, entities 804 may also create groupings of simple properties. The developer may use these construction time groupings to take advantage of standard object oriented design practices and leverage common methods between classes. This concept allows for the developer to create as simple or as complex of a model necessary for their algorithm. The prototype 802 enables an identification technique throughout the CML 710. However, the real workers of the model come from the entity 804 and the attribute types 806. These two concepts are created in a way to allow a developer the simplicity of standard class design and the generality and flexibility of metadata driven objects.

The CML 710 aims not only at creating a usable model for any algorithm, but also to standardize and allow sharing of components between algorithms. To achieve this, the entity object 804 has a type of pattern. These patterns coupled with a factory (a simple store for all the patterns) allows the system to extend quickly and robustly. Instead of creating a real concrete object for every type of device (e.g., a chiller, boiler or heat recovery chiller), the developer can simply create a device and have different patterns for each type. This creates a system that can quickly extend to different types of equipment without adding the burden of additional design and testing (and can even be extended during runtime). Patterns serve to aid the developer in creating highly extendable data models. The entity 804 must have a pattern for transportation and other built-in procedures; however the developer may choose to leave them empty.

Beyond the pattern factory setup, the entity 804 must allow the configuration of properties, relationships and a more complex retrieval of model-wide data. First, consider an example of how to actually create an entity 804. Entities 804 may be classes in C# that implement the entity class. When implementing the class, a developer may need to supply the type of pattern the base entity class will expect and the type of root entity to expect. In a library, one might find the following code snippet defining a weather entity for use in the building model example mentioned earlier.

```
public class Weather : Entity<WeatherPattern, IRootEntity>
{
    public TimeSeries Wetbulb => LinkAttribute(name => new Timeseries(name, UnitCategory.Temperature));
    public TimeSeries Drybulb => LinkAttribute(name => new Timeseries(name, UnitCategory.Temperature));
    public TimeSeries Humidity => LinkAttribute(name => new Timeseries(name, UnitCategory.None));
    public Weather(WeatherPattern pattern, string identifier)
       : base(pattern, identifier) { }
}
```

Example Code 1

The link attribute function allows a developer to connect any attribute directly into properties of an object to create more readable code. In some embodiments, any C# class can be implemented into the CML 710. Considering the weather pattern, the factory on creation will inject the selected pattern into the weather object. Developers may use this pattern to determine how to setup formulas on the various timeseries, or to enable or disable certain attributes etc.

The entity 804 aims to connect a concrete object to a metadata-driven object that the system may operate against. The CML 710, when operating against the weather object, would never reference wetbulb's property. Instead, it would merely find wetbulb as a component under the list of components in the base class. This allows the system to generically manipulate data without expert knowledge on what that data represents.

The entity 804 must also satisfy two other purposes: complex relationships such as finding points within the model at runtime, and enabling shareable generic classes between different algorithms. The latter is done through the use of patterns. Two algorithms may choose to both use weather; however, one may require additional information. In this scenario, the developer may create an entity view that the pattern will use to inject further properties onto the created entity. When accessed by this developer, the weather entity may not immediately contain any of the view's additional properties. Instead, the developer may need to ask the entity 804 to treat itself as the view (e.g., polymorphism) to expose the additional properties onto the concreate class. In this manner, the developer has taken advantage of the methods and properties of the weather object, creating a standard for weather while still achieving his or her own view of that weather object.

The second purpose of enabling complex relationships surrounds the root entity. All entities 804 must specify a root entity (i.e., a place guaranteed, by the developer, to contain all necessary information to reconstruct a model). For an HVAC site, a developer may consider the plant as the root entity. Entities allow the overloading of a refresh function that passes in the root entity. Within this refresh function, the developer may choose to find and use any point at or underneath the root entity. This allows any unforeseen complex relationships to be created and supported within the CML 710. All systems that rely on the CML 710 must call the refresh function on an object anytime that object is modified by the system to ensure unforeseen relationships remain up to date.

The attribute 806 defines the properties available for use as components in any entity 804. Attributes 806 may require custom views, along with special code within the controller. Therefore, developers can reuse existing attributes before creating new ones to reduce the time to deployment.

As shown in FIG. 8, the attribute 806 contains only a byte array. This property, the CML 710 refers to as "the box" because it stores any custom object. This custom object can serialize and deserialize using GOOGLE'S® protocol buffer technique. This serialization forms the basis for maintaining a lightweight memory footprint given the challenge of storing the full model within memory—this technique can bring a memory load of over 1 GB down to only 10 s of MBs.

A developer may choose to extend the CML 710 by creating additional attributes 806. Creating attributes 806 requires two things, defining an object that represents the data, and defining an object that enables performant transportation of the previous object. Storage and transportation can take on two forms, this allows the developer to optimize how to transport data while storing it in another format. An example attribute definition may help to understand this use case.

```
public sealed class DoubleArray : MeasureableAttribute<Constants, double[ ]>
{
    public DoubleArray(string identifier, UnitCategory expectedCategory, string unitGroup)
        : base(identifier, expectedCategory, unitGroup)
    {
        Data = new Constants(new double[ ] { }, OutputUnit);
    }
    public override double[ ] TransportData => Data.GetData(OutputUnit).ToArray( );
    protected override Constants Convert(double[ ] value, CompositeUnit unit)
    {
        return new Constants(value, unit);
    }
}
```

Example Code 2, Attribute

In this code snippet, the attribute 806 shows why the storage object may differ from the transport object. For the double array, the constants class represents a data analytics concept that carries with it unnecessary information during transportation such as derived units and a collection of structs instead of aligned lists. Therefore, to ensure performant transportation, the attribute 806 reduces constants down to a double array.

In Example Code 2, the measurable attribute base class, the attributes in the CML 710, takes on three basic forms, the attribute, the measurable attribute and the derivable attribute. The attribute enables the basic use case for a property without additional units or formulas, a string based attribute is shown in Example Code 3 below.

```
public sealed class StringParameter : Attribute<string, string>
{
    public StringParameter(string identifier)
        : base(identifier)
    { }
    public override string TransportData => Data;
    protected override string Convert(string value)
    {
        return value;
    }
}
```

Example Code 3

A measurable attribute (Example Code 2), like the double array shown, adds unit functionality to the attribute (Example Code 3). Finally, the derivable attribute applies on top of the measurable attribute providing the implementing class with the full power of the data analytics suite.

The CML 710 includes functionality to perform standardized, robust and extensible data analytics by leveraging a separate well-defined library—This allows other systems to utilize just the data analytic aspects of the CML 710. Using this data analytics library provides the CML 710 with its ability to perform on-the-fly computations of derivable attribute relationships avoiding excessive storage of data onto disk or in memory. In addition, combined with a smart caching mechanism tied into the boxing technique, the CML 710 never wastes time recalculating the same execution.

The derivable attribute focuses on creating relationships between sets of attributes, this allows developers to map relationships without manual coding it into their algorithm. In addition, this concept removes unnecessary storage onto disk (this concept can save about 80% on the size of storage alone versus storing all calculated values) and allows all kernels 706 to utilize the relationship—helping with standardization.

As the most common form of derivable attribute, the timeseries consists of a discrete signal, a unit category, and a signal type. Its discrete signal consists of a collection of samples each with sample time, sample value and a flag indicting states such as unreliable or out of bounds. Using a timeseries, the CML 710 can form various relationships such as summing many timeseries signals into a single timeseries. Under the hood, these relationships are verified by a unit engine to ensure the unit category matches the result from the relationship.

```
ZoneGroup
    Components
        Total Air Flow [Timeseries]=Sum (Air Flows from
            zones within children)
    Children
        Zone1:Zone
        Zone2:Zone
        Zone3:Zone
Zone
    Components
        Air Flow [Timeseries]
```

In the example, the zone group, during the refresh function, builds a sum relationship that connects each child zone's air flow to its total air flow. Then, when a user accesses total air flow, it will use the relationship to calculate both the values and units for the user. The CML provides a clean way implementing this idea:

```
TotalAirFlow.DeriveFrom(Formula.SumAll(ChildrenOf<Zone>( ).
    Select(z => z.AirFlow)));
```

Example Code 4

Example Code 4 presents how to derive points with the CML 710. At this point, one may question what happens to the result if the signals for the various air flows are randomly sampled. Data analytics manages this situation using a built-in repair algorithm that creates infinite resolution for timeseries based on their signal type (either discrete or continuous in value). Using this algorithm, the timeseries can easily line up the signals and create a resultant signal.

Furthermore, one may also question what goes on within the formula class that enables the sum relationship. The formula class leverages a built-in equation and operation engine within the data analytics module too. Using this engine, the developer 702 may choose to use a specific operation such as sum, or to specify their own equation, in string format, that utilizes various built-in operations:

```
{FormulaName.QofWater, "Flow * watershov(TemperatureOut) *
    (TemperatureOut – TemperatureIn)"},
```

Example Code 5

Example Code 5 gives an example of a dictionary entry that defines the equation for Q of water. The derivable attribute enables data analytics within the CML 710 that may be leveraged to calculate data before going into an algorithm, or supplement the algorithm by calculating additional properties. This attribute leverages key components made possible by data analytics such as unit analysis, equation parsing, operations, and signal repair.

Context Driven Development

The CML 710 simplifies the architecture problem of algorithm development into a context-driven format. Effectively, context-driven means that the architecture relies on generic metadata driven data models that the developer provides as an interface for their algorithm. This allows the architecture to remain unchanging. The developer in their use case creates a model and provides attributes on the classes properties to signify how to store the model into a data base.

The CML 710 uses context-driven development primarily to reference the actual data model 799 required for an algorithm, or set of algorithms. This data model, known as a context, relies on implementing the provided classes within the CML 710. Implementing the built-in classes of the CML 710 as an external library enforces that the remaining architecture has all the necessary information to perform any operation. To prevent constant deployments, the architecture provides a method for this context and its kernels to be injected at runtime.

Once the developer defines the context for their algorithm (e.g., the data model that their algorithm will run against), they also implement the base kernel from the CML 710 that references their developed context and runs their procedure. The kernel 706 they create must also provide input and output property usages from their context 704. This allows a single context 704 to drive many distinct kernels 706 where each kernel 706 only requires subsets of the full data. With this kernel 706, the system can then provide an offline style way of executing for free.

If the developer wishes to run their kernel 706 in an online environment, such as a central energy facility, they can specify a sequence 708. This sequence 708 can provide all the necessary configuration details to run the kernel 706 against a live system such as data points to collect and dispatch, endpoints for communication and execution order of kernels 706. The sequence 708 can also drive a test environment configuration to allow the developer to quickly see their kernel 706 in action both offline and online.

Finally, context-driven development by relying on metadata driven models enables automatic documentation. These documents can automatically update with each new version to ensure users have reliable reference information.

The underlying platform that utilizes the contexts 704, the kernels 706, and the sequences 708, the A3S platform 714, does not require redeployment if a developer decides to change the contexts 704, the kernels 706, and/or the sequences 708. The context can be a special dynamic link library (DLL) based package that the A3S platform 714 can be configured to bring to life in order to enable user interfaces and/or algorithm execution. This allows external developers to use the platform in this fashion or to actually extend what a primary developer has already configured the platform to do.

Coupled Example

External systems have two choices when interfacing with the CML 710, coupled and decoupled. The coupled case, referenced in this section, simply refers to using the concrete classes directly. Once created, the developer can update properties and eventually hand off the model and some options to a kernel for execution.

Consider central plant optimization (CPO) as an example, the context for CPO, known as the allocator context, in conjunction with high level allocator kernels can solve the energy distribution of central energy facilities. Consider the following code example to create a solvable plant,

```
var startTime = new DateTime(2016, 5, 1);
// Create plant and its high-level items because the CML is pattern
driven the developer must use TheFactory to create patterns from
their base classes.
var plant = TheFactory.Assemble<Plant>("Plant", "Plant");
var chillerTowerSubplant =
TheFactory.Assemble<Subplant>("ChillerTowerSubplant", "Chilller And
Tower Subplant");
var chilledWaterResourcePool =
TheFactory.Assemble<ResourcePool>("ChilledWaterResourcePool",
"Chilled Water");
var electricityResourcePool =
TheFactory.Assemble<ResourcePool>("ElectricityResourcePool",
"Electricity");
var waterResourcePool =
TheFactory.Assemble<ResourcePool>("WaterResourcePool", "Water");
var electricitySupplier =
TheFactory.Assemble<Supplier>("ElectricitySupplier", "Electricity
Supplier");
var waterSupplier = TheFactory.Assemble<Supplier>("WaterSupplier",
"Water Supplier");
var chiller = TheFactory.Assemble<PrimaryEquipment>("Chiller",
"Chiller 1");
var tower = TheFactory.Assemble<PrimaryEquipment>("Tower", "Tower
1");
var chilledWaterLoadCoil =
TheFactory.Assemble<LoadCoil>("ChilledWaterLoadCoil", "Chilled Water
Load Coil");
var electrcityLoadCoil =
TheFactory.Assemble<LoadCoil>("ElectricityLoadCoil", "Electricity
Load Coil");
var linearPeformancModel =
TheFactory.Assemble<PerformanceModel>("ChillerTowerSubplantLinearModel
", "Linear Performance Model");
// Add children
chillerTowerSubplant.AddChild(chiller, tower, linearPeformancModel);
chilledWaterResourcePool.AddChild(chilledWaterLoadCoil);
electricityResourcePool.AddChild(electrcityLoadCoil);
plant.AssetLayer.AddChild(chillerTowerSubplant,
chilledWaterResourcePool, electricityResourcePool,
waterResourcePool, electricityResourcePool, electricitySupplier,
waterSupplier);
// Connect asset layer
plant.AssetLayer.AddChild(Node.CreateNode(1, Domain .Asset,
"ChilledWater", chillerTowerSubplant, chilledWaterResourcePool));
plant.AssetLayer.AddChild(Node.CreateNode(2, Domain .Asset,
```

```
"Electricity", electricitySupplier, electricityResourcePool));
plant.AssetLayer.AddChild(Node.CreateNode(3, Domain .Asset,
"Electricity", electricityResourcePool, chillerTowerSubplant));
plant.AssetLayer.AddChild(Node.CreateNode(4, Domain.Asset, "Water",
waterSupplier, waterResourcePool));
plant.AssetLayer.AddChild(Node.CreateNode(5, Domain.Asset, "Water",
waterResourcePool, chillerTowerSubplant));
// Add timeseries data, single point is all that's needed
plant.Weather.Drybulb.Default.AddValue(new Value(startTime, 70), new
CompositeUnit(Unit.DegreesFahrenheit));
plant.Weather.Wetbulb.Default.AddValue(new Value(startTime, 60), new
CompositeUnit(Unit.DegreesFahrenheit));
electricitySupplier.Rate.Default.AddValue(new Value(startTime,
0.01), new CompositeUnit(Unit.Monies) / new
CompositeUnit(Unit.KiloWattHour));
waterSupplier.Rate.Default.AddValue(new Value(startTime, 0.01), new
CompositeUnit(Unit.Monies) / new CompositeUnit(Unit.Gallon));
chilledWaterLoadCoil.LoadConsumed.Default.AddValue(new
Value(startTime, 2500), new CompositeUnit(Unit.TonsRefrigeration));
electrcityLoadCoil.LoadConsumed.Default.AddValue(new
Value(startTime, 5000), new CompositeUnit(Unit.KiloWatt));
// Update quantities
chiller.GetResourceByName("ChilledWater"),IndependentData.Capacity.Update
(3000, new CompositeUnit(Unit.TonsRefrigeration));
chiller.GetResourceByName("ChilledWater"),IndependentData.MinimumTurndown
.Update(1000, new CompositeUnit(Unit.TonsRefrigeration));
tower.GetResourceByName("CondenserWater"),IndependentData.Capacity.Update
(5000, new CompositeUnit(Unit.TonsRefrigeration));
tower.GetResourceByName("CondenserWater"),IndependentData.MinimumTurndown
.Update(500, new CompositeUnit(Unit.TonsRefrigeration));
linearPeformancModel.GetAttribute<Quantity>("DrybulbMin").Update(-
100, new CompositeUnit(Unit.DegreesFahrenheit));
linearPeformancModel.GetAttribute<Quantity>("DrybulbMax").Update(200
, new CompositeUnit(Unit.DegreesFahrenheit));
linearPeformancModel.GetAttribute<Quantity>("RelativeHumidityMin").Update
(0, new CompositeUnit(Unit.Percent));
linearPeformancModel.GetAttribute<Quantity>("RelativeHumidityMax").Update
(100, new CompositeUnit(Unit.Percent));
linearPeformancModel.GetAttribute<Quantity>("ChilledWaterToElectricity
Factor").Update(0.16, new CompositeUnit(Unit.None));
linearPeformancModel.GetAttribute<Quantity>("DrybulbToElectricityFactor
").Update(0, new CompositeUnit(Unit.KiloWatt) / new
CompositeUnit(Unit.DegreesKelvin));
linearPeformancModel.GetAttribute<Quantity>("RelativeHumidityToElectricity
Factor").Update(0, new CompositeUnit(Unit.KiloWatt));
linearPeformancModel.GetAttribute<Quantity>("ChilledWaterToWaterFactor
").Update(0.001, (new CompositeUnit(Unit.Gallon) / new
CompositeUnit(Unit.Hour)) / new
CompositeUnit(Unit.TonsRefrigeration));
linearPeformancModel.GetAttribute<Quantity>("DrybulbToWaterFactor").
Update(0, (new CompositeUnit(Unit.Gallon) / new
CompositeUnit(Unit.Hour)) / new CompositeUnit(Unit.DegreesKelvin));
linearPeformancModel.GetAttribute<Quantity>("RelativeHumidityToWater
Factor").Update(0, (new CompositeUnit(Unit.Gallon) / new
CompositeUnit(Unit.Hour)));
plant.Refresh( );
```

Example Code 7, Example Use Case of the CML

Once the plant is created, the planning asset allocator kernel can solve it and propose how to control it optimally,

```
var solverOptions = new PlanningAssetAllocatorOptions( );
solverOptions.PlanStart.Update(startTime);
solverOptions.PlanEnd.Update(startTime + new TimeSpan(7, 0, 0, 0));
var result = solverOptions.Solve<DataBox>(plant, null);
Assert.AreEqual(SolverStatus.Success, result.StatusInfo.Status);
```

Example Code 8, Solve Example Model in the CML

Decoupled Example

The decoupled example assumes that the external system 716 owns its own concrete classes. In this scenario, the CML 710 provides various views that give all the metadata from the context 704 to the external system 716. The external system 716 can then use this information to create an XML input that the CML 710 then parses back into its own concrete form along with data to run kernels.

The CML 710 can export the metadata provided by a developer to an external system in XML format. This XML contains all the relevant information to create a custom setup around the algorithm's metadata. For example, for any entity, all of the attributes and entity information are exported into this XML format:

```
<Entity Urn="HeatRecoveryChiller" Category="PrimaryEquipment"
AllowedChildren="HeatRecoveryChillerLinearModel
HeatRecoveryChillerGordonNgModel" Definition="Uses electricity to
cool chilled water and heat hot water.">
<Attribute
Urn="HeatRecoveryChiller.ChilledWater/
DeltaTemperature|ProcessVariable"
DataType="FlattenedValues" Definition="What is actually happening."
Identifier="ProcessVariable" Category="DeltaTemperature" UnitGroup=
"Default"
ValueType="ContinuousInValue" BoundAction="FlagOnly"
Formula="Difference:TemperatureOut=,TemperatureIn=" />
```

Example Code 9, Example of XML Export Metadata

The example above presents just an HRC with one of its timeseries points for demonstration.

Consider the plant from the CPO coupled example, an XML Schema Definition (XSD) exists that specifies the allowed format of an XML that provides all of the configuration information necessary to reconstruct a plant:

```
<?xml version="1.0"?>
<Model Id="Plant">
  <Entities>
    <Entity Id="Chiller1" Urn="Chiller" />
    <Entity Id="Tower1" Urn="Tower" />
    <Entity Id="LinearPerformanceModel" Urn=
"ChillerTowerSubplantLinearModel" />
    <Entity Id="ChilllerAndTowerSubplant" Urn=
"ChillerTowerSubplant">
      <Child>Chiller1</Child>
      <Child>Tower1</Child>
      <Child>LinearPerformanceModel</Child>
    </Entity>
    <Entity Id="ChilledWaterLoadCoil" Urn="ChilledWaterLoadCoil" />
    <Entity Id="ChilledWater" Urn="ChilledWaterResourcePool">
      <Child>ChilledWaterLoadCoil</Child>
    </Entity>
    <Entity Id="ElectricityLoadCoil" Urn="ElectricityLoadCoil" />
    <Entity Id="Electricity" Urn="ElectricityResourcePool">
      <Child>ElectricityLoadCoil</Child>
    </Entity>
    <Entity Id="Water" Urn="WaterResourcePool" />
    <Entity Id="ElectricitySupplier" Urn="ElectricitySupplier" />
    <Entity Id="WaterSupplier" Urn="WaterSupplier" />
    <Node Id="E1" Urn="ChilledWaterAssetNode">
      <Input>ChilledWater</Input>
      <Output>ChilllerAndTowerSubplant</Output>
    </Node>
    <Node Id="E2" Urn="ElectricityAssetNode">
      <Input>Electricity</Input>
      <Output>ElectricitySupplier</Output>
</Node>
<Node Id="E3" Urn="ElectricityAssetNode">
  <Input>ChilllerAndTowerSubplant</Input>
  <Output>Electricity</Output>
</Node>
<Node Id="E4" Urn="WaterAssetNode">
  <Input>Water</Input>
  <Output>WaterSupplier</Output>
</Node>
<Node Id="E5" Urn="WaterAssetNode">
  <Input>ChilllerAndTowerSubplant</Input>
  <Output>Water</Output>
</Node>
<Module Id="AssetLayer" Urn="AssetModule">
  <Child>ChilllerAndTowerSubplant</Child>
  <Child>ChilledWater</Child>
  <Child>Electricity</Child>
  <Child>Water</Child>
  <Child>Electricity</Child>
  <Child>ElectricitySupplier</Child>
  <Child>WaterSupplier</Child>
  <Child>E1</Child>
  <Child>E2</Child>
  <Child>E3</Child>
  <Child>E4</Child>
  <Child>E5</Child>
</Module>
<Plant Id="Plant" Urn="Plant" Key="6a37979c-2add-44e7-96bb-
389cc12d5319">
  <Child>AssetLayer</Child>
</Plant>
  </Entities>
</Model>
```

Example Code 10, Example XML Showing How to Create a CPO Plant

Using the XML from the previous section as an input with a set of data consisting of FQR and Data Type (from the metadata exported) pairs, the external system may call solve in a simple manner:

```
var solverOptions = new PlanningAssetAllocatorOptions( );
solverOptions.PlanStart.Update(startTime);
solverOptions.PlanEnd.Update(startTime + new TimeSpan(7, 0, 0, 0));
var result = solverOptions.Solve<DataBox>(plantXml, dataPairs,
null);
Assert.AreEqual(SolverStatus.Success, result.StatusInfo.Status);
```

Example Code 11, Example of Solving a Decoupled Model

One major field of thought in the industry today surrounds the ability to automatically map from one data model to another. The CML 710 though today does not solve this problem has been setup to enable it. Each point in the CML 710 must specify a definition. This serves two purposes. One it allows document generation to exist, and two it allows ample evidence for a system such as a predictive algorithm to match names.

With the names that algorithm engineers choose along with their definitions, it is possible to create an algorithm that can suggest a mapping between any map on a live site to the kernels themselves. This allows an extreme plug and play environment where the algorithm developer can simply create a kernel and this algorithm will enable it to simply sit on top of any other model in the industry.

Along with this, natural language processing comes free. The user of the system with this algorithm could simply ask about certain data values in the system and the system could quickly display them or describe them.

As presented, a developer can use the CML 710 to model any class they would have otherwise created in C# or created using another metadata based model. By using the CML 710, the developer gains the ability to perform various built in controller actions such as lightweight storage, high-speed transportation, self-healing data model. No database administration is necessary since the model exists within the context, robust data analytics, context-driven development. This eliminates the impact of constant changes to algorithms, auto document generation. The more developers leverage the generality and standards brought forth by the CML 710 the more refined and useful it becomes.

Verifiable Relationship Builder Language
Unit Analysis Engine

Figure 9A:
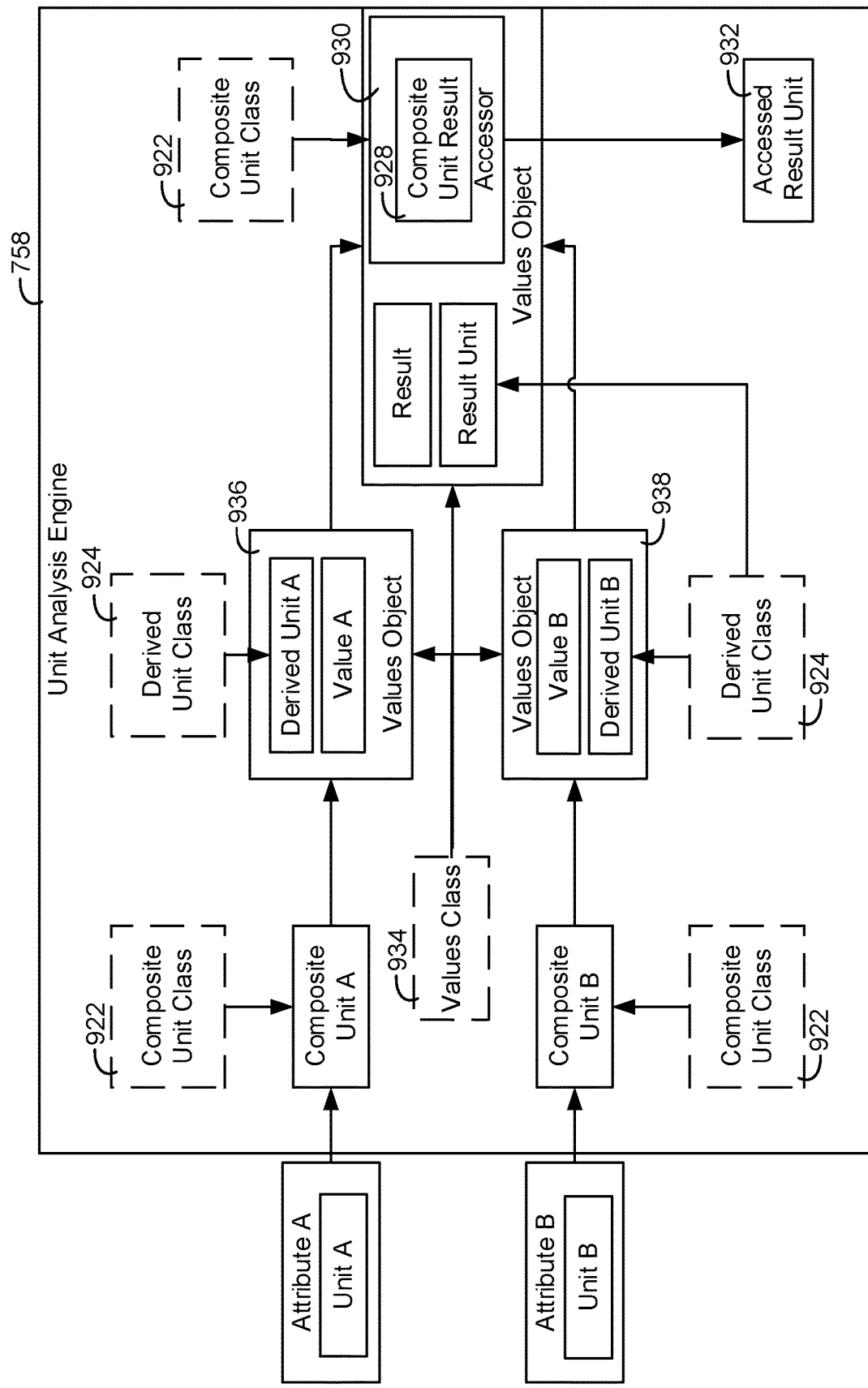
FIG. 9A is a block diagram of a unit analysis engine of the RDS of FIGS. 7A and 7B, according to an exemplary embodiment.

Referring now to FIG. 9A, the unit analysis engine 920 that provides a developer with systems and methods for verifying the mathematical operations they have performed along with performing customer facing unit math for display is shown, according to an exemplary embodiment. Consider the case of multiplying two derivable attributes A and B in the CML 710. If the attribute A was a ton and the attribute B was an hour, then multiplication will generate a result in units of a ton-hour. If the two attributes were added, the result would have a result unit that is "Not a Unit" or a string "NaU". The unit analysis engine 758 can perform operations like these by creating a layered system that relies on derived units defined using the SI base units themselves.

The layered system starts with the derived unit that is defined by the derived unit class 924. The derived unit class 924 can perform all of the underlying unit math when multiplying, dividing, adding, subtracting, and/or working with powers. The derived units class 924 works by tracking the exponent of the following fundamental base units (e.g., meter, kilogram, second, ampere, kelvin, mole, and dollars). Notice that, besides dollars, all of these fundamental units exist in the common SI base unit definition. Tracking these exponents creates a mechanism for unit math. Adding or subtracting two derived units (e.g., the derived unit A and the derived unit B) means that the two unit exponents must match or Not a Unit will result. Whereas, multiplying or dividing values relates to adding and subtracting the exponent arrays respectively.

The fundamental base units can be tracked by the derived units of the derived unit class 924. The base units can be any set of defined units. In some embodiments, the defined set of units are meter, kilogram, second, ampere, kelvin, mole, and dollars. An array or other data object can indicate the power for each of the units. An exponent array can be indicate the power for each of the base units, e.g., [meter power, kilogram power, second power, Ampere power, Kelvin power, mole power, and dollar power]. As an example, $$\frac{kg}{\$^2}$$

could be represented with the exponent array, [0, 1, 0, 0, 0, 0, −2].

Having a developer specify each of their units in base units does not bode well for usability. For example, a user may wish to enter data in whatever unit is most convenient for them. Therefore, the next layer, the composite unit (e.g., the composite unit A and the composite unit B), can map real world units into the derived units. This allows the derived unit to remain as an internal concept that a developer can safely ignore without the fear of mixing up units.

The unit analysis engine 758, using the composite unit class 922, manages a system that maps well-known units into common categories such as tons (e.g., tons of refrigerant) and kW into power. Within each of these categories, a single member maintains a one-to-one relationship with a derived unit, while all other members of the group specify conversion ratios off of a one-to-one unit. As used herein, a derived unit may be a one-to-one unit derived from an input unit. For example, a meter may be a input unit, the derived unit of an input unit of inches.

For example, a Watt, the chosen one-to-one unit for the power group, has the SI base units of $$\frac{kg*m^2}{s^3},$$

which relates to the exponent array of [2, 1, −3, 0, 0, 0, 0]. As the one-to-one unit, the Watt literally has a conversion factor of one to the base units. Using the one-to-one unit of watt, ton (i.e., ton of refrigeration) represents itself as a conversion factor off of watt of 3516.85 (i.e., 1 watt of power is equal to 0.00284345 tons of refrigeration). In this manner, the composite unit can perform unit math on complex conglomerations of units by forgetting the well-known units and working solely with the derived unit.

The derived unit can exist in the classes of the A3S platform 714 (specifically in the analytic 756). One data class, the values class 934, can represent timeseries data. When working with values, the developer may enter data with a composite unit. The values class then automatically converts, via the composite unit, the data into the one-to-one unit and then selects the appropriate derived unit for internal representation. Once converted, the engine can use the data in any number of calculations without requiring any additional unit conversions. This concept creates a highly efficient design that saves on CPU computing cycles.

Once the developer creates an object (e.g., the values object 936 or the value object 368) based on the values class 934 and the system converts it, they may choose to multiply two values classes together. In this scenario, the unit analysis engine 758 will automatically calculate the resultant values class' unit as the multiplication of the two derived units involved in the operation. Once calculated, the developer may choose to access the data and/or the unit for the result (e.g., accessed result unit 932) from the values class by using an accessor 930 that requires a composite unit as an input. Using the composite unit, the values class converts the internal data to the requested unit upon passing out the values. If the composite unit supplied does not have the same one-to-one unit as the result and error will result indicating to the developer that they made a unit error in their work.

FIG. 9A provides an illustrative example of the composite unit class 922, the derived unit class 924, and the values class 934. As shown in FIG. 9A, two separate attributes, attribute A and attribute B and their units, i.e., Unit A and Unit B, are inputs to the unit analysis engine 758. The attributes A and B may be attributes as defined by the CML 710 in FIG. 8 in the data model 799. In some embodiments, the attributes A and B are input by a user via a computing device (e.g., a cell phone, a laptop computer, a terminal, etc.) via a scripting language or are attributes of a data model (e.g., the data model 799).

The unit analysis engine 758 can instantiate an object for each of the attributes, the object being based on the composite unit class 922. The composite unit class 922 can cause the unit A of the attribute A to be mapped into a standard base unit. In this regard, the composite unit class 922 can be configured to determine, based a conversion factor, the input unit A, and an input value of Attribute A, the value A in a base unit and a corresponding derived unit A.

The units A and B may be Amperes. In this regard, the composite units A and B may include a one-to-one conversion factor between a standardized unit and Amperes. In this examples, the standardized unit may be Amperes, i.e., the standardized units may be [meter power, kilogram power, second power, Ampere power, Kelvin power, mole power, and dollar power]. In this regard, both the Derived Unit A and the Derived Unit B may be and/or include an array of [0, 0, 0, 1, 0, 0, 0] while a conversion factor of one may map the values of Attributes A and B into Values A and B.

In FIG. 9A the attributes A and B are represented in the unit analysis engine 758 as values objects defined based on the values class 934. If the two values objects are added together, the result of the resulting values object may be the sum of value A and value B while the result unit may be [0, 0, 0, 1, 0, 0, 0]. However, if the two values are multiplied, the result may be the multiplication of value A and value B (e.g., values object 938 and values object 938) while the result unit may be [0, 0, 0, 2, 0, 0, 0].

Signal Repair Engine

The values class 934, as described with reference to FIG. 9A, can serve as one example of how the signal repair engine 759 can be configured to perform data analytics. The values class 934 can represent a randomly sampled signal that may be discrete or continuous. This values class 934 can have numerous operations applied to it, consider for the exemplary example described with reference to FIG. 9B, multiplication.

Figure 9B:
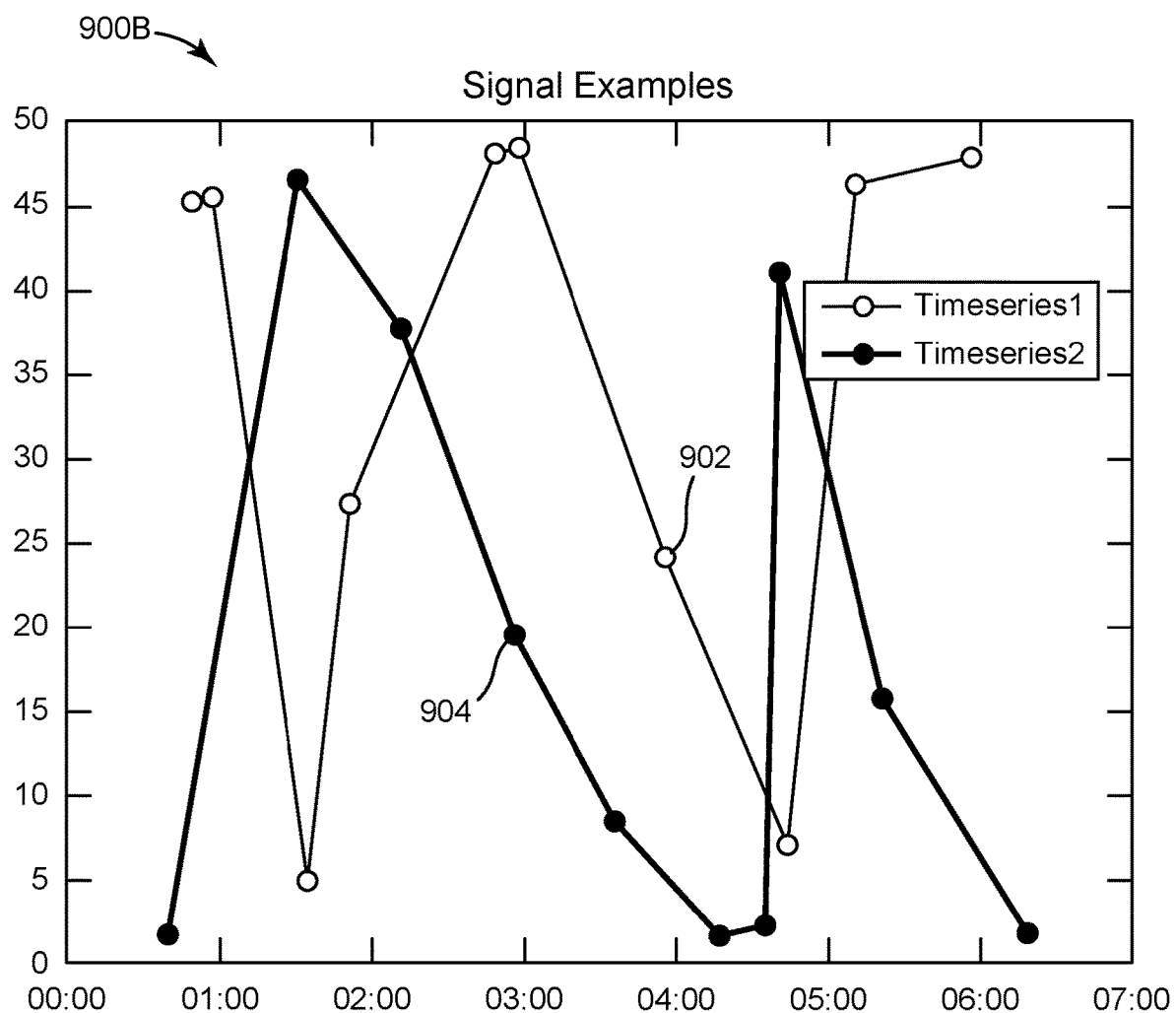
FIG. 9B is a chart of two time series that a signal engine of the RDS of FIGS. 7A and 7B can be configured to utilize in signal repair, according to an exemplary embodiment.

Referring to FIG. 9B, a chart 900B illustrates two time series signals, timeseries1 and timeseries2 represented by markers 902 and 904, according to an exemplary embodiment. When multiplying signals, the signal repair engine 759 can be configured to apply injectable filter kernels into each signal and moves them in tandem to create a function whose order depends on the injected kernel. Using this concept, the signal repair algorithm can create a set of infinite resolution signals. Then the operation running against the signal repair engine 759 can request any time and the repair algorithm can return a collection of values representing each signal at the requested time. The implementation relies on low level index management to ensure both no additional memory beyond the original signals is used and seeking indexes is order N. Examples of a filter kernel may be a Lanczos Kernel used for Lanczos resampling, a kernel for Bicubic interpolation, or any other kernel for any interpolation process.

In FIG. 9B, the time series each have 10 samples. Consider if the provided signals each have 10 randomly placed samples like in FIG. 9B. The signal repair algorithm builds a kernel for each series and loads the appropriate number of points into the tap positions. The repair algorithm then takes all 20 time positions and starting with the first requests the value from each kernel. Once the requested time moves past the last sample in the forward taps, the kernel advances by loading further sample references and dropping those in the past. For a linear interpolation kernel, edge behavior is set to hold the nearest point. Therefore, when multiplying the two signals of FIG. 9B, each having 10 data points, if none of the data points line up on the x-axis, the resultant signal from the multiplication will include 20 data points. Visually, if one were to draw lines straight up and down in FIG. 9B at each of the 20 points of the two signals, one could multiply the points where those lines intersect the interpolated signals, generating 20 new points.

Operations Engine

Leveraging the unit analysis engine 758 and signal repair engine 759, the operations engine 761 form a mechanism capable of doing work against collections of data classes, e.g., the values class 934. Within the operations engine 761, there may be thirty or more current built-in operations available. Each of these operations can exist as direct, temporal, and/or spatial. The direct operator does not perform a default signal reconstruction technique on the entering values classes and allows full control over how to apply the data analytic to the incoming data. An example of this may be a coalesce operation that the operations engine 761 can perform. In this operation, the system scans many signals using time based windows. Working through a collection of values classes 934 in a certain order, the operation engine 761 can be configured to scan for data in upper signals where gaps larger than the window exist, and then scans the lower signal data within the window searching for data to fill the gap. Therefore, the use case requires custom management of the signal repair algorithm which fits perfectly into a direct operator.

Whereas, the other two types rely on pre-work done by the signal repair algorithm to line up the data, just like in the signal repair example. The spatial operator applies across signals at each sample time and the temporal applies data to each set as a whole. Sum serves as a good example of a spatial operator, where at each sample time it sums the values to form the new signal. A running sum can serve as a good example of a temporal operator, where it sums a signal from start to end saving its current value into each sample time as it moves along.

These operations also maintain input characteristics definitions that the caller can be required to follow to enable computation. This can be understood in view of a prototype for functions in C. The equation engine 763 can be configured to directly implement these prototypes into regular expressions to allow runtime parsing of equations.

Equation Engine

The equation engine 763 can be configured to culminate all the previous engines (i.e., the unit analysis engine 758, the signal repair engine 759, and the operations engine 761) together to form a highly flexible equation solver that can use values objects of the values class as inputs. The equation engine 763, utilizing the operations engine 761, can be configured to parse a string into an order of operations using the prototypes provided by the operations engine 761. This order of operations then can be executed sequentially to reach the result the equation intended. Such a concept, requires a great deal of precision engineering to ensure it can handle anything and process robustly.

Consider an example, (a+b)/(mean(c)−d). In this example, the equation engine 763 can be configured to parse the string into single operations:

$$r1 = a+b \qquad 1.$$

$$r2 = \mathrm{mean}(c) \qquad 2.$$

$$r3 = r2 - d \qquad 3.$$

$$r4 = r1/r3 \qquad 4.$$

This order of operations can be executed and the final result can be returned.

The Analytic

The analytic 756 can be an engine that implements a scripting language that combines equations with actions implemented by a caller. This language used within a user interface generated and/or managed by the analytic 756 can enable a user to perform custom data analytics that extend the base form of the CML 710 itself then using that data run various actions. This allows the developer to focus on the core aspects of their data model (e.g., the data model 799) and rely on the analytic 756 to abstract away any custom requests. This concept can provide an irreplaceable separation of special user facing requirements from the developer's algorithm requirements. The example analytic below provides valuable insight into its functionality.

```
ch1Eff = <Chiller1:Chiller.Efficiency>
ch2Eff = <Chiller2:Chiller.Efficiency>
ch1Cop = 3.516 / ch1Eff
ch2Cop = 3.516 / ch2Eff
meanChCop = mean(ch1Cop, ch2Cop)
plantEff = <ChillerSubplant:ChillerSubplant.Efficiency>
plantCop = 3.516 / plantEff
plot(plantCop[none], meanChCop[none])
```

Example Code 6

The first two lines provide an example of setting a variable equal to a point within the data model 799. Once set, the user then can use these variables, as shown by the lines following, to perform normal operators like multiply or divide, add or subtract etc. Once complete, the final line presents the use of an action. In essence, an action provides the way out of an analytic, in this case to plot the two data sets in units of none. Lines like these may also contain an identifier out front in the form plot1 :plot( . . . ). This enables the actions to extend to multiple lines.

Figure 9C:
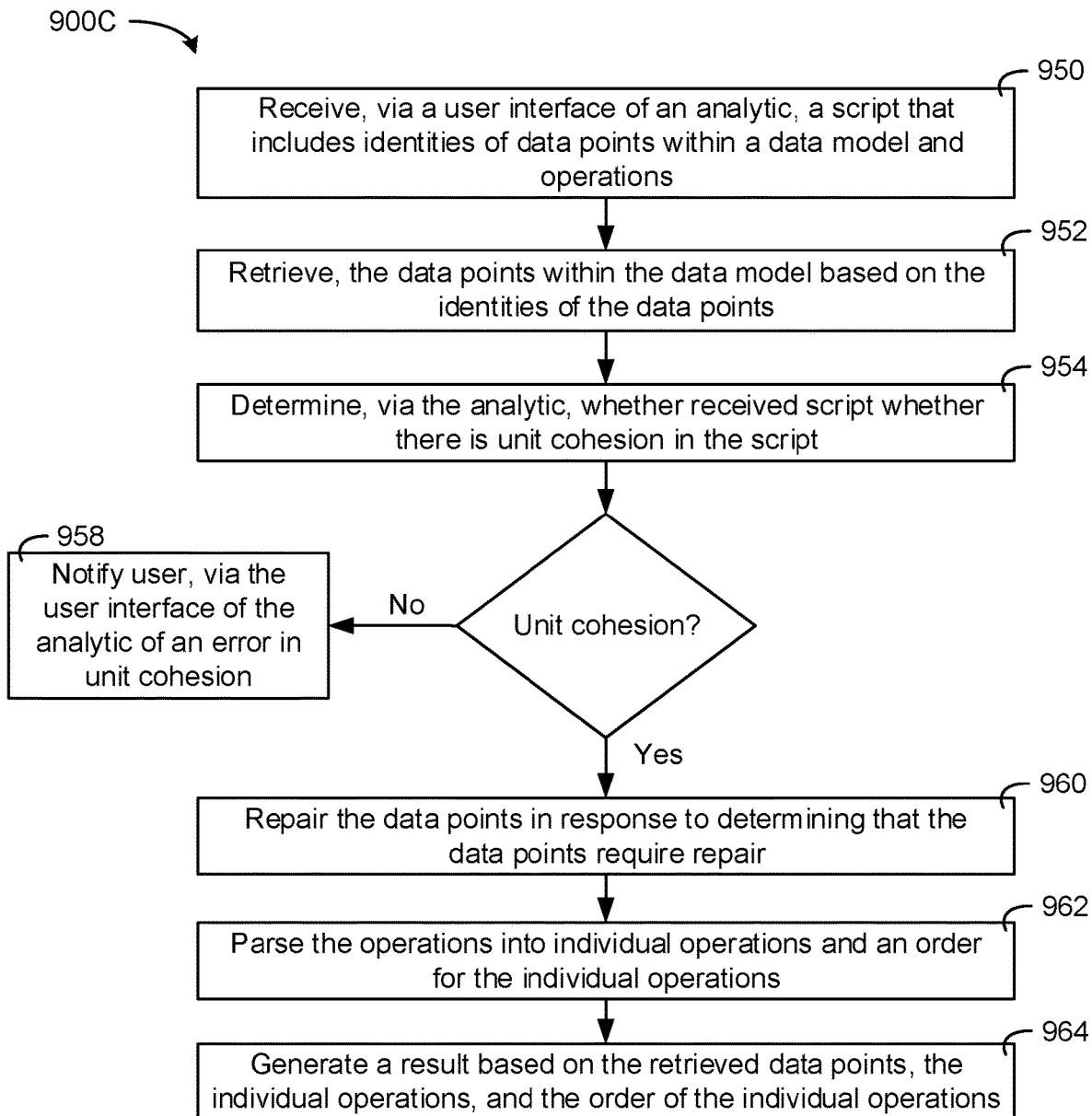
FIG. 9C is a flow diagram for a process for receiving and executing a script that can be performed by an analytic of the RDS of FIGS. 7A and 7B, according to an exemplary embodiment.

Referring now to FIG. 9C, a process 900C for receiving and executing a script is shown, according to an exemplary embodiment. The analytic 756 can be configured to perform process 900C. Further, any computing device described herein can be configured to perform the process 900C.

In step 950, the analytic 756 can receive a script input by a user. The script can identify data points of the data model 799 and can include operations to perform on the identified data points. The script can be received from the user via an interface that allows a user to type and/or otherwise enter the identities of the data points and the operations to perform on the data points. The user can input the script via a user device (e.g., a laptop, a mobile device, etc.). An example of a script that can be input by a user is Example Code 6.

In step 952, the analytic 756 can retrieve the values for the data points from the data model 799 based on the identities of the data points. The identities of the data points can be, for example, "ch1Eff=<Chiller1:Chiller.Efficiency>" as shown in Example Code 6. This line of the script of Example Code 6 may cause the analytic to retrieve a data point based on the identifier "Chiller1:Chiller.Efficiency."

In step 954, the analytic 756 can determine whether there is unit cohesion in the received script. The analytic 756 can perform unit math on the script with the unit analysis engine 758 to verify that the none of the values determined by the script result in "not a number"

$$\left(e.g., \$ - \frac{m}{kg}\right).$$

Furthermore, the unit analysis engine 758 can compare a result unit to an expected unit. For example, if the resulting determination of the script is a point for temperature for a zone in Fahrenheit in the data model 799, the analytic 756 can determine whether the unit of the result is in Fahrenheit.

If there is not unit cohesion, the process 900C can proceed to step 958. If there is unit cohesion, the process 900C can proceed to step 960. In step 958, the analytic 756 can notify a user that there is an error in unit cohesion in the received script. In some embodiments, the analytic 756 may provide a pop up notification on the interface indicating that there is an error in the unit math. The notification may identify which result and/or which points used to determine the result have resulted in an error in unit cohesion. In some embodiments, the analytic 756 underlines the entered values involved in the determination or the associated mathematical operation to identify to the user where an error in unit cohesion in the script is present.

In step 960, the analytic 756 can perform data repair on any of the retrieved data points. In some embodiments, the signal repair engine 759 can perform step 960. Based on the script, the signal repair engine 759 can determine whether step 960 is required. For example, a time series may not have a data point at a particular time, the data point being required in the script for the particular time. The analytic 756 can be configured to identify if a data point of the time series is not available and can determine to perform signal repair in response to determining that a value is not available but can be determined by performing signal repair. Furthermore, the script may include a user input operation to perform signal repair algorithm for identifying particular data points for data series at particular times.

In some embodiments, the retrieved data points may be two different vectors of temperature values for two different zones of a building. The script may be implementing the multiplication between the two temperature vectors. The two vectors may not include temperature points that line up in time, in this regard, interpolation can be performed on one or both of the time series. As another example, the script may be requesting the multiplication of temperature time series at 10 A.M. However, one or both time series may have temperature measurements for the points surrounding 10 A.M. on the particular day but not at the particular time. In this regard, interpolation can be performed to determine a data point for 10 A.M. for one or more both timeseries and the result may be the multiplication of the resulting interpolated data points.

In step 962, the analytic 756 can parse the operations of the script into one or more individual operations and can generate a proper order for executing the isolated operations. In some embodiments, the operations engine 761 can be performed to perform the operation isolation and ordering. The operations can be isolated into single operations, for example, $$\frac{(x+y)}{356},$$

can be isolated into a first operation z=x+y and a following operation $$\frac{z}{356}.$$

In step 964, the analytic 756 can run the script received in step 950 and generate a single result or multiple results. Executing the script can involve performing various calculations to generate results and/or performing various signal analysis and/or repair operations. In some embodiments, the analytic 756 can generate one or more graphics (e.g., a line chart, a bar chart, a table, etc.) identifying the results of the script. The analytic 756 can cause the result to be stored in the data model 799. For example, the analytic 756 can be configured to determine if the result should be stored at a point or points of the data model 799 based on the script (e.g., the script includes a line saving the result to the data model 799).

In some embodiments, the result of the script may be a value that can be used to control environmental conditions of a building by controlling building equipment of the building. As an example, the result of the script may be an operating setpoint for a piece of building equipment which can be stored in the data model 799 and then used to operate the building equipment. In some embodiments, the script creates commissioning information, e.g., a virtual point of the data model 799. In some embodiments, the script is executed with the data model 799 at runtime of the system. The script can generate results which can be viewed in various user interfaces for commissioning. As an example, a user could generate a difference between two different temperature values for two different zones stored by the data model 799. The script could trend this virtual point, the difference between the two temperature values, so that the anomalous behavior can be identified. If the difference increases by a predefined amount, the user, or the A3S platform 714, can identify that the equipment servicing one of the zones has experienced a fault.

Rapid Deployment Suite (RDS)

The rapid deployment suite (RDS) 712, aims at providing a generalized service to developers that leverage the CML 710. It enables a generic user interface (the view in the design pattern) for editing, simulating, analyzing, commissioning, monitoring and configuration of a live system for any model a developer can create using the CML 710. This tool can display these views for any data model. Therefore, once the user interface (UI) exists, context-driven development allows developers to focus on creating well-crafted algorithms.

The most common pit-fall of generic UIs surrounds their high-coupling to the engineering view of the algorithm. To correct this, RDS application 712 enables an application designer to tackle the challenge of allowing custom views to abstract away the engineering view. The following sections will dive into each of these components.

Model Designer

Figure 10:
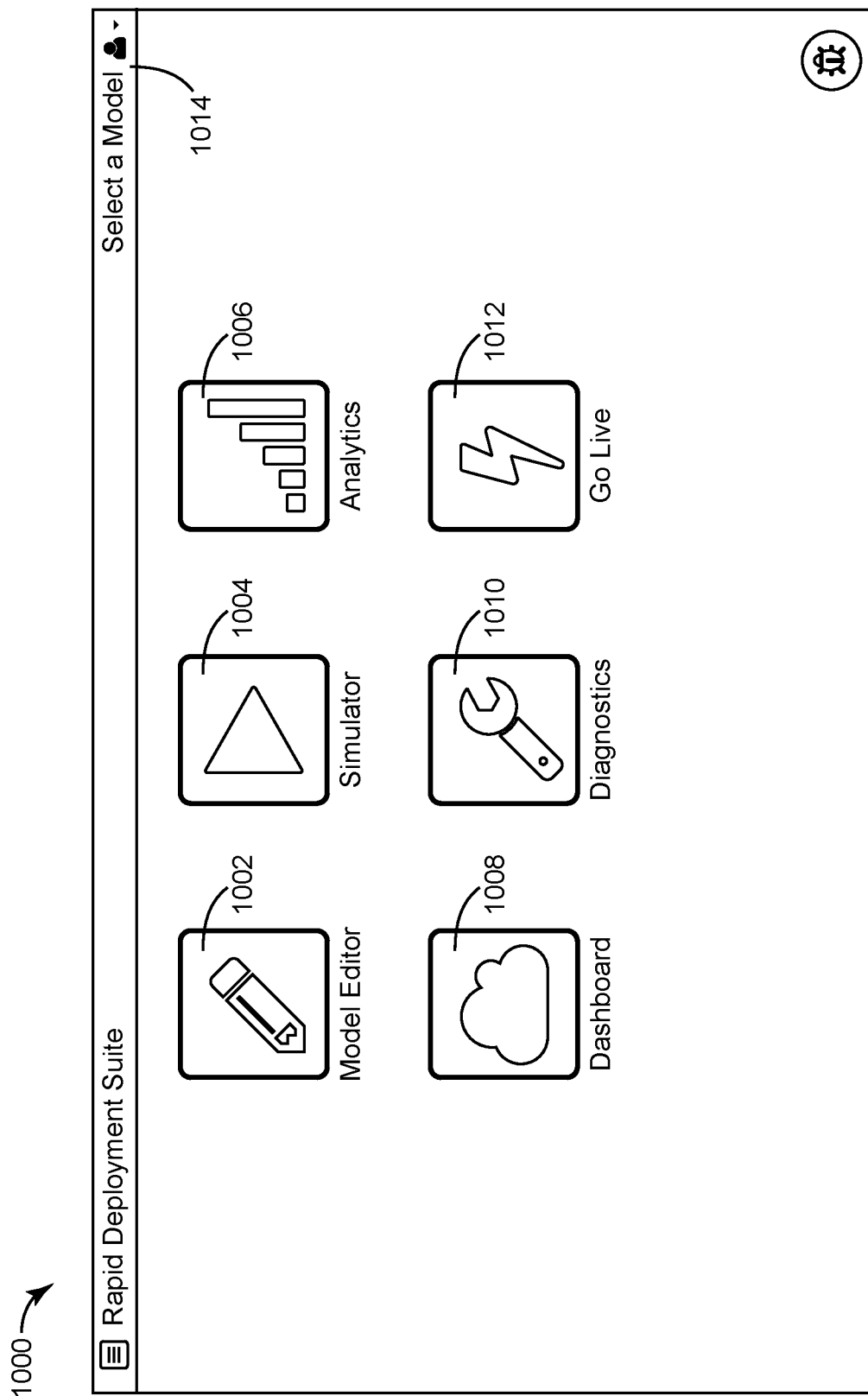
FIG. 10 is a home-screen interface of the model designer of the RDS of FIGS. 7A and 7B for generating and updating a context, according to an exemplary embodiment.

Referring now to FIG. 10, a homepage 1000 for the RDS application 712 is shown, according to an exemplary embodiment. The RDS application 712 relies on a single active model throughout the entire application (e.g., the data model 799). Model selection 1014 of the homepage 1000 enables a user to switch between models. The active model (e.g., the selected model) drives all of the applications of the RDS application 712. Using the active model, each tool only uses the points specified by the underlying context of the selected model. The homepage 1000 provides easy navigation between the six built-in tools. Model editor option 1002 enables a user to navigate to a model editor as described in further detail herein.

Simulator option 1004 enables a user to navigate to a simulator (e.g., the simulator 754). Analytics option 1006 allows a user to navigate to analytics pages for the selected model. Dashboard option 1008 enables a user to navigate to a dashboard for the selected model. Diagnostics option 1010 enables a user to navigate to a set of pages including diagnostic information for the selected model. The go live option 1012 enables a user to navigate to a page or set of pages for the go live service 772. The go live service 772, enables a user to bring the model they've created to a live system. The go live service 772 is described in further detail herein, specifically with reference to FIG. 7B. An example of a dashboard is dashboard 1400B as described with reference to FIG. 14B. It also allows, on the top right, access to the active model (or creating a new one) and various user settings and notifications.

Figure 11:
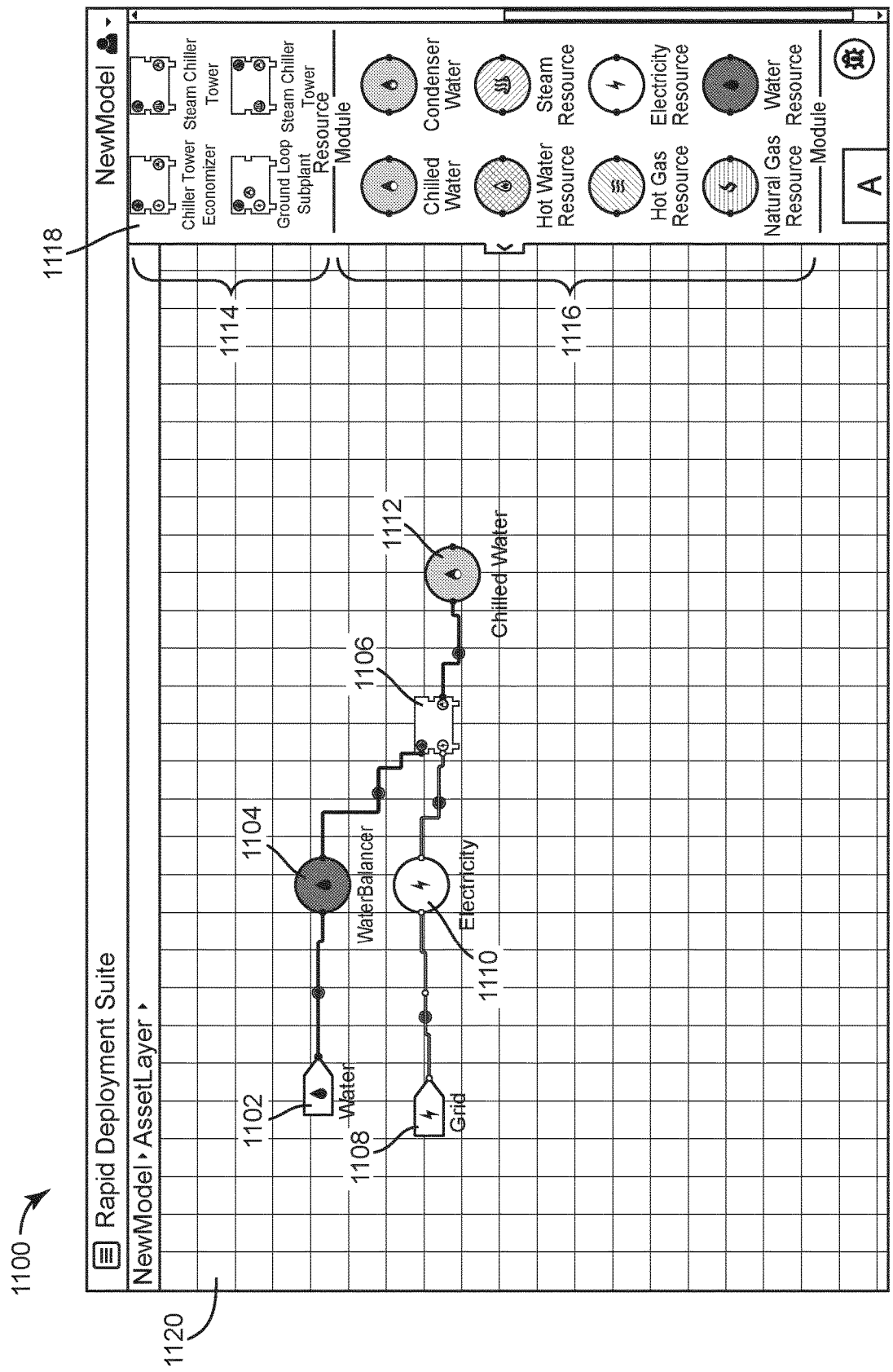
FIG. 11 is a drag and drop interface for creating or editing a context via the model designer of the RDS of FIGS. 7A and 7B, according to an exemplary embodiment.

Referring now to FIG. 11-12, wiring interface 1100, for the model designer 752 of the RDS application 712 is shown, according to an exemplary embodiment. At the core of the RDS platform 712, centered around algorithms, lies the ability to create, edit and deploy data models for those algorithms. The CML 710 provides the brunt of the functionality necessary to create various contexts and kernels and get a working system.

The RDS application 712, specifically the model designer 752, provides a user the ability to view and edit these models. However, to remain generic, specific functionality from each context 704 must not exist. Any visual concepts desired by users or developers to exist in the RDS application 712 may need to first exist within the CML 710 so the context developer may implement the features. One such example surrounds the ability to connect entities together.

The model designer 752 provides a standard view that allows creating and editing entities e.g., the interface 1100. The CML 710 provides two main classes as described with reference to FIG. 8, the entity 804 and the attribute 806. Developers should leverage entities 804 wherever possible using existing attributes 806 to provide immediate pull through to the view in RDS application 712. If a developer chooses to extend the list of attributes, the RDS application 712 must also extend to describe how to get data from the user by creating a new sub-view.

The model designer 752 can include two main parts, an entity modeling system and an attribute editing system. Consider the snippet of code provided for the CPO coupled example, three main parts exist: creating entities, connecting entities, and updating attributes of these entities. The model designer 752 provides a simple palette to drop blocks down onto a screen, wires these blocks using a node driven approach and track positions and scales.

Once the user drops, organizes and connects their entities they can edit their properties at any time through the workflow they grow in. Double clicking on an entity will pull up the, developer defined, attributes available for the entity. This view contains all of the attributes the entity has required for the target kernels selected at model creation. Each of these attributes may use a different attribute type with the CML 710 or context, and must maintain a custom view within the RDS application 712 or reuse another type's view. The RDS application 712 expects new attributes. Therefore, it requires little work to extend more views into its framework.

Referring more particularly to FIG. 11, interface 1100 of the model designer 752 is shown for connecting elements of a selected model. A user can interact with interface 1100 of the model designer 752 via a laptop computer, a desktop computer, a tablet computer, and/or any other computing device or terminal. The interface 1100 can be a web browser based interface or a standalone program.

A user can drag and drop various component elements from the element pallet 1118 onto the grid 1120. As shown, interface 1100 illustrates a waterside system model. Utility elements 1102 and 1108 represent a water utility and an electric utility. Elements 1104 represents a water balancer that can distribute water throughout a building. Element 1110 represents electricity that the building and/or the components of the model of interface 1100 can consume. Element 1106 can represent a plant, for example, a chiller tower economizer, a steam chiller tower, a ground loop subplant, a steam chiller subplant, and/or any other plant or combination of plants. The plant element 1106 is shown to consume water, from element 1104, an electricity, element 1110 to product chilled water, element 1112. The elements of interface 1100 can be edited and configured by a user. Interface 1100 of FIG. 12A includes an example of editing attributes of an element. Various examples of subplants and resources being interconnected via wire connection diagrams are included in U.S. application Ser. No. 15/473,496 filed Mar. 29, 2017, the entire disclosure of which is incorporated by reference herein.

As can be seen, a user can drag and drop elements and subplants from palette 1118 onto grid 1120. The user can position, rotate, and otherwise manipulate the location and orientation of the elements on grid 1120. The user can connect the various elements via graphic wires. The wires may indicate which resources flow and inputs and outputs of plants. The wires may be color coded based on element. For example, a wire may be yellow indicating electricity. In a similar manner, a wire can be colored blue to signify water. Blue lines may signify cold water while red lines may signify hot water. Further, a wire could be colored grey to signify steam, etc.

Each of the subplants of subplant palette 1114 may indicate various inputs and outputs of the plant. For example, the inputs to a chiller tower economizer may be water and electricity while the output may be chilled water. Each of the resources of the resource palette 1116 may indicate a particular element that can be consumed or produced by a plant. For example, the resources may be chilled water, hot water, steam, electricity, etc.

Figure 12A:
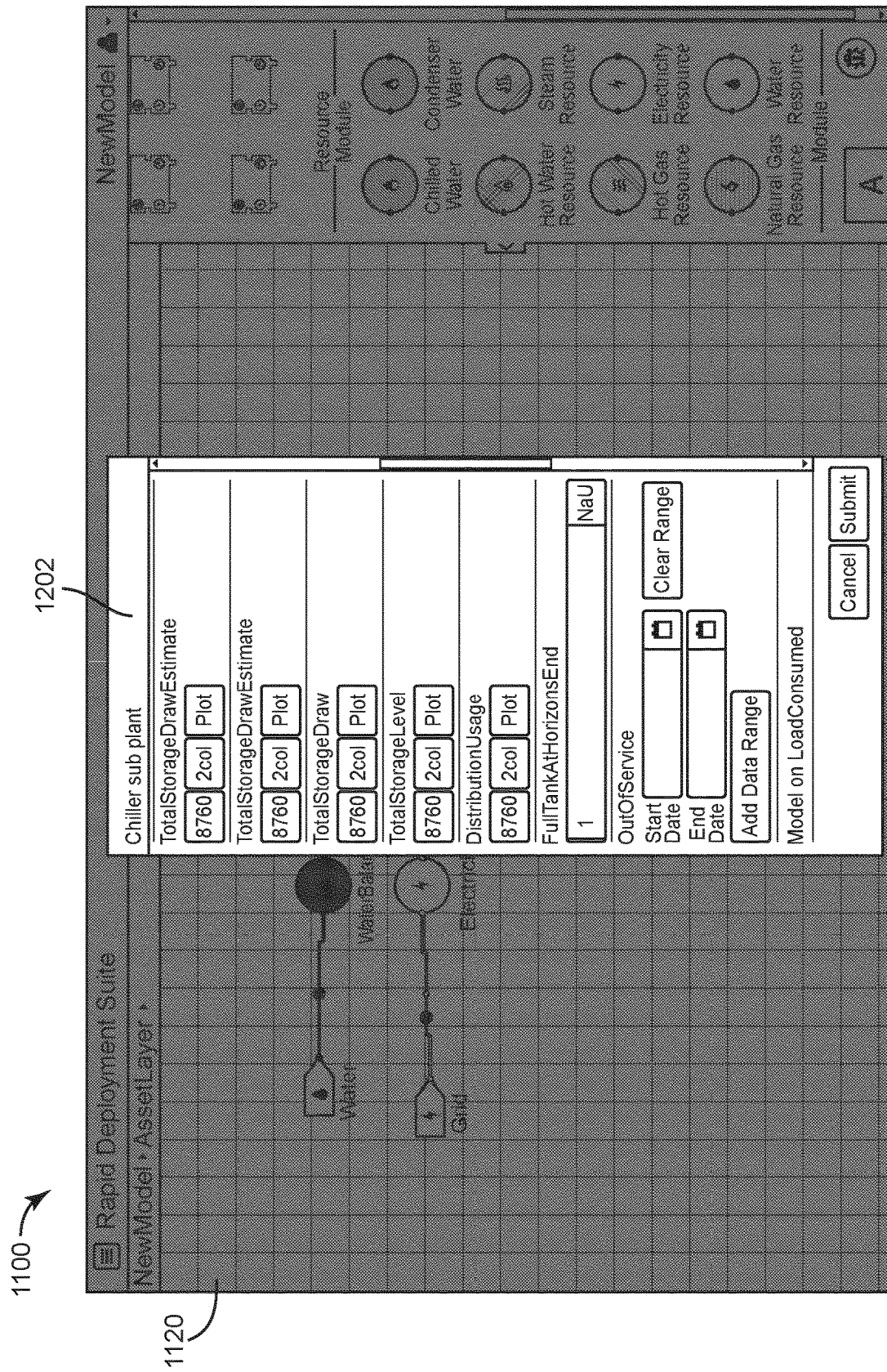
FIG. 12A is the drag and drop interface of FIG. 11 include a editing window for editing the parameters of equipment of the interface of FIG. 11 according to an exemplary embodiment.

Referring more particularly to FIG. 12A, interface 1100 is shown for editing attributes of one of the elements of the grid 1120. Window 1202 may appear in interface 1100 in response to a user interacting with (e.g., clicking, tapping, etc.) one of the elements on the grid 1120. The window 1202 may allow the user to enter, adjust, select, or update various attributes of the selected element. In FIG. 12A, the selected element is a chiller subplant (e.g., the subplant element 1106). The user can select or adjust the total storage draw, a total storage level estimate, a total storage draw, a total storage level, a distribution usage, and/or other attributes of the subplant element 1106. Further, an out of service range of dates can be set for the subplant element 1106 via window 1202.

The model as defined by the interface 1100 can be used to perform various optimizations. For example, various load balancing and load reduction techniques can be used based on the model that a user inputs via the interface 1100. For example, optimizations such as economic load demand response (ELDR), frequency regulation (FR), and/or various other optimizations can be performed based on the defined model. These optimizations may utilize a cost function that is based on the equipment of a building. Examples of such optimizations can be found and cost functions are provided in U.S. patent application Ser. No. 15/616,616 filed on Jun. 7, 2017, the entirety of which is incorporated by reference herein.

Figure 12B:
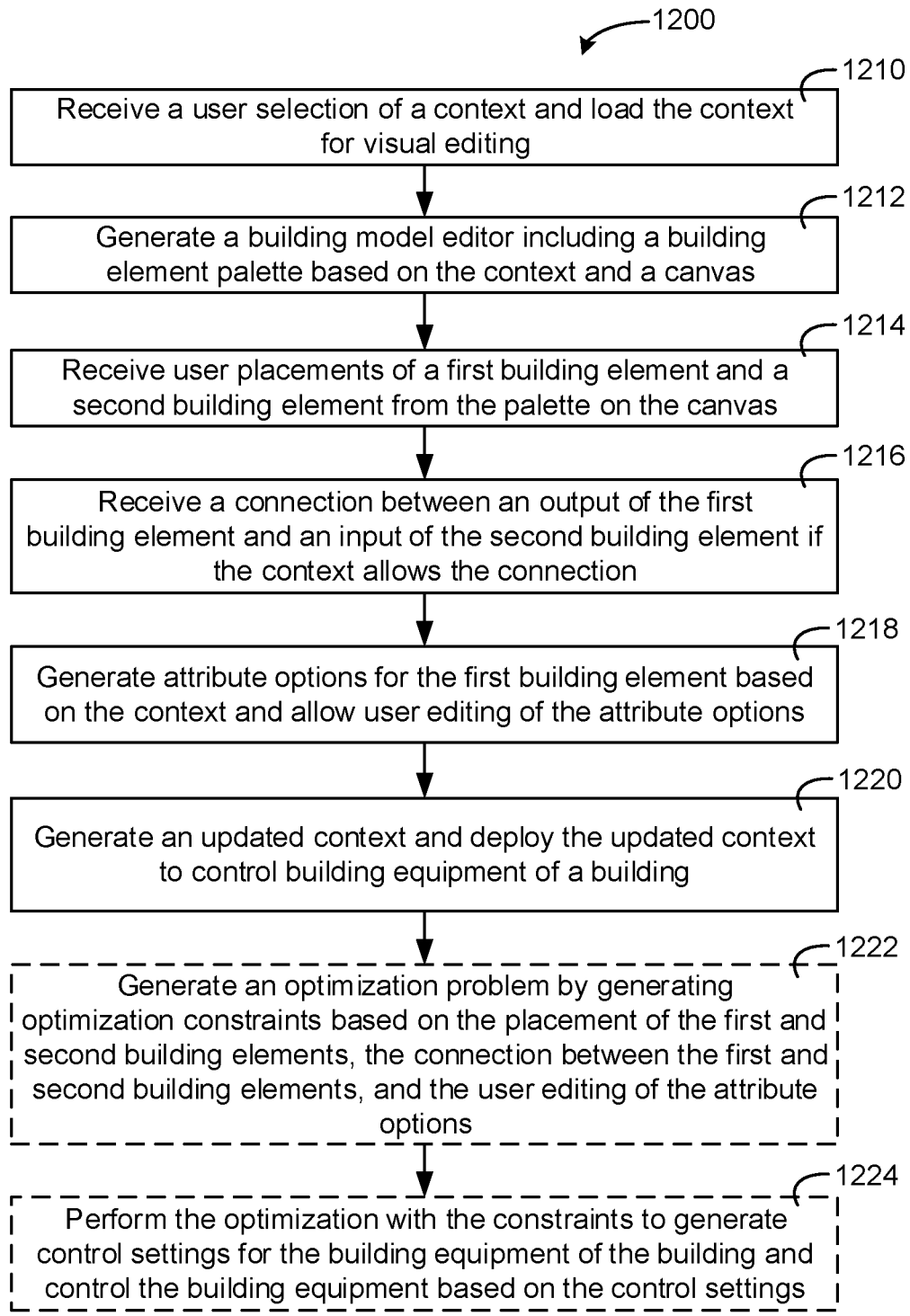
FIG. 12B is a flow diagram of a process for using the interface of FIG. 11 to edit a context, according to an exemplary embodiment.

Referring now to FIG. 12B, a flow diagram of a process 1200 for allowing a user to edit the context 704 via the interfaces of FIGS. 11 and 12A is shown, according to an exemplary embodiment. The process 1200 can be performed by the A3S platform 714, specifically by the model designer 752. In this regard, the model designer 751 and/or the A3S platform 714 can be configured to perform the process 1200. Furthermore, any computing device described herein (e.g., the BAS controller 366) can be configured to perform the process 1200.

The process 1200 can allow a user, via a user device (e.g., a cellphone, a smartphone, a laptop, a desktop computer, a tablet, etc.) to visually view and/or edit the context 704. In this regard, the model designer 752 can generate interfaces for editing and displaying the context 704. The context 704 may be based on the class hierarchy described in further detail in FIG. 8. Specifically, the context 704 can include entities 804 and attributes 806. The entities 804 can be specific building elements (e.g., a resource (e.g., hot water, cold water, electricity, etc.), a subplant (e.g., a chiller), a utility (e.g., an electric utility, a water utility), etc.) that have specific attributes 806. For example, a subplant may have attributes which define the size of the subplant, e.g., the size of a chiller. An electric utility may have an attribute which defines that maximum rate at which electricity can be consumed from the utility. For a particular building resource, the building resource can be defined with the entity 804 and attributes 806.

A particular context 704 may identify what entities 804 are available (e.g., what entities 804 a developer has defined) and the attributes 806 for that entity 804. In this regard, any context 704 that is loaded for editing by the model designer 751 can be specific to the context 704 developed by the developer. The interfaces of the model designer 751, the interface 1100 can be generic and can display information based on what is defined in the context 704. This allows the interface 1100 to edit any kind of building data model, improving reliability of the interface 1100 and reusability of the interface 1100 since the editing rules of the interface 1100 are not entirely hardcoded, they are instead defined based on the context 704.

In step 1210, the model designer 751 can receive a user selection of a context 704 and load the selected context 704 for visual editing via the interface 1100. In this regard, the model designer 751 can provide the interface 1000 and/or the interface 1100 to the user via a user device and allow the user to select a particular model, e.g., a particular context 704. The context 704 can be selected via the select a model option 1014 of the interface 1000. In some embodiments, the context 704 and other contexts are displayed in a drop down list and a user can be prompted to select one of the contexts from the drop down list.

In step 1212, the model designer 751 can generate a building model editor, the interface 1100, which includes a building element palette including multiple building elements and a canvas for connecting the building elements of the building element palette together. In some embodiments, the building element palette is based on the context 704. In this regard, the building element palette may be populated with particular building elements (e.g., resources, subplants, utilities, etc.). The building element palette may include building elements defined by the context 704 via the entities 804. In this regard, the model designer 751 can identify what building elements the context 704 includes and generate the building element palette based on the building elements defined by the context 704.

In step 1214, the model designer 751 can receive user placements of the building elements of the building element palette onto the canvas. In this regard, a user can interface with a display screen or input device of the user device to select a building element of the building element palette and place the building element onto the canvas. The building elements of the building element palette may identify building elements that are possible and are defined by the context 704, the building elements placed onto the canvas may be actual building entities that are part of the building model defined by the context 704.

In step 1216, the model designer 751 can receive a connection between an output of a first building element and an input of a second building element only if the context 704 allows the connection. In this regard, the model designer 751 can identify whether, based on the context 704, a particular connection is allowed or not. Once determined, the model designer 751 can allow only those connections which the context 704 identifies as allowable. An example of such a connection may be connecting an electric resource connected to an electric utility to a subplant. If the subplant is a battery, the input of the battery subplant can be connected to the electric utility resource output. However, if the subplant is a chiller, the water input of the chiller cannot be connected to the electric resource of the utility. Rather than hardcoding these rules into the model designer 751, allowing the model designer 751 to retrieve these connection rules from the context 704 allows for the generic development of the model designer 751 since specific rules can be developed when developing the context 704.

In step 1218, the model designer 751 can generate attribute options for a selected building element. A user may interact with the building element, e.g., click on, the building element and cause another window, e.g., the window 1202 as described with further reference to FIG. 12A to be displayed. The window 1202 may display various attribute options for adjustment by a user via the user device. The attribute options can be defined by the context 704. For example, the context 704 may indicate which attributes 806 are associated with what entities 804, i.e., what options are available for a building element. In this regard, the window 1202 may be a generic interface of the model designer 751 which the model designer 751 determines the specific information for based on the context 751. The user can adjust, update, or change the current settings of the window 1202.

In step 1220, the model designer 751 can generate an updated context 704 based on the user adjustments of the steps 1214, 1216, and 1218, i.e., placing and connecting building entities and selecting attribute values for the building entities. The updated context 1220 can be pushed to a live site to control environmental conditions of the live site (e.g., building), based on the updated context 1220. For example, the go live service 772 can use the updated context 704 to operate a building.

Steps 1222 and 1224 may be optional steps or may be specific to a particular context 704, for this reason they are shown in dashed boshes. The steps 1222 and 1224 can be specific to using the model designer 751 to generate an optimization problem visually and use the optimization problem to select optimal equipment settings for building equipment. Examples of performing optimizations can be found in U.S. patent application Ser. No. 15/616,616 filed on Jun. 7, 2017, the entirety of which is incorporated by reference herein.

In the step 1222, the model designer 751 can generate an optimization problem based on the user inputs of the preceding steps, specifically, based on the placement of the building elements, the connections between the building elements, and the user editing of the attribute options. In some embodiments, this information is used to generate optimization constraints for the optimization problem. Such optimization constraints can be equality or inequality constraints and can be based on the placement and/or attribute settings for the building elements.

An example of an inequality constraint may be one that limits the amount of power $P_{grid,k}$ received from energy grid at any time step k to be less than or equal to the maximum amount of power that the energy grid is able to provide. This inequality constraint is shown by the equation below:

$$P_{grid,k} \leq P_{grid,max}$$

where $P_{grid,k}$ is the amount of power received from an energy grid at time step k and $P_{grid,max}$ is the maximum power that energy grid is capable of providing at any given time step. The maximum power that the energy grid is capable of providing may be a user defined attribute set via the window 1202. The above inequality constraint may be an example of a constraint generated by the model designer 751 in response to determining that an energy grid building element is connected to energy consuming equipment and a user sets a maximum grid power amount.

Another example of an optimization constraint may be an energy balancing constraint. For example, an equality energy balancing constraint may specify:

$$P_{grid,k} - P_{equip,k} - P_{bat,k} = 0$$

where $P_{grid,k}$ is the amount of power received from an energy grid at time step k, $P_{equip,k}$ is the amount of power consumed by building equipment at the time step k, and $P_{bat,k}$ is an amount of power discharged at the time step k (note that when the battery is discharging $P_{bat,k}$ may be a negative number and when charging is a positive number). The model designer 751 can generate such a balancing constraint if the user connects three specific building elements, building equipment (e.g., a chiller subplant), an energy grid, and a battery together such that the building equipment can consume power generated by the grid or the battery and/or that the grid can provide power to the building equipment or receive power from the battery.

In step 1224, based on the constraints generated in step 1222, the model designer 752, or otherwise the A3S platform 714, can perform an optimization with the constraints of step 1222 to determine optimal operating points for one or more time steps. Furthermore, the A3S platform 714 can operate the building equipment based on the determine optimal operating settings. Examples of optimization with optimization constraints is provided in U.S. patent application Ser. No. 15/616,616 filed on Jun. 7, 2017, the entirety of which is incorporated by reference herein. An example of optimization may be minimizing cost or maximizing revenue defined by an objective function, e.g., the objective function provided below.

$$\arg\min_{x} J(x)$$

where $J(x)$ is defined as follows:

$$J(x) = \sum_{sources} \sum_{horizon} \text{cost}(purchase_{resource,time}, \text{time}) - \sum_{incentives} \sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Simulator Tool

Referring now to FIG. 13, an interface of the simulator 754 for the RDS application 712 is shown, according to an exemplary embodiment. The simulator 754 focuses on providing a single service to the user. The simulator can run any kernel 706 targeting the active model and allowing comparison between various experiments. The RDS application 712 aims at providing a simulator service that reflects how algorithm developers utilize their algorithms. In many cases, these developers have methods to their experimentation. They usually build a model, edit the model's data, solve the model against some settings, analyze results, and continue to edit the model, solve the model, and analyze the results until satisfied with the model.

A user first creates a new model and chooses which kernels to target. This setting allows the RDS application 712 to filter out unnecessary points needed to run the targeted kernels. Once created, the user can create the model and edit the model's data (steps one and two). Then they can solve the model by supplying the kernel settings and pressing solve. To solve models, the RDS application 712 connects to an A3S platform 714 cluster and runs the job. During this process, real time job progress is tracked and shown to the simulator app at the bottom along with estimated completion times. Once complete, the primary comparison view of the simulator updates.

The interface 1300 shown in FIG. 13, displays relevant data for comparison between runs, according to an exemplary embodiment. From run to run, various design parameters may change and will show up on the table view. This table view presents each experiment as a row and the columns represent various points within the model to compare against. The user may choose to add or remove columns from the view at any time to expand their set of values to monitor during their experimentation.

At any time, the user may also recover an experiment's input data back into the active model allowing them to create a new experiment from a past experiment. Once created, experiments block a user from editing the physical structure of that model until the user deletes all experiments or clones the model to a clean state. This allows the RDS application 712 to take advantage of performance enhancing strategies when storing the experiment data.

Analytics Tool

During the course of experimentation, a user may encounter formulations of data that the algorithm developer did not provide for display in the simulator. The analytics tool directly targets this scenario by leveraging the work of the analytic provided in the CML 710. Consider the example analytic script provided within the description of the analytic itself, the RDS application 712 provides an in-browser IDE that enables editing analytic scripts like these.

Using these scripts that target either the active model's FQRs or the active model's context based URNs, the analytics tool will execute against the selected experiments and display all the plots as tabs on the right side of the UI. This allows a user to extend upon the basic model provided by the algorithm developer to discover new information not otherwise available.

Application Designer

Referring now to FIG. 14A, a block diagram illustrating the application designer 750, according to an exemplary embodiment. A data model (e.g., the data model 799) may include expert knowledge, however, the application designer 750 can be configured to allow the generic abstraction of those expert details for presentation to an end user by presenting data of the data model via the animation of SVG elements that are bound to widgets in custom dashboards. The application designer 750 may be accessible by a user via a user interface (e.g., an HTML5 based interface). The application designer 750 can be accessed by a user via a smartphone, via a tablet computer, via a terminal, via a desktop computer, or any other computing device that can be configured with a display interface and a user input interface.

The application designer 750 can be a standalone program or can be integrated with the model designer as described with reference to FIGS. 10-13. The application designer 750 can be implemented as a microservice (e.g., implemented via Service Fabric). Having the application designer 750 implemented as a standalone program can alleviate user difficulties from dealing with tight coupling between the model designer and the application designer. Within the RDS application 712, users contain roles that allow them to access various tools within the RDS application 712 suite. In some cases, an administrator may choose to remove access to various tools to give the user a seamless experience separated from the algorithm's model and instead provide apps they have designed. The application designer 750 currently aims at generalizing the creation of model design wizards and real time dashboards (e.g., the dashboard 1400B of FIG. 14B) with override abilities.

The application designer 750 can be configured to receive user uploaded scalable vector graphics (SVGs) that a user can generate via an illustration platform 1452. An SVG may be an XML-based vector image format for two-dimensional graphics that supports user interaction and animation. The illustration platform 1452 can be any program and/or computing system configured to generate SVG files. For example, illustration platform 1452 can be one, or a combination of, ADOBE ILLUSTRATOR®, INKSCAPE®, Gimp, etc.

Referring more particularly to FIG. 14A, the uploaded SVGs are SVG1, SVG2, and SVG3 are shown to be uploaded to the application designer 750. Any number of SVGs can be uploaded by the user to the application designer 750. In some embodiments, the application designer 750 supports any file type for a graphic element that supports user interaction and animation. Using the uploaded SVGs, the application designer 750 enables the ability to generate a widget by binding the provided SVG elements to the widget. By clicking on the SVG elements, the user may select a certain widget to bind to the SVG element. In some embodiments, the application designer 750 includes a point value plot widget that uses the format of the SVG string to set properties like precision, size etc. and points to a fully qualified reference (FQR) within the active model and displays its data in the requested unit (e.g., Celsius, Fahrenheit, second, hour, CFM, etc.).

When clicked, some SVG widgets may plot the last user defined amount of data in a model. For example, the SVG based widget may be configured by a user to plot a weeks' worth of temperature data points for a building in response to a user interacting with the SVG widget. In some embodiments, the RDS includes a "tween widget." A tween widget may interpolate across (e.g., between) a range of values to create natural fluid animations (e.g., natural changes in pitch, graphic animation, volume, etc.). For example, the tween widget may transition between two states but may animate with more than two frames, causing a smooth animation. This type of widget can animate the target element (e.g., a temperature data point) between two endpoints given a conditional check to an FQR. For example, the tween widget can be a linear scale with a marker, the marker changing location between the end points of the linear scale based on the value of the target element.

In some embodiments, the RDS application 712 may include a color change widget that changes the color of an SVG element based on a map for a provided FQRs value. The color map may be a relationship between color values for the widget or a particular element of a widget. For example, if the widget is the sun and a cloud, the sun may be the element that changes color while the cloud may remain the same color. The color map can be a lookup table, a mathematical function or any other relationship that can take the value of the data point and determine an appropriate color for the widget.

In some embodiments, the RDS application 712 includes a navigate widget that turns the SVG into a button that navigates to another page. In some embodiments, interacting with the SVG widget may bring a user to a page displaying additional information for the data displayed by the widget. For example, if the widget illustrates current power consumption of a facility, interacting with the widget may bring the user to a page with illustrates power consumption usage over the past month.

In some embodiments, the user may only link one widget to each element to enforce some level of standardization. For example, if one widget displays temperature for a particular zone of a building, the application designer 750 may prohibit a user from configuring another widget to display that same temperature in another widget. Also, each design mode may offer different widgets. Once the user completely configures all of the SVGs they want to, they can save the application and it will populate in the homepage and the slide out menu. At any time, the user may bring back the application into edit mode or remove it, assuming they have permission to.

In FIG. 14A, the application designer 750 may provide a user with various pages 1456 that each include a widget generated based on a particular SVG (i.e., SVG1, SVG2, and SVGN). The pages 1456 can be a selectable list of SVGs that a user can select one or more of. The user can select various points from the points column 1458 to be connected with the widget. The points column 1458 may also be a selectable list displayed by the application designer 750. In FIG. 14A, a user has selected the SVG1. The SVG1 can be displayed in the application designer 750 as the selected SVG. The widget page for the selected SVG includes a text field and a particular data display 1459. If the user interacts with the point of the data display 1459, a configure widget window 1460 may open in the application designer 750. In response to interacting with a type button in the configure widget window 1460, the configure widget window 1460 may indicate which points have been bound to the widget of the selected SVG. In FIG. 14A, point A has been bound to the SVG1.

The pages column 1456, the points column 1458, and a display of a currently selected SVG can simultaneously be displayed by the application designer 750. In this regard, a user can view the selected widget within one display pane, display the page associated with the selected widget in another display pane, and display a point associated with the selected widget in yet another pane. Displaying multiple panes together in a single display can improve user development of a dashboard by speeding up development since the user can simultaneously display multiple forms of development information.

Once the edits and updates are made via the application designer 750, the user can deploy the dashboard, e.g., the dashboard 1400a. The dashboard 1400A can display the SVGs and gather values for the data points to be displayed in the widgets that the SVGs are bound to. In FIG. 14A, the widget with SVG1 bound to it is selected and displayed. Via the pages column 1462, the user can select and display different widgets associated with different SVGs. The pages column 1462 may be a selectable list displaying all the SVGs that a user can select. Based on a user selection of one of the pages of the pages column 1462, the selected widget can be displayed in display pane 1463. The display pane 1463 can display the selected widget and data, e.g., a data display 1459, to an end user. The pane which includes the pages column 1462 and the display pane 1463 can be displayed simultaneously within the dashboard 1400A.

The data display 1459 may be updated with gathered data for point A of a system 1466 (e.g., an A3S system deployed for a site). In some embodiments, the points of the system 1466, i.e., the points 1468, are values stored within a data model for the system 1466 (e.g., the data model 779).

Live Dashboard Application

Referring now to FIG. 14B, a live dashboard, an interface 1400B for the RDS application 712 is shown, according to an exemplary embodiment. The interface 1400B can be designed or updated via the application designer 750 as described with reference to FIG. 14A. A live dashboard application may connect SVG elements (e.g., SVG1, SVG2, SVG3, etc.) using widgets to a live system (e.g., the system 1466). In FIG. 14B, widgets update all the string values shown linked in via SignalR to maintain a live stream. In addition, the carrots on the lines animate and the color of the line changes based on the amount of power flowing between the platforms in the live system. In this example, even the sun changes color and cloud changes opacity based on cloud cover amount too. Developers may quickly extend widgets because the architecture simplifies their creation down to plugins.

The application designer 750 does not limit the widgets to only display data, they may change the data too. Switch widgets and value change widgets exist that will modify the values present in the live system immediately. This allows users to interact with their system in real time. The possibilities have no limit, the application designer 750 enables a one and done solution to any future live system to keep the architecture unchanging. Users only need to request new widgets when they have visions that exceed the original scope this architecture targets.

In FIG. 14B, the interface 1400B identifies various buildings, equipment, resources, and metrics. Specifically, the interface 1400B indicates total revenue 1412. This may be revenue from participating in various programs (e.g., frequency regulation (FR), economic load demand response (ELDR), storage and discharging energy via photovoltaic arrays, etc.). The interface 1400B can further indicate an hour revenue (i.e., indicator 1416) and faults for the facility that the interface 1400B represents (i.e., scans in violation indicator 1414).

The interface 1400B identifies equipment and the current performance of the equipment (e.g., the photovoltaic array 1406, the battery container 1408, and the point of intersection 1404). The identifiers of the equipment may be points within the data model 799 and can be power stored by the battery, percentage of charge of the battery, power generated by the photovoltaic array and/or percentage of cloud coverage. The campus 1410 can indicate the power being consumed by the campus. Furthermore, the point of intersection may indicate power consumption and ramp rate percentage. The grid power, indicated by 1402, can indicate the current frequency of the power grid.

The Model Design Wizard Application

Consider a user creating a model from scratch using the model designer. This user must learn about how to first. If requirements state that the user remains laymen however, then the algorithm developer may choose to create a model design wizard application using the application designer. This application enables the creation of models that provide a step by step approach to running an algorithm.

It functions in the application designer using SVGs and special model editing widgets that enable automatically adding and removing various entities from the model. Once added, their data can be edited using attribute display widgets that leverage the attribute editor from model designer itself. The goal of model design wizard applications is to reduce the amount of custom deployments necessary for the various changing requirements present within algorithm development and sales teams.

Algorithms as a Service (A3S) and Microservice System

This disclosure focuses on enabling algorithms as a service whether within advanced development or within an external system. Too much expert knowledge within algorithm developers has to leak out to an organization before they can create a working architecture. The A3S platform 714 provides a mechanism for the algorithm developer to put their expert knowledge into and as a result the architecture provides standard APIs to the rest of the organization. To enable algorithms as a service, several commonly seen problems need solving: load balancing, multi-machine clusters, replication, rolling updates, hyper scaling, cost effective, etc.

As shown by FIGS. 7A and 7B, the algorithms as a service framework must enable the management of thousands, hundreds of thousands, or millions of algorithm executions without interruption and without performance flaws both online and offline. To achieve such a goal, this work must leverage the expertise of others working in this domain. For that reason, the A3S platform 714 can be constructed on top of MICROSOFT® Service Fabric, a platform builder that covers all of the system level requirements on the proposed architecture.

Service Fabric

Figure 15:
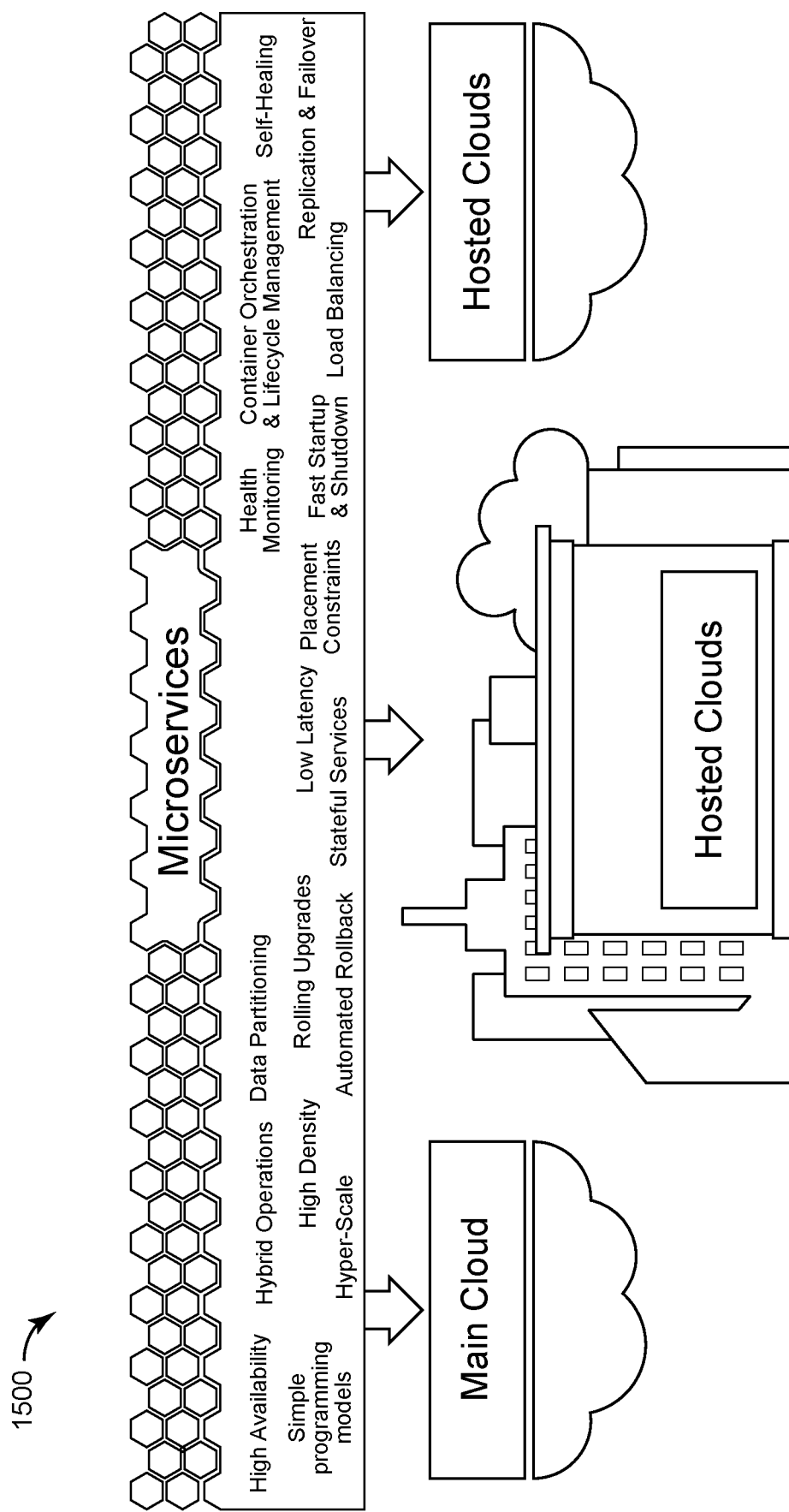
FIG. 15 is a block diagram of a microservice system that A3S platform and the RDS of FIGS. 7A and 7B can be implemented with, according to an exemplary embodiment.

Referring now to FIG. 15, of a distributed microservices system 1500 that can be used with the A3S 712 is shown, according to an exemplary embodiment. The microservices of the microservices system 1500 can run in a main cloud (e.g., MICROSOFT® AZURE), a private hosted cloud, or in an on-premises hosted cloud. The clouds can be implemented on various systems, controllers, MICROSOFT® WINDOWS based servers, Linux based servers, etc. In some embodiments, the distributed microservices system 1500 can be MICROSOFT® SERVICE FABRIC that is an internal infrastructure for Azure. The microservices system 1500 can enables a developer to build and manage scalable and reliable applications composed of microservices running at very high density on a shared pool of machines (referred to as a cluster). The microservices system 1500 can provide a sophisticated runtime for building distributed, scalable stateless and stateful microservices. The microservices system 1500 can also provide comprehensive application management capabilities for provisioning, deploying, monitoring, upgrading/patching and deleting deployed applications.

The microservices system 1500 can enable a developer to scale different parts of your application depending on its needs. Second, development teams are able to be more agile in rolling out changes and thus provide features to your customers faster and more frequently. The microservices system 1500 can be used with MICROSOFT® AZURE SQL DATABASE, MICROSOFT® AZURE DOCUMENTDB, MICROSOFT® CORTANA, MICROSOFT® POWER BI, MICROSOFT® INTUNE, MICROSOFT® AZURE EVENT HUBS, MICROSOFT® AZURE IOT, SKYPE FOR BUSINESS®, and many other MICROSOFT® AZURE services.

The microservices system 1500 can create "born in the cloud" services that can start small, as needed, and grow to massive scale with hundreds or thousands of machines. Internet-scale services can be built of microservices. Examples of microservices include protocol gateways, user profiles, shopping carts, inventory processing, queues, and caches. Service Fabric is a microservices platform that gives every microservice a unique name that can be either stateless or stateful.

The microservices system 1500 can provides comprehensive runtime and lifecycle management capabilities to applications composed of these microservices. The microservices system 1500 can host microservices inside containers deployed and activated across the cluster. Moving from virtual machines (VMs) to containers makes possible an order-of-magnitude increase in density. Similarly, another order of magnitude in density becomes possible by moving from containers to microservices. For example, a single Azure SQL Database cluster includes hundreds of machines running tens of thousands of containers hosting a total of hundreds of thousands of databases. Each database is a Service Fabric stateful microservice. Using containers can give high density while using microservices can provide hyperscale.

A3S Algorithm Execution

Figure 16:
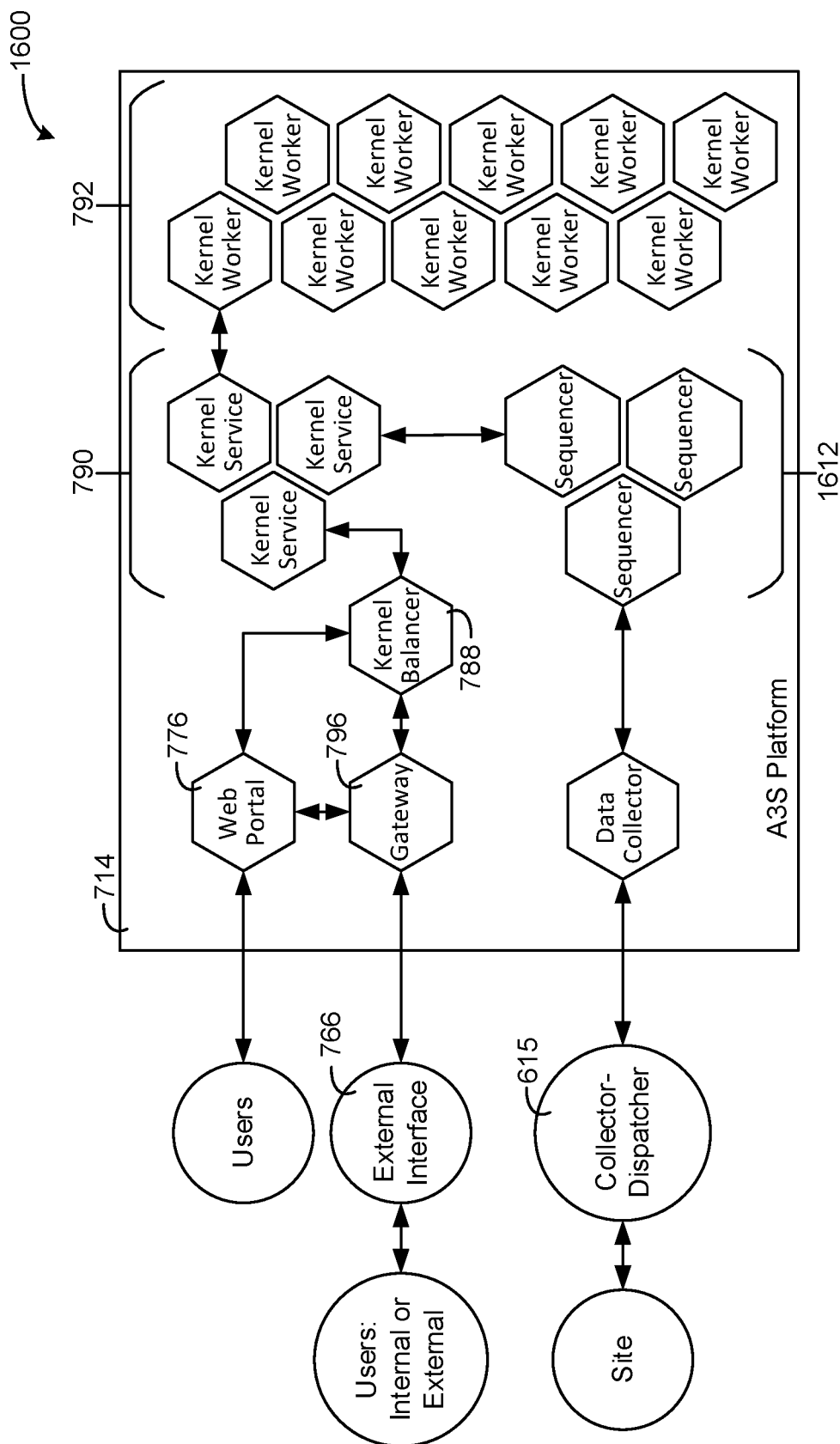
FIG. 16 is a block diagram of components of the A3S platform of FIGS. 7A and 7B configured to manage and run algorithms, according to an exemplary embodiment.

Referring now to FIG. 16, a block diagram 1600 of an A3S cluster is shown, according to an exemplary embodiment. The A3S platform 714 must enable a system that provides execution of countless algorithms in parallel robustly, according to some embodiments. To achieve this, the architecture must eliminate any wait times between algorithm calls and executions. The A3S platform 714 takes the following high-level form, the high-level design of the A3S platform 714 shows several micro-services all in charge of small well-defined roles within Service Fabric. The high-level design easily splits into three main purposes, offline execution of kernels, online runtime management, and the web interface.

The workflow of offline execution involves letting Service Fabric do what it does best, manage incoming requests among its many nodes. The architecture of offline execution involves several pieces the external interface 766, the gateway 796, the kernel balancer 788, the kernel services 790, and the kernel workers 792.

The external interface 766 allows external systems easy access into an A3S cluster, an instance of the A3S platform 714. The external interface 766 aims at providing access to the various functions exposed by the gateway service 796. Whether it involves introducing a new sequencer 1612 to the sequencing service or beginning a new kernel job for the kernel workers 792, the external interface 766 exposes the useful endpoints. When working with offline kernel job execution, the A3S platform 714 relies on a notification system to drive information exchange with the job owner. The external interface 766 relies on this notification service to notify the external system to trigger on status updates.

Consider the example solver ran in the CML 710 section,

```
var solverOptions = new PlanningAssetAllocatorOptions( );
solverOptions.CurrentTime.Update(new DateTime(2015, 1, 1));
solverOptions.PlanStart.Update(new DateTime(2015, 1, 20));
solverOptions.PlanEnd.Update(new DateTime(2015, 1, 25));
solverOptions.Solve<DataBox>(model, null);
var results = solverOptions.Solve<DataBox>(model, null);
```

Example Code 12, Running Kernel in Process

Instead of solving this model within the local process running and off-shell it to the A3S platform 714, consider the following code snippet,

```
RemoteApi.Initialize(Guid.Empty, new TimeSpan(0, 0, 5),
"http://a3s0");
var id = RemoteApi.BeginSolve(solverOptions, model, $"Test {i}");
RemoteApi.StartListener( );
RemoteApi.Updated += args => {//on complete action...}
//wait... for completion notification
var result = RemoteApi.GetResult<DataBox>(id);
RemoteApi.Deinitialize( );
```

Example Code 13, Off-Shell Kernel Execution to A3S with the Remote Interface

This code snippet enables the current process to send the model and the solver options to the A3S platform 714 using the external interface 766. The remote API then starts listening to A3S notifications with the start listener command. After getting the completion notification, get result will return and drain the results from the A3S platform 714. This process on a run that normally executes in around 15 seconds only adds an additional second to the solution time.

The gateway 796 bridges an endpoint, the external interface 766 can target, to the service fabric's proxy. This allows the external interface 766 to reach out to the kernel balancer 788 to run the offline kernel job commands themselves.

The kernel balancer 788 can manage the overall balancing problem of executing offline kernel jobs. It manages uploading jobs into a reliable store, queueing jobs and balancing jobs among all of the kernel services 790 running in the cluster. The kernel balancer 788 can activate on a timer and analyzes the current distribution of jobs among the cluster. The kernel balancer 788 can manage the queue using a simple cost function that involves priorities of low, medium, high and critical. For jobs marked critical, the kernel balancer 788 can allow overloading kernel services 790 and send the job to the lowest utilized kernel service 790. Otherwise, the other priorities have modifiers against the total time in queue and jobs will execute using this value in order from highest to lowest. Job executions may only load services up to 100 percent utilization—the ratio of jobs running to total computer CPUs. Once the service 790 completes, it returns its results to the kernel balancer 788 that then places the results back into the reliable store until the owner drains the results. The kernel balancer 788 may perform its tasks while introducing miniscule lag into the system so scaling to extreme sizes remains feasible.

The Mathworks Compiler Runtime (MCR) cannot perform parallel executions in the same process. This creates several issues in any agent-based architecture design surrounding running Matlab kernels. For this reason, the kernel service 790 introduces a new concept into service fabric that MICROSOFT® does not natively support an actor service framework where actors run on distinct processes instead of different threads in the same process. The kernel service 790 does not implement this in a generic nature and instead focuses on doing just kernel executions well to avoid costly performance degradations.

The kernel service 790 manages these processes and keeps them alive as long as possible to avoid initialization delay from the MCR. When the balancer 788 pushes a job to the service 790, the service 790 scans the kernel workers 792 it has alive for any that are free and passes the job into it using named pipes. If active jobs exist on all the active kernels workers 792, the service 790 will create a new process. During the execution of the job on the kernel worker 792, the worker 792 returns progress updates and errors back through the named pipe. Once received, the service 790 forwards the notifications back to the kernel balancer 788 so they may reach the remote endpoints.

Once the job completes on the worker 792, the service 790 will then forward the results back to the balancer 788 too. During the process of the worker 1610 executing, the owner may call an abort on the job identifier (ID). This abort propagates down to the kernel service 790 that owns the job ID and it will terminate the owner process for the kernel worker 792 to enforce immediate freeing of resources.

As previously described by the kernel service 790, the kernel worker 792 serves the role of kernel execution. The kernel worker 792 maintains an always on process that listens on named pipes for work. In this manner, the kernel service 790 may at any time send work to the kernel worker 792 or simply terminate it. All errors within the kernel runtime report back into the results of the job that contained the error. Finally, kernels do not maintain direct references into the kernel worker 792 and instead load dynamically into the process at startup. This allows runtime updates of the kernels from the external interface 766 without the deployment needing to change or update.

Operational sequencing (e.g., the sequencer 1612) has different focuses than offline execution. The sequencer can be a service (e.g., a microservice) and/or can be an actor/agent. Primarily, the goals around this form of execution surround that of operational systems (e.g., building equipment) with algorithms at the center. Applications that utilize this form of execution exist, e.g., optimizing central energy facilities, distributed battery storage problems or airside optimization with demand response. The sequencer 1612 is described with further reference to FIGS. 17A-17B.

Dynamic Cloud Based Control Framework—The Sequencer

Figure 17A:
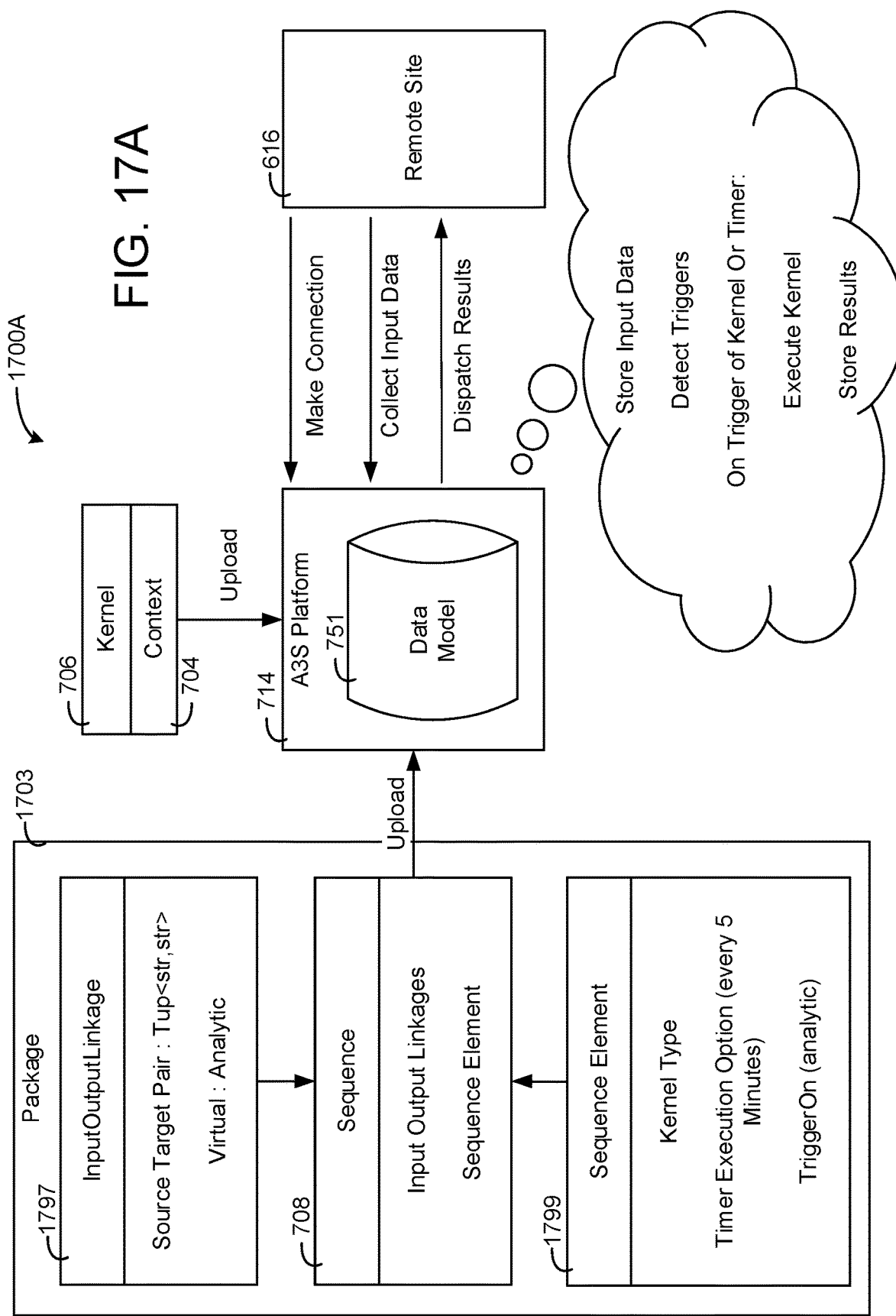
FIG. 17A is a block diagram illustrating a package being uploaded to the A3S platform of FIGS. 7A and 7B for running algorithms and controlling equipment of a remote site, according to an exemplary embodiment.

Referring now to FIG. 17A, a high level system 1700A of a dynamic cloud based control framework is shown, according to an exemplary embodiment. The dynamic control framework is a system that solves online control aspects of an algorithm for a live site, according to some embodiments. The system is impervious to failures and executes algorithms with live rolling updates, according to some embodiments. Via a sequence, the system is configured to be dynamically updated and edited. The dynamic cloud based control framework offers a solution that doesn't have to be specifically programed for each use case encountered to execute control algorithms for remote sites (or local sites if deployed on premise). The method includes capturing all data needed to know how to control the remote site. This data can be deployed via a package 1703 into the solution that will then automatically configure the connection to a site (provided the site first connects to us for security, the solution will then link it to its control strategy). Once the package 1703 is uploaded, the package 1703 can be changed at any time to allow control strategies to very based on the needs of a remote site 1794. The package 1703 is shown to include a sequence 708. The sequence 708 may be the same as and/or similar to the sequence 708 as described with reference to FIGS. 7A-7B.

Algorithm developers can safely deploy new algorithms (e.g., kernels 706) and new data models (e.g., a data model 799 implemented based on a context 704) to the site provided they commission any new missing data or site links along with it (e.g., through the package 1703).

Making a connection scans for a sequence 708 designated for the site 616. A sequence 708 can provides all the necessary configuration details to run a kernel 706 against a live system such as indications of data points to collect and dispatch, endpoints for communication and execution order of kernels 706. Each kernel 706 may specify input rate requirements and the input output linkage specify the inputs from site 616 to be collected. All collected data can be cached in the site data cache 1792. Kernels 706 can be executed by a timer or triggered by an analytic written against collected input data. After execution, the A3S platform 714 puts away the data and dispatches it to site 616.

Referring more particularly to FIG. 17A, the A3S platform 714 is shown receiving the package 1703 that includes a sequence 708 and controlling the remote site 616 based on the package 1703. The sequence 708 can include information that indicates when and how to run kernels 706 against the data model 751 as implemented by the context 704. The sequence 708 is shown to include InputOutputLinkages 1797 and a sequence element 1799. The InputOutputLinkage 1797 can indicate, in the sequence 708 a physical point for equipment of the remote site 616. The InputOutputLinkage 1797 physical points can be linked to points of the data model 751. The sequence element 1799 can be an indication of a particular kernel and the execution rules for the identified kernel.

For example, one kernel may be an algorithm for determining a temperature setpoint for a particular zone of the remote site 616. The sequence element 1799 may indicate a timer at which to execute the kernel (e.g., every 10 minutes, every hour, etc.) and can indicate a data point of the data model 751 which upon a change (e.g., threshold change, state change, etc.) causes execution of the kernel. For example, a temperature determination algorithm may be configured to if occupancy for the particular zone of the remote site 616 changes.

The InputOutputLinkage 1797 is shown to include "Source Target Pair: Tup<str,str>." This information may be a tuple of two data elements (e.g., strings) which identify the link between a data point in the remote site 616 and a data point of the data model 751. For example, a building controller in the remote site 616 may have a data point of "Temperature 1-ID 50001" while the data model 715 may have a corresponding point of "Building A, Zone B, Ambient Temperature." The data point "Temperature 1-ID 50001" may be a physical data point of the remote site 616 while the corresponding digital point "Temperature 1-ID 50001" can be a digital point of the data model 751. Once possible "Source Target Pair" may be Tup<"Temperature 1-ID 50001", "Building A, Zone B, Ambient Temperature." In this regard, when retrieving data from the physical data point of the remote site 616, the sequence 708 can indicate which data point of the data model 751 to store the retrieved values in. Furthermore, when determining a value for a data point of the data model 751, e.g., a zone setpoint, the sequence 708 can indicate what physical point to send the value to send to the remote site 616. In some embodiments, where necessary, the InputOutputLinkage 1797 includes multiple source target pairs and indicates multiple different virtual links.

The "Virtual:Analytic" can indicate a virtual service or software program that requires information determine via a kernel 706 and the sequence 708. For example, a particular system for displaying information determine with the sequence 708 may display the information to the end user. For example, a particular software system can display trending temperature data for a zone of the remote site 616. In this regard, the InputOutputLinkage 1797 can identify the software service responsible for logging, trending, and presenting the data to the end user and can allow the A3S platform 714 to provide the necessary temperature data to the software data trending service.

The sequence element 1799 can indicate kernel execution information in the sequence 708. The sequence element 1799 is shown to include "Kernel Type," "Timer Execution Option," and "TriggerOn." The "Kernel Type" may indicate a particular kernel 706. For example, the "Kernel Type" can identify a particular single Kernel 706 or multiple different similar kernels 706. For example, the sequence element 1799 may be the corresponding sequence element 1799 for a particular Kernel or for a particular group of Kernels. For example, a type of Kernel 706 "Temperature Setpoint Adjustment" may be a Kernel 706 responsible for determining setpoint adjustments for the remote site 616. The timer execution option and/or trigger on settings for the sequence element 1799 may be the same for all the "Temperature Setpoint Adjustment" kernels. This sequence 708 can include InputOutputlinkage 1797 which corresponds to appropriate source target pairs and/or virtual associated with the "Temperature Setpoint Adjustment" kernel type. The timer execution option may indicate when to collect data for the data model 751 via the source target pair 1797 of the InputOutputLinkage 1797. The timer execution option may be an indication to periodically collect and/or dispatch data at a predefined timer execution indicated by the sequence element 1799. The triggerOn setting may indicate to collect, dispatch, and/or provide information to an end service in response to a particular value of the data model 751 and/or remote site 616 changing, changing by a predefined amount, and/or in response to a user interaction or command (e.g., a user interaction via a web interface, e.g., a request for data).

The sequence 708 can include both the timer execution option and the triggerOn option. For example, the sequence 708 may collect temperature data and provide the temperature data to an temperature trending service that displays a trend of the temperature data. The timer execution option may indicate a period at which to collect temperature values for the sequence 708 while the trigger on setting may indicate that if a user initiates a request via the interface that the A3S platform 714 immediately collects a temperature value from the remote site 616.

In some embodiments, the timer execution option and/or the triggerOn option indicate when to execute a kernel 706. For example, a kernel 706 can be a kernel for determining an appropriate temperature setpoint based on the ambient temperatures of multiple zones of the remote site 616. The A3S platform 714 can execute, via the sequence element 1799, the temperature setpoint determination kernel every hour based on the timer execution option. However, if the temperature of one of the zones of the remote site 616 rises or falls by a predefined amount, the triggerOn option may indicate that the kernel should run immediately.

Based on the data model 751 implemented by the A3S platform 714 based on the received context 704, the A3S platform 714 can be configured to run various kernels against the data model 751 based on the sequence 708. Based on the sequence 708, the A3S platform 714 can be configured to collected input data from the remote site 616, dispatch control data (e.g., results of Kernel execution) to the remote site 616) and otherwise make connection with the remote site 616. Based on the sequence 708, the A3S platform 714 can be configured to store the input data in the data model 751, detect trigger data (e.g., a timer, a data point state change, etc.), and execute kernels based on trigger data. The result of the kernel execution can be stored in the data model 751 and/or dispatched to the remote site 616 to control building equipment of the remote site 616.

Figure 17B:
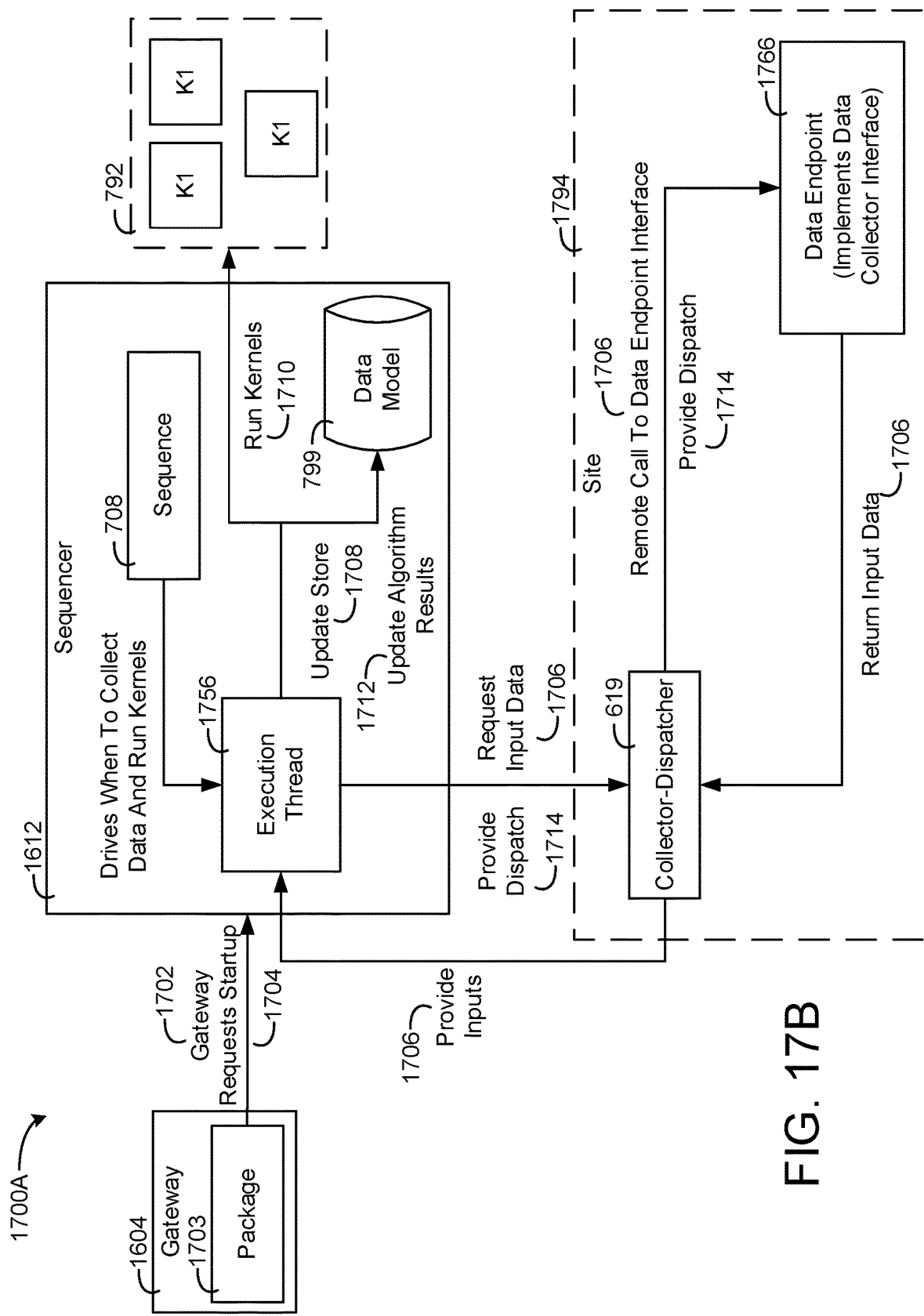
FIG. 17B is a block diagram illustrating, in greater detail, a package being uploaded to the A3S platform of FIGS. 7A and 7B for running algorithms and controlling equipment of a remote site, according to an exemplary embodiment.

Referring now to FIG. 17B, a block diagram of a sequencer 1612 from the A3S platform 714 block diagram of FIG. 16 is shown, according to an exemplary embodiment. FIG. 17B provides greater detail regarding system 1700A of FIG. 17A. The operational sequencer 1612 can be configured to perform a process, process 1700C as described with reference to FIGS. 17B and FIG. 17C. Process 1700C may include steps such as configuration, execution, storage, point collection, point dispatching, and user interaction. FIG. 17B is a block diagram illustrating the sequencer 1754 and the process 1700C of a high-level operational process that the components of system 1700B can be configured to perform. The gateway 1604 can be configured to halt the process at any time. If the process crashes, the A3S platform 714 can replicate (e.g., Service Fabric can replicate) another sequencer 1612.

Figure 17C:
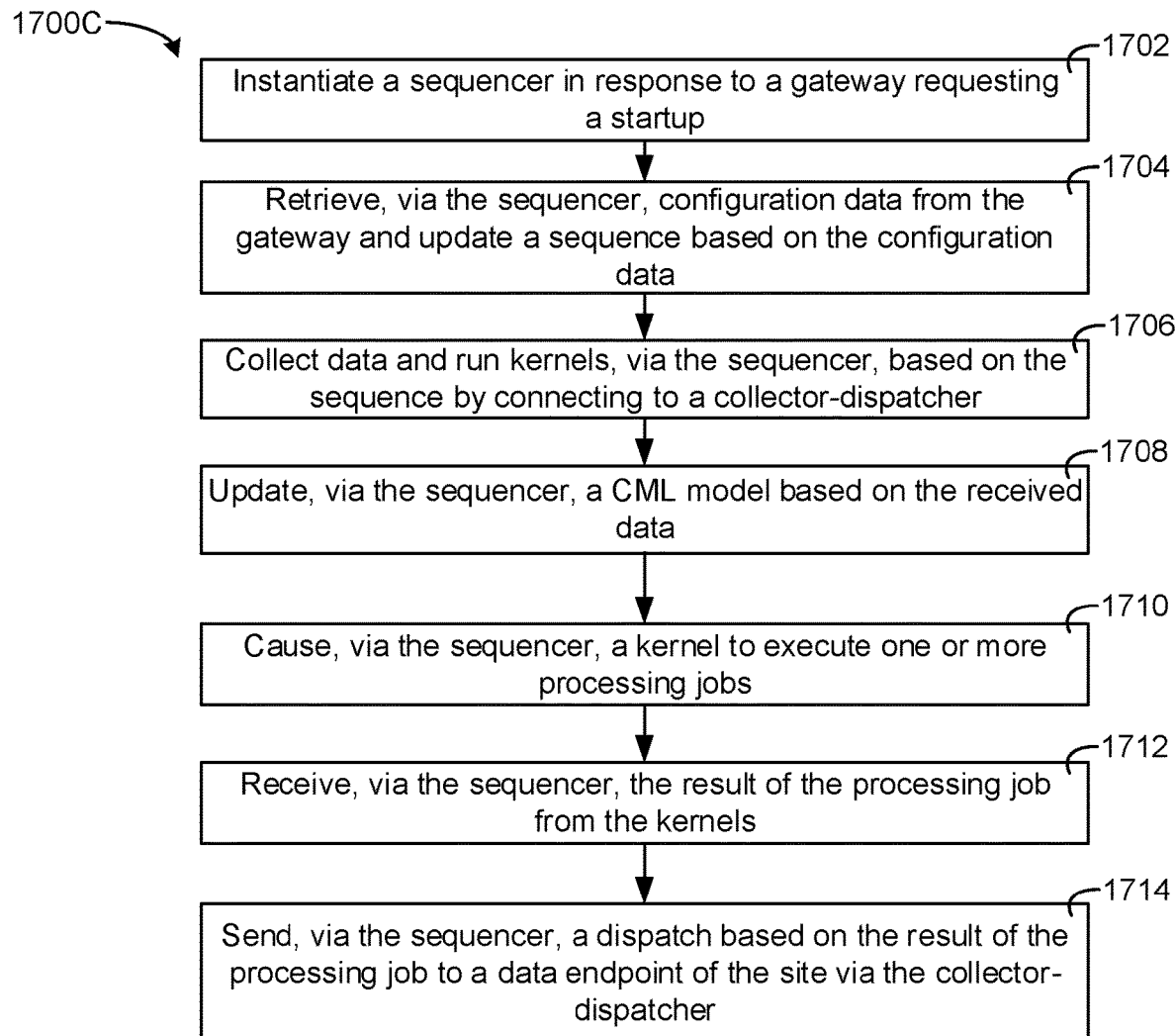
FIG. 17C is a flow diagram of a process for running algorithms and controlling equipment of a remote site with the A3S platform of FIGS. 7A and 7B, according to an exemplary embodiment.

Referring particularly to FIG. 17C, the process 1700C begins at step 1702 with configuration, an external system supplies a data model (e.g., a context 704) based on the CML 710 and a configuration object that contains the site map, analytics, and/or system/network configuration details (e.g., the sequence 708). Using this information, the A3S platform 714 then initializes a new agent (i.e., the sequencer 1612) in charge of managing the designed sequence 708 designated by a unique ID.

In step 1704, the execution thread 1756 then picks up the package 1703 (the package 1703 including the sequence 708) and behaves as instructed, running jobs at designated times and interfacing with its reliable storage. When a kernel executes, the process follows a set procedure. The sequence 708 may determine when data should be collected and when kernels 706 should be run. The sequence 708 may be based on the package 1703. The sequence 708 may be a CML sequence diagram object that indicates the order of execution for kernels.

In step 1706, the execution thread 1756 calls the specified collector-dispatcher 619 (e.g., the collector-dispatcher associated with the site that the sequence 708 has been instantiated for) to collect data. The collector-dispatcher 619 can be a service running locally at the site that can receive input data from equipment of the site and can provide output to the equipment. In response to receiving the command to collect the data, the collector-dispatcher 619 then connects to the site through a local protocol implemented at the site and collects the necessary input data. Once collected, the collector-dispatcher 619 returns the data to the execution thread 1756.

Once received, in step 1708, the execution thread 1756 updates reliable storage (i.e., the data model 799). The reliable storage can be automatically replicated to many nodes. Further, in response to receiving the data, the execution thread 1756 can trigger the gateway to send update notifications to external systems that may monitor the storage.

In step 1710, once updated, the execution thread 1756 executes the requested kernel using the infrastructure managed by a kernel balancer (e.g., the kernel balancer 788). If the kernel execution performs real time control, it receives a priority for the kernel execution. Once the job completes, the data model 799 gets another update based on the result of the job (step 1712) and then sends a corresponding dispatch off to the collector-dispatcher 619 and the data endpoint 1766 (step 1714).

The process 1700C then repeats as often as it is configured to repeat (e.g., as specified by the sequence 708). In addition to running kernels on a clock, the collector-dispatcher 619 may trigger kernels, or kernels may run by the external system's request. For example, the sequence 708 can cause the execution thread 1756 to trigger kernel execution based on a state change of the data endpoint 1766 causing the execution thread 1756 to execute one or more control algorithms (e.g., kernels 706) on kernel workers 1610. In the various embodiments, described herein, the execution thread 1756 can follow the same and/or a similar process as process 1700C.

An external system such as the RDS application 712 can interlink to the sequencer 1754 directly and use SignalR to keep clients up to date on information pertaining to the site. For example, the RDS application 712 may access the data of the Data model 799 and provide the data of the data model 799 to the user via a user interface. The RDS application 712 can be configured to access the data model's store, the data model 799, and modify any live running configuration parameters of the data model 799.

Service fabric provides the sequencer 1612 the reliability necessary to gain the trust of site engineers. If the sequencer 1612 for any reason fails to execute or the server its running on loses connection or power, the A3S platform 714 using service fabric will reroute its execution to a new node and complete the job without interruption.

Web Interface

Referring now to FIG. 18, a web interface 1800 for the A3S platform 714 platform is shown, according to an exemplary embodiment. The A3S platform 714 may include a dashboard that allows users to manage how it executes its work and allow monitoring of the state of the A3S platform 714. The web interface shown in FIG. 18 includes a kernel job manager which indicates the status of various jobs across multiple clusters. The computing details of a cluster is included in interface 1800 in addition to the utilization of the resources for the cluster. In some embodiments, the RDS application 712 can be configured to manage the sequence functionality of the A3S platform 714. In some embodiments, the RDS application 712 and the A3S platform 714 are both be served out of service fabric.

Proof of Concept and Scope

The remarkable performance of the service fabric coupled with the CML in the proof of concept and scope gave promising results. The time to send a local request remotely can be minuscule compared to execution time. It was found to be in the high millisecond range compared to the 15 second execution of the algorithm itself. In this proof of scope, a test case in parallel registered 500 kernel jobs. The A3S platform 714 responded within expectations and executed the 500 runs over a 9-desktop computer cluster of over 130 cores and several hundred GBs of RAM. With this evidence, the A3S platform 714 facilitates highly parallelized applications as it will convert the problem of 1000 engines (or even 1 million engines) into a matter of having enough hardware power. In case a node is down, the web service can replicate if the failure presents itself.

Suggested Deployment Scheme

Service fabric can be deployed on premise, in the cloud, or in a hosted cloud. Within many companies, there is concern regarding the cost to deploy algorithm executions in the cloud. The A3S platform 714 provides a solution to this problem through a robust and innovative technique.

Figure 19:
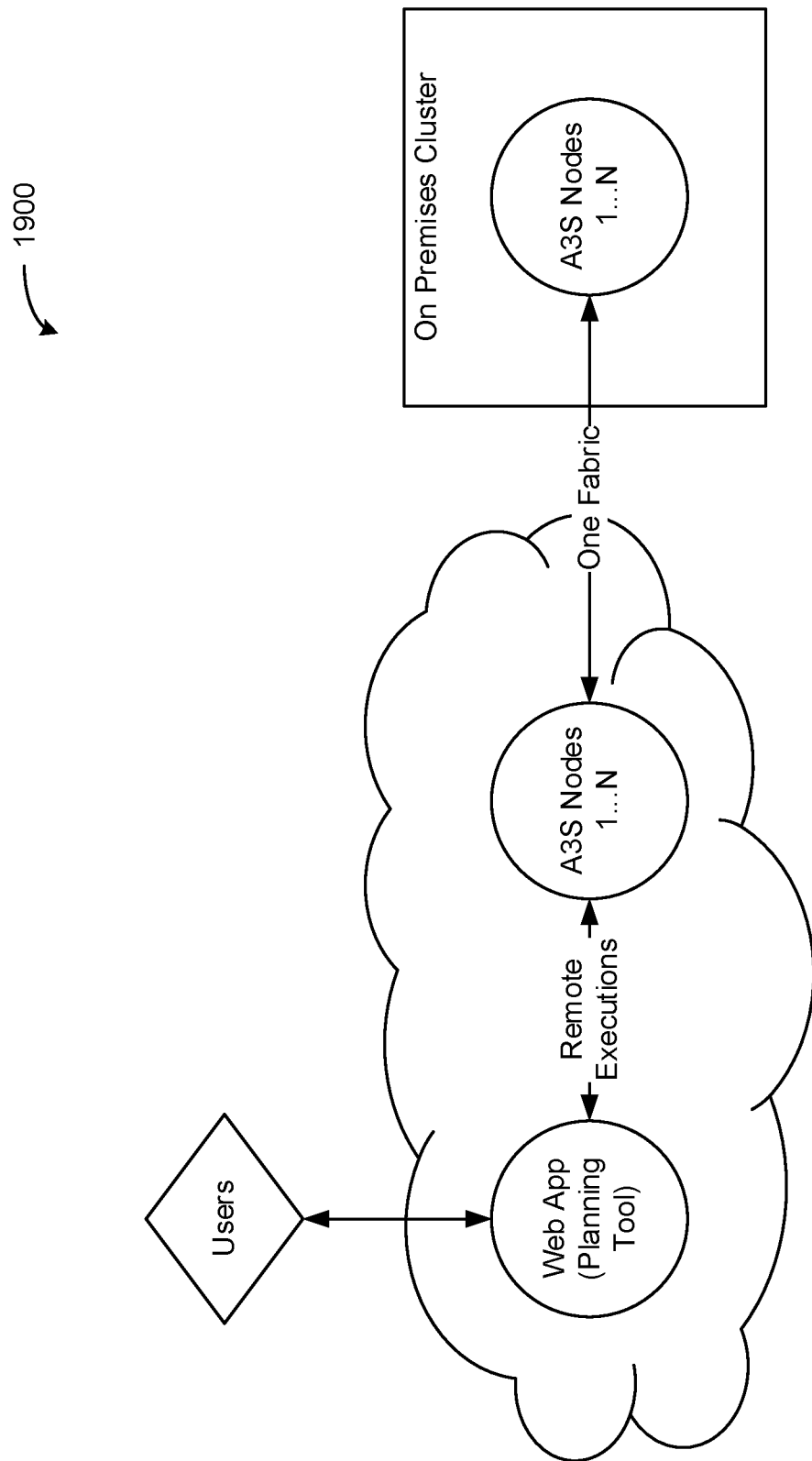
FIG. 19 is a block diagram of various A3S platform nodes, according to an exemplary embodiment.

Referring now to FIG. 19, a block diagram 1900 of A3S nodes being split between multiple machines is shown, according to an exemplary embodiment. The ideas captured in FIG. 19 show that the A3S platform 714 can be split up amongst even distant machines. Leveraging this allows for a technique of distributed processing that can save thousands of dollars of cloud costs while remaining perfectly robust to error. A3S nodes in the cloud to the service fabric are marked as high cost and the on premise nodes locally are marked as low cost. Service fabric can forward requests down to the on premise clusters to perform executions. If those executions hang or become unreliable, the A3S cloud instance can pick up the request and finish it itself for the premium price.

This means that any machines within a building could supplement the cloud operations and dramatically reduce cost and require little to no maintenance (if they break service fabric will ignore them). These machines can extend the A3S cluster and can run within a building (or wherever desired) and can be managed by the same group that manages Azure through the service fabric application.

The systems and method described herein provide a generalized platform that can dramatically reduce the time to market, improve quality and standardize algorithms by creating an architecture that requires little to no attention. Furthermore, the systems and methods described herein enable rapid deployment of concepts from algorithm developers to collaborative teams. These systems and methods also simplify the ability to test algorithms both online and offline by offering automated test environments hosted within the A3S platform 714. Overall, within advanced development, this architecture fully solves the problem of executing any algorithm in any environment using any data and doing it at scales that could run hundreds of thousands of parallel executions.

If a master cluster (e.g., a cluster in Azure) determines that a run requested is low priority and takes a long time to execute, the cluster would decide to send it to a data center cluster for computation even though this cluster may be potentially less reliable. It may make this decision because each cluster has a price tag, the master cluster, may like to save its own space for high priority work to prevent the master cluster from having to scale up and charge a premium price when the data center cluster is ideally free or close to it since the requester of the job may own the hardware of the data center. Overall, this ability to stich clusters together and optimally decide where to send the jobs to reduce the cost is the patentable content.

Hybrid Cluster Optimization

Referring generally to FIG. 19, a system 1900 including various nodes split up between a cloud computing system and an on premises cluster is shown, according to an exemplary embodiment. In some embodiments, the A3S platform 714 described herein may perform job optimization to minimize computing costs by performing job optimization with various nodes. The nodes may be Service Fabric clusters. These Service Fabric clusters may be pools of computing resources e.g., one or more datacenters, a plurality of desktop computers, etc. Service Fabric clusters may be created in a cloud (e.g., Microsoft Azure), inside a building (e.g., on-premises), or in any other datacenter, hosted cloud, or cloud computing server.

In some embodiments, the A3S nodes may be run on local systems within a building (i.e., on-premises systems) or in cloud servers (e.g., cloud computing via Microsoft Azure). Since performing computing jobs with cloud based A3S nodes may cost a particular amount of money, job optimization can leverage both local on-premises A3S nodes an cloud based A3S nodes to minimize computing costs and maintain computing reliability. By supplementing cloud based computing via the cloud based A3S nodes with low cost on-premises A3S nodes, computing costs can be reduced.

This idea of hybrid cluster optimization relies on the basis of reliability and availableness of clusters that are joined to each other. Consider having a cluster of A3S deployed in Azure and one deployed in a data center. In this scenario, the Azure deployment would be the "master" for any traffic that it has been given directly.

Figure 20:
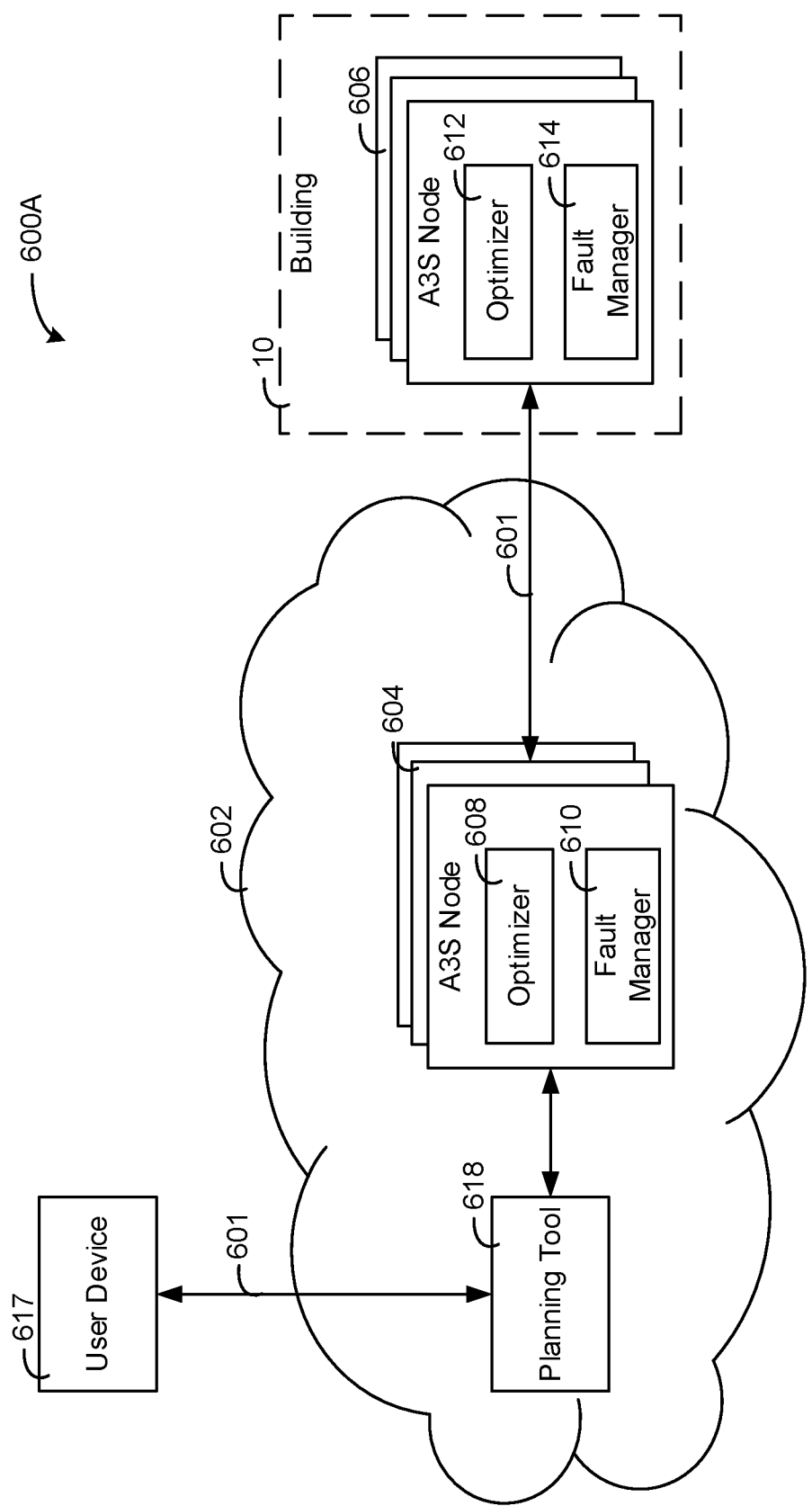
FIG. 20 is a block diagram of the A3S platform nodes of FIG. 19 optimizing job distribution, according to an exemplary embodiment.

Referring now to FIG. 20, a system 600A that can leverage hybrid cluster optimization is shown, according to an exemplary embodiment. System 600A is shown to include cloud server 602 and building 10. Cloud server 602 may be a cloud server such as Microsoft Azure. Both cloud server 602 and building 10 are shown to include one or more A3S nodes 604 and 606. There may be a plurality of A3S nodes in cloud server 602 and building 10, A3S node 604 and A3S node 606 are referred to in the singular for the sake of illustration.

A3S node 604 and A3S node 606 may be Microsoft Service Fabric Clusters (i.e., pooled computing resourced that Microsoft Service Fabric utilizes). A3S node 604 may be a deployment of an A3S node in a cloud server (e.g., Microsoft Azure) while A3S node 606 may be a deployment of an A3S node in a desktop computer or local building server in building 10. Both A3S node 604 and A3S node 606, though deployed in different locations, can be configured to perform the same or similar functionalities. A3S node 604 and A3S node 606 can be performed on one or more processing circuits, servers, or other computing devices. Examples of processing circuits, processors, memory, and data storage that can be configured to implement A3S node 604 and A3S node 606 are included in FIG. 4 (e.g., processing circuit 404, processor 406, and memory 408).

A3S node 604 is shown to communicate with A3S node 606 via network 601. In various embodiments, A3S node 604 and A3S node 606 can communicate computing jobs, results for computing jobs, computing job progress, status information, and/or any other data or indication. Network 601 may be can be any kind of network such as the Internet (e.g., TCP/IP), Ethernet, LAN, WAN, Wi-Fi, Zigbee, BACnet, 3G, LTE, Li-Fi, and/or any combination thereof. Network 601 may include one or more routers, modems, network switches, cellular towers, cellular repeaters, and/or any other hardware necessary for implementing a communications network.

A3S node 604 is shown to include optimizer 608 and fault manager 610. Optimizer 608 can be configured to receive a computing job and perform an optimization to determine whether A3S node 604 should perform the computing job itself or send the computing job to A3S node 606. Fault manager 610 can be configured to handle any faults that occur on either A3S node 604 and A3S node 606 when the job allocated by optimizer 608 is not finished by either A3S node 604 and A3S node 606. Optimizer 612 of A3S node 606 and fault manager 614 may be the same and/or similar to optimizer 608 and fault manager 610.

Optimizer 608 can be configured to receive a computing job. In some embodiments, the computing job is received from an external user (e.g., a request to generate a result) or is the result of a process being performed by A3S node 604 (e.g., automatically generating data analytics based on collected data). In some embodiments, A3S node 604 receives a computing job from planning tool 618. Planning tool 618 may be a component of cloud server 602 that allows a user to interface with system 600A via a user device (e.g., user device 617). Planning tool 618 may be a web application that a user can navigate to via a web address. In various embodiments, planning tool 618 communicates with an application running on user device 617.

User device 617 can be any computing device that a user can operate. In some embodiments, user device 617 is a laptop computer, a desktop computer, a smartphone, a tablet, and/or any other computing device. User device 617 can be configured to communicate with planning tool 618 via network 601. In some embodiments, a user can request a computing job via user device 617 and planning tool 618. In some embodiments, the computing job is provided to A3S node 604 via planning tool 618. In some embodiments, the job that user device 617 requests may be a request to perform calculations on data associated with building 10 and/or HVAC equipment of building 10. For example, a user may request an average daily electric cost for building 10 for a plurality of months or years. In some embodiments, the request may be a request to determine an average temperature of a particular zone of building 10 on a particular day.

Optimizer 608 can be configured to generate a cost function. Examples of cost functions are provided in U.S. patent application Ser. No. 15/616,616 filed on Jun. 7, 2017, the entirety of which is incorporated by reference herein. In some embodiments, optimizer 608 generates a cost function that depends on the price to perform the computing job based on a predicted computing time for each A3S nodes of system 600A, a priority level for the computing job, and a success probability of finishing the computing job for each of the A3S nodes of system 600A. In some embodiments, A3S node 604 stores processing metrics for each A3S node of system 600A. In this regard, optimizer 608 can determine the length of time it would take for each of the A3S nodes of system 600A to perform a computing job. In various embodiments, optimizer 608 can record the processing times of an A3S node that it has assigned a job in order to perform future optimizations. In various embodiments, optimizer 608 can request information from each of the A3S nodes of system 600A for a predicted computing time for a particular job. When performing its work, it has a list of external available clusters and can query their current load to consider in the cost function.

The cost function generated by optimizer 608 may indicate that computing jobs performed by A3S nodes in cloud server 602 are higher cost than performing computing jobs in A3S nodes that are on-premises (i.e., in building 10). In some embodiments, optimizer 608 determines, via the cost function, to perform the computing job itself. In this regard, if optimizer 608 determines that it is performing the computing job, any time that optimizer 608 determines that it needs data results from another computing job (e.g., a job performed by A3S node 604 and/or A3S node 606), optimizer 608 can be configured to pause the computing job and await. The algorithms may have a specific order in which they have to be solved and may pause each other to complete execution.

Fault manager 610 can be configured to determine if a job that optimizer 608 has sent to A3S node 606 has been completed and can retrieve and/or receive progress regarding the computing job. Optimizer 608 can monitor the progress of A3S node 606 to determine if that A3S node is performing the computing job and has not crashed, become hung-up, and/or gone unreliable. In response to demining that A3S node 606 has crashed, optimizer 608 can finish the computing job itself.

The cost function generated by the optimizer 608 can be a kind of objective function that can be minimized or maximized to select one of the A3S nodes (e.g., the A3S node 604 and/or the A3S node 606) to perform the computing job. The objective function can be optimized by the optimizer 608 based on various constraints which control the optimization. An exemplary objective function that could be implemented by the optimizer 608 is shown below:

$$\arg\min_x J(x)$$

where J(x) is defined as follows:

$$J(x) = \sum_i node_i \times nodeCost_i$$

where $node_i$ is a binary value (e.g., one or zero) indicating whether the particular node was selected to perform the computing job and $nodeCost_i$ indicates the cost for performing a computing job by each of the nodes. The parameter $nodeCost_i$ may be a function of the cost of using the $node_i$ and the length of time that the node will be used. However, in some embodiments, $nodeCost_i$ could be a fixed value or could be correlated to a number of processor cycles required to perform a computing job. One example may be:

$$nodeCost_i = jobTime_i \times nodeRate_i$$

As shown, $nodeCost_i$ can be determined based on a parameter $jobTime_i$ which may be indicative of the required time for performing the computing job (e.g., 10 seconds, 40 ms, etc.) by the node and the rate (e.g., $/min) of $node_i$, $nodeRate_i$. The parameter $jobTime_i$ may be a function of the computing resources available by the $node_i$ and the size of the computing job.

The objective function would, by default, when minimized, determine the most cost efficient node to perform the computing job. However, such an optimization can be optimized with constraints which, rather than strictly selecting the least expensive node, select the most optimal node, the most optimally priced node for the computing job.

The optimization constraints may be either equality or inequality constraints. For example, an equality constraint may be that:

$$node_i + node_{i-1} + node_{i-2} + node_0 = 1$$

Since each of $node_i$ may be a binary value, this constraint may ensure that only one of the nodes is selected by the optimization. For example, when the objective function is optimized, the constraint shown above must hold true, i.e., only one of the nodes can be selected to perform the optimization for the optimization to be valid.

Furthermore, a constraint may be an inequality constraint. For example, an inequality constraint may be that:

$$availableResources_{node_i} \geq requiredAvailableResources$$

In the above inequality constraint, the constraint indicates that the available resources for a particular $node_i$ must be greater than or equal to particular requirement. For example, the requiredAvailableResources may indicate that a particular amount of resources must be available by the $node_i$ in order for that node to be selected to perform the computing job. The parameter requiredAvailableResources may be indicative of a requirement for the node to quality to perform the computing job. The values for the parameters requiredAvailableResources and $availableResources_{node_i}$ may be in units, or otherwise a function of, total available memory (MB, GB, TB), total unused memory, processing speed (MHz, GHz, THz), billion floating-point operations per second (gigaflop), etc.

A further inequality constraint may be a constraint that allows the optimization of the objective function to select a node that is best suited for a priority level of the computing job. Such an inequality constraint may be:

$$successProbability_{node_i} \geq f_i(jobCriticalityLevel)$$

A particular successProbability of $node_i$ may be indicative of how likely the $node_i$ is to complete the computing job and not crash or fail. For example, the successProbability may be determined based on the past performance of the $node_i$, i.e., the optimizer 608 can record the total number of jobs sent to a particular $node_i$ and the number of failed and completed jobs and use the recorded information to determine a probability and/or a probability distribution. The jobCriticalityLevel may be a level indicative of how critical the computing job is. The level may be on a discrete scale, low priority, medium priority, high priority (e.g., 1, 2, or 3). To be compared against a probability, the jobCriticalityLevel may be mapped, via a function or other mapping mechanism, onto a probability value comparable to the successProbability. For example, $f$(jobCriticalityLevel) may map the jobCriticalityLevel onto a value comparable to successProbability. The function, $f(\cdot)$ may be a function, a lookup table, or other mapping mechanism. As an example, if the jobCriticalityLevel is "high," $f_1(\cdot)$ may map the indication "high" onto a first predetermined probability value, e.g., 90%.

Another inequality constraint may be indicative of how long each $node_i$ will take to perform the computing job and the criticality level of the computing job. A "high" criticality job may need to be performed quickly while a low criticality job may not need to be performed quickly. An inequality constraint for the length of time to perform the computing job may be:

$$jobTime_{node_i} \leq requiredTime$$

The requiredTime may be a value indicative of the length of time required to perform the computing job. The inequality constraint, includes parameters, $jobTime_{node_i}$ and the previously described jobCriticalityLevel. The parameter $jobTime_{node_i}$ may be indicative of a length of time that it will take the $node_i$ to perform the computing job. In some embodiments, $jobTime_{node_i}$ is a function of multiple parameters of the $node_i$. An example calculation of $jobTime_{node_i}$ may be:

$$jobTime_{node_i} = f_2(availableResources_{node_i}, jobSize)$$

where jobSize indicates the size of the computing job. The size of the computing job, jobSize, may be in terms of number of computations required, complexity of the computations, etc.

Figure 21:
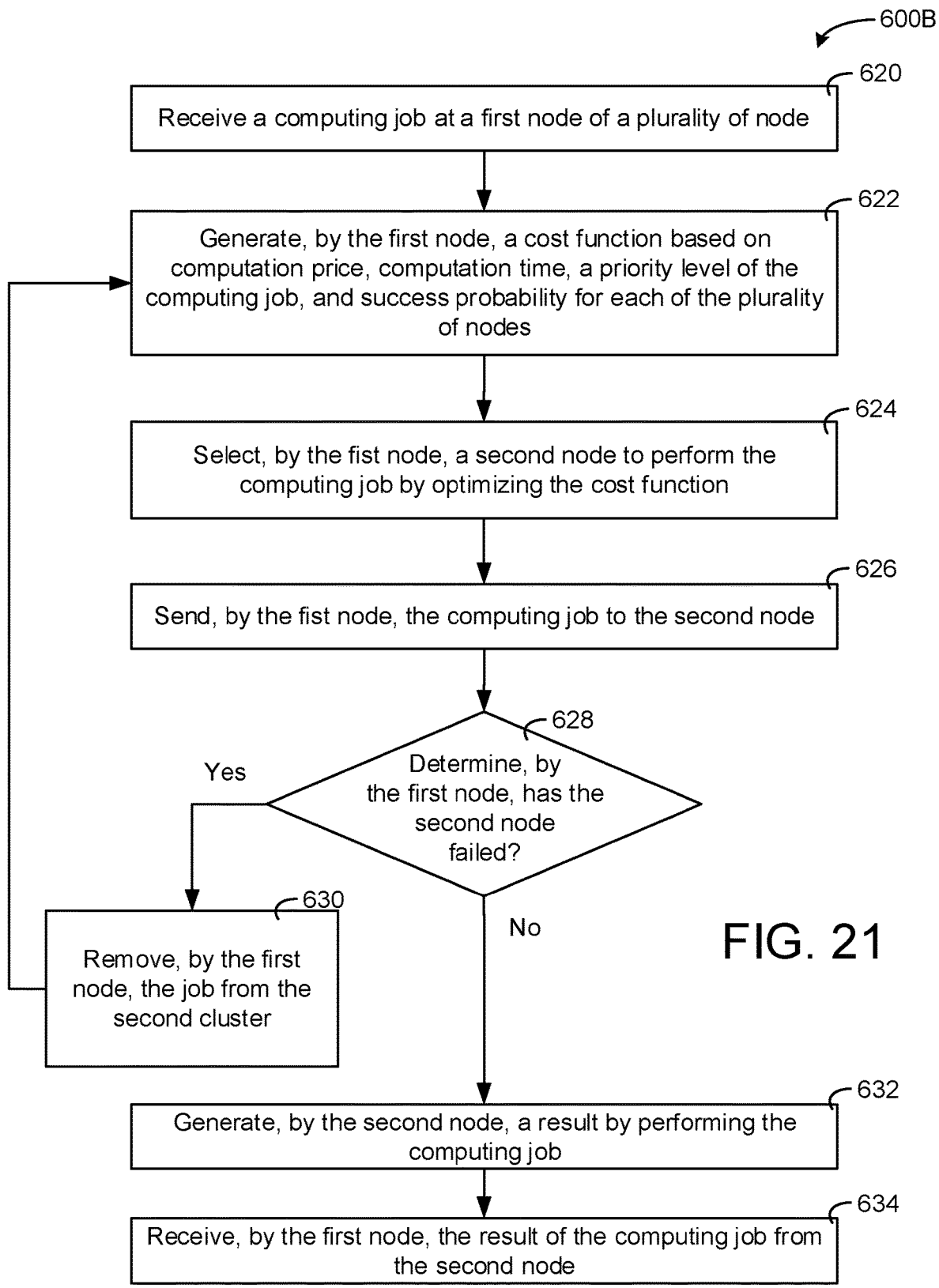
FIG. 21 is a flow diagram of a process for optimizing job distribution with the A3S platform nodes of FIG. 20, according to an exemplary embodiment.

Referring now to FIG. 21, a process 600B is shown to optimizing the distribution of computing jobs is shown, according to an exemplary embodiment. A3S node 604, A3S node 606, and any other computing device described herein can be configured to perform process 600B. A3S node 604 is described as the first node while A3S node 606 is described as the second node in process 600B. However, it should be understood that the roles of A3S node 604 and A3S node 606 can be reversed. Further, any number of A3S nodes that are cloud based and/or on-premises can be configured to perform process 600A.

In step 620, the first node, A3S node 604, can receive a computing job. In some embodiments, A3S node 604 can receive the computing job via a computing process currently running on A3S node 604, via planning tool 618 and/or user 502, and/or any other method for receiving a computer job. In step 622, optimizer 608 of the first node, A3S node 604, can be configured to generate a cost function for the received computing job. In some embodiments, the cost function generated by optimizer 608 is based on a priority level specified for the computing job, the computation time of each A3S node of system 600A, and a success probability of each A3S node of system 600A.

In step 624, the first node, A3S node 604, can select, via optimizer 608, a second node to perform the computing job by optimizing the cost function. In some embodiments, optimizer 608 can identify a node that would be optimal to perform the computing job. In some embodiments, the optimal A3S node is the first A3S node, A3S node 604. In various embodiments, the second A3S node is A3S node 604, an on-premises A3S node. Based on the selected node, A3S node 604 can send the computing job to the second node, A3S node 606 in step 626.

In step 628, fault manager 610 can determine the status of the computing job. Fault manager 610 may periodically receive a status update from A3S node 606 identifying the status of the computing job. In some embodiments, fault manager 610 periodically sends a request to A3S node 606 for a progress update. In some embodiments, the progress update indicates that A3S node 606 has crashed, is unreliable, or otherwise will not be completing the computing job. Further, if a predefined amount of time passes without receiving the result of the computing job or otherwise since receiving a progress update, fault manager 610 can determine that A3S node 606 has crashed, is offline, or otherwise unable to complete the computing job.

In response to determining, in step 628, that A3S node 606 will not be performing the computing job, fault manager 610 can remove the computing job from A3S node 606 (step 630). In some embodiments, removing the computing job includes performing the computing job via A3S node 604. FIG. 21 illustrates returning to step 622 and generating a second cost function. In some embodiments, the second cost function may not consider A3S node 606 since A3S node 606 has failed to finish the computing job.

In response to determining that the A3S node 604 has not failed, crashed, or otherwise will not finish the computing job, process 600B can proceed to step 632. In step 632, A3S node 606 can generate a result or results for the computing job. In step 634, A3S node 604 can receive the result or results from A3S node 606. Based on the result, the A3S node 606 can control various pieces of building equipment to control environmental conditions of the building. For example, if the result of the determination done by the A3S node 604 is a temperature setpoint, the A3S node 606 (or another A3S node) can control the building equipment to control building temperature to the setpoint.

Hybrid Cluster Disaster Recovery

Hybrid cluster optimization as described with reference to FIGS. 20-21 is responsible for saving money of the cluster and to perform load balancing between nodes amongst many different clusters. Hybrid cluster disaster recovery, as described with reference to FIGS. 22-23 focuses on how disasters within various clusters can be prevented from affecting customers.

Considering the scenario of Azure based clusters and two different data centers, a customer may request the Azure based cluster for an execution of an algorithm which then may optimally be dispatched to the first data center. During the execution of the algorithm, the first data center may send progress updates about the execution to the Azure cluster. If, for whatever reason, these messages are interrupted more than expected (e.g., defined by the algorithm itself and models that predict the algorithms behavior). The primary cluster in Azure may re-determine the best location for executing that algorithm. It may optimally relocate the algorithm execution either in its own cluster or in the second data center. Further, if the Azure data center has been compromised (e.g., too many nodes have gone offline) the load balancer (or one of its fallback replicas) will dispatch runs to neighboring clusters to ensure the work still is completed.

Hybrid cluster disaster recovery may include systems and method for recovering from A3S node crashes. Hybrid cluster disaster recovery can be used with the hybrid cluster optimization techniques described with reference to FIGS. 21-22. By combining optimization techniques with disaster recovery techniques, not only can optimization and cost savings be realized but redundancy can be implemented to prevent a computing job from never finishing (i.e., if the A3S node performing the computing job crashes).

Figure 22:
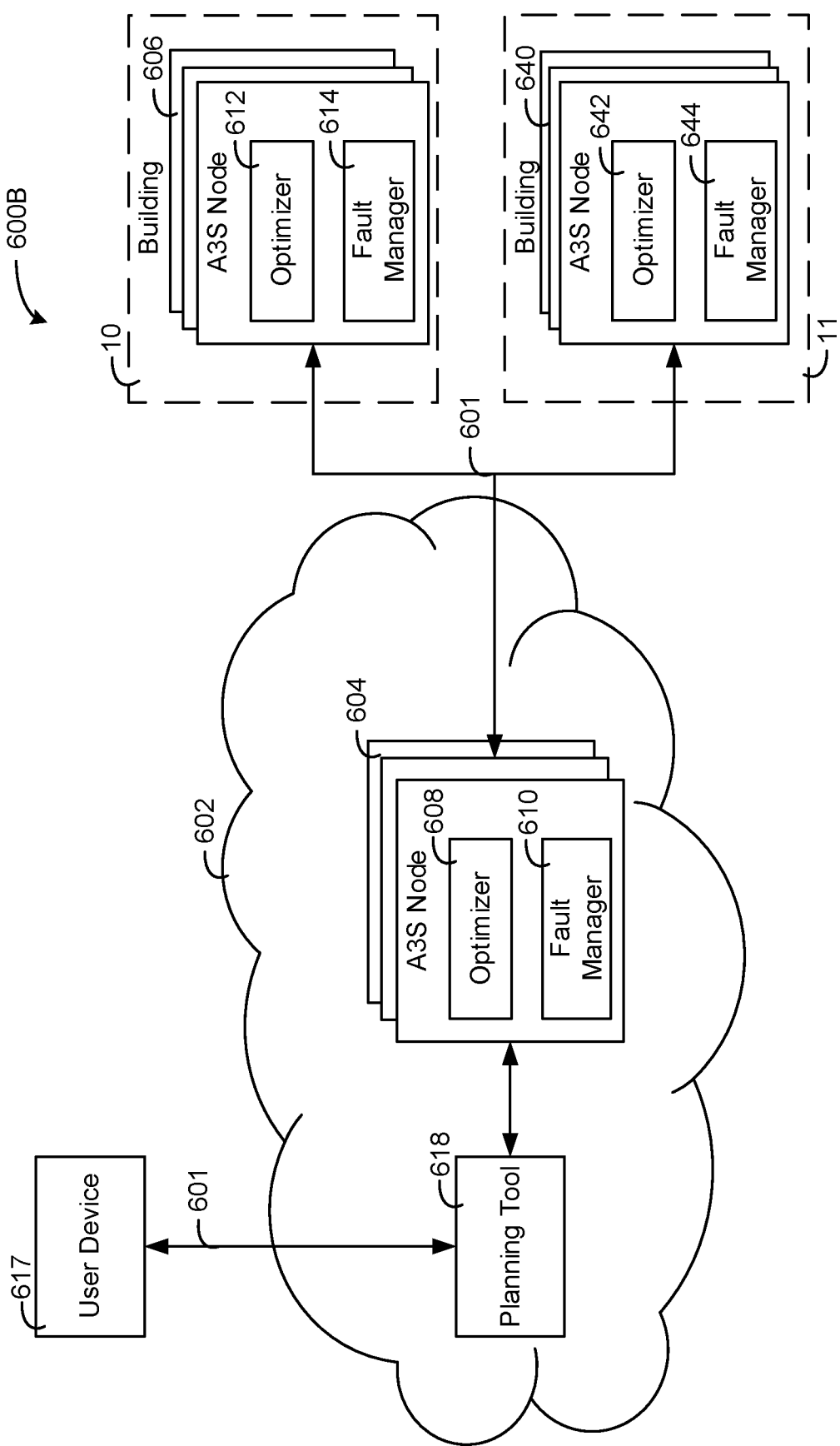
FIG. 22 is a block diagram of the A3S platform nodes of FIG. 19 recovering from one of the A3S platform nodes crashing and failing to complete a computing job, according to an exemplary embodiment.

Referring now to FIG. 22, system 600B is shown for performing disaster recovery, according to an exemplary embodiment. Various components of system 600B are the same and/or similar to the components of system 600A as described with reference to FIG. 20. In FIG. 22, a building 11 is shown to include an A3S node 640. Building 11 may be similar to building 10. In various embodiments, A3S node 640 is located in building 10 instead of building 11. A3S node 640 may be an on-premises A3S node that is the same and/or similar to A3S node 606. A3S node 640 is shown to include optimizer 642 and fault manager 644. Optimizer 642 may be the same and/or similar to optimizer 608 and optimizer 612. Further, fault manager 644 may be the same and/or similar to fault manager 610 and fault manager 614. A3S node 604 is shown to be in communication with both A3S node 606 and A3S node 640 via network 601.

In some embodiments, A3S node 604 receives a computing job (e.g., via user device 617) and determines to send the computing job to either A3S node 606 or A3S node 640. Fault manager 610 can be configured to receive progress updates regarding the performance of the computing job from the A3S node to which optimizer 608 sends the computing job. In some embodiments, fault manager 610 can determine if the progress messages it receives are being interrupted (e.g., are being sent to fault manager 610 at a low frequency (a frequency below a predefined amount)) and/or are not being sent to fault manager 610 at all.

As an example, A3S node 604 can determine via optimizer 608 to send a computing job to A3S node 606. A3S node 606 can be configured to perform the computing job. While A3S node 606 performs the computing job, fault manager 614 can be configured to send progress updates to A3S node 604. The progress updates may be messages indicating the status of the computing job (e.g. 50% completed, 90% completed, pending, completed, not started, etc.). In some embodiments, fault manager 614 sends a status indication for A3S node 606 that indicates that A3S node 606 is either online, offline, unresponsive, not functioning properly, etc. Fault manager 610 can receive the fault message.

In some embodiments, if fault manager 610 determines that A3S node 606 is not performing the computing job or is taking too long to perform the computing job, fault manager 610 can remove the computing job from A3S node 606 by sending a message to A3S node 606 indicating that the job is being re-appropriated. Fault manager 610 can cause optimizer 608 to perform a second optimization for the computing job. In some embodiments, based on the optimization, optimizer 608 may cause A3S node 604 to perform the computing job or send the computing job to A3S node 640 to be performed by A3S node 640.

Further, if A3S node 606 is performing a computing job it receives from A3S node 604 and fault manager 614 determines that various computing devices that make up A3S node 606 have gone offline, fault manager 614 can push part of the computing job to another A3S node. This may verify that the computing job is completed quickly without the need to re-optimize the allocation of the computing job via optimizer 608. For example, fault manager 614 could push various parts of the computing job (e.g., various calculations) to A3S node 640, receive the results of the computing job parts from A3S node 640, and report the total completed results to A3S node 604.

Figure 23:
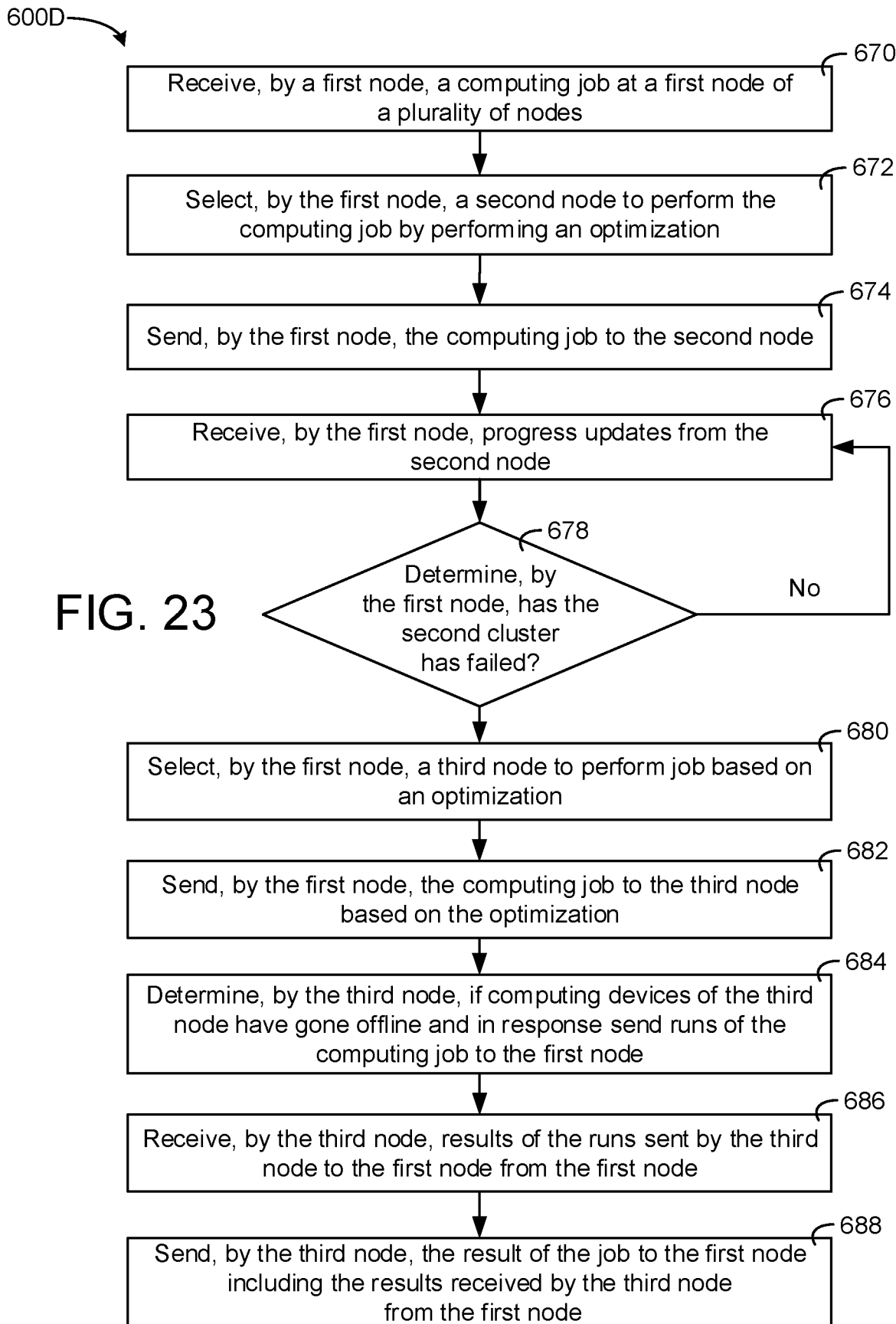
FIG. 23 is a flow diagram of a process for recovering from one or more A3S platform nodes of FIG. 22 crashing and failing to complete the computing job, according to an exemplary embodiment.

Referring now to FIG. 23, a process 600D for performing disaster recovery with A3S nodes is shown, according to an exemplary embodiment. A3S node 604, A3S node 606, A3S node 640 and any other computing device described herein can be configured to perform process 600D. A3S node 604 is described as the first node, A3S node 606 is described as the second node, while A3S node 640 is described as the third node in process 600B. However, it should be understood that the roles of A3S node 604, A3S node 606, and A3S node 640 are interchangeable. Further, any number of A3S nodes that are cloud based and/or on-premises can be configured to perform process 600D.

In step 670, the first node, A3S node 604 may receive a computing job, e.g., a job via user device 617 and/or planning tool 618. In step 672, optimizer 608 can select a second node to perform the computing job from a plurality of other A3S nodes (e.g., A3S node 606 and/or A3S node 640. In some embodiments, optimizer 608 performs the optimization described in FIGS. 20-21. In process 600D, the selected node is A3S node 606, however, it may be any other A3S node. In step 674, A3S node 604 can send the computing job to the second node, A3S node 606.

Based on the computing job it receives, A3S node 606 can perform the computing job. While performing the computing job, A3S node 606 can send progress updates regarding the execution of the computing job to A3S node 604, specifically, fault manager 610 of A3S node 604. Based on the progress updates received from A3S node 606, fault manager 610 can determine if A3S node 606 has failed or is still acceptably performing the computing job in step 678. If A3S node 606 has not failed, process 600D may return to step 676. If A3S node 606 has failed, process 600D can move to step 680.

In step 680, optimizer 608 can receive an indication from fault manager 610 that the computing job that A3S node 604 previously sent to A3S node 606 in step 674 will not be completed by A3S node 606. In step 680, optimizer 608 may select a second A3S node to perform the computing job. In some embodiments, optimizer 608 performs a similar optimization as the optimization performed in step 672. However, the optimization may not consider A3S node 606. In step 680, the third node is selected to perform the computing job. In process 600D the third A3S node is A3S node 640. However, the optimization may select any other A3S node.

In step 682, A3S node 604 can send the computing job to the selected third node, A3S node 640. A3S node 640 can perform the computing job and send progress updates to A3S node 640 which fault manager 610 can monitor (e.g., steps 676-682).

In step 684, fault manager 644 can monitor the status of the computing devices that make up A3S node 640 and are performing the computing job. In response to determining that a predefined number of computing devices have gone offline (e.g., more than a predefined amount), fault manager 644 can send particular runs of the computing job (e.g., particular calculations) to other A3S nodes, in process 600D, A3S node 604. A3S node 640 may receive the runs of the computing job and send the completed results of the runs to A3S node 640 (step 686). Once A3S node 640 completes the job, which may be based on computing work that A3S node 640 has done itself or that A3S node 604 has helped with, A3S node 640 can send the result of the computing job to A3S node 604, the A3S node that originally received the request outperform the computing job (step 688).

Parallel Relationship Engine

Given a relational data model (e.g., the data model 799), a computing engine can break down analytical relationships between properties of the relational data model into distances from raw data. The engine can further manage recursion in the relationship data model. The computing engine can use a load balancer to calculate all relationships at a given distance from raw data and sequentially processes through the buckets until all relationships requested have been computed. The engine can dramatically increase throughput of a processor by resolving relationships within the hierarchical structure of the CML 710. This may enable systems that employ the CML and the parallel execution engine (e.g., an execution engine included in the A3S platform 714) to provides custom analytics for both reports and input data where measurements are not available. This solution views the problem at the highest level based on what data is requested and runs through the relationships as fast as possible.

The parallel relationship engine can take in a model that consists of graphed relationships between properties and breaks the graph down into a parallelizable execution order. Then the parallel relationship engine can load balances the execution of the graph in parallel in order of the property's distance to raw root properties. The parallel threads may move ahead in the execution order if the proceeding step has all of its dependencies satisfied. The execution map will vary dramatically based on where the raw data properties exist. Also, the parallel relationship engine may encounter recursions. In the case of recursion, computations based on recursion properties may be performed at the end of the execution cycle to ensure full data is present for use. Recursion may cause the computing engine to return empty results if loops (e.g., infinite loops) are detected.

Figure 24:
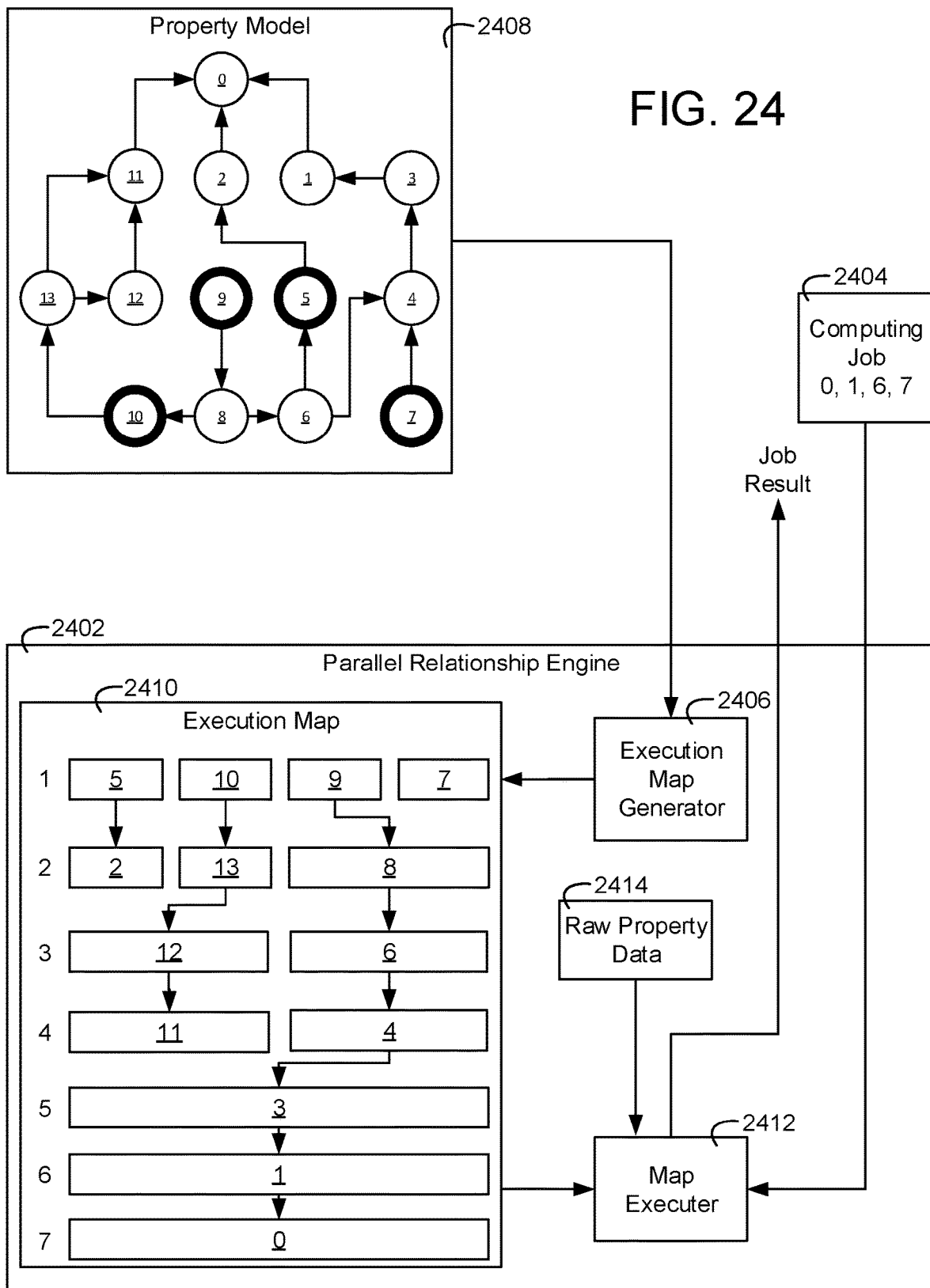
FIG. 24 is a block diagram of a parallel relationship engine that can be configured to optimize the execution of determining properties, according to an exemplary embodiment.

Referring now to FIG. 24, a block diagram of a parallel relationship engine 2402 for performing computations in parallel is shown, according to an exemplary embodiment. Parallel relationship engine 2402 is shown in FIG. 24. In other words, FIG. 24 shows parallel relationship engine 2402. This is evident from FIG. 24, in which parallel relationship engine 2402 is depicted. A person of ordinary skill in the art, upon viewing FIG. 24, would see parallel relationship engine 2402, among other components. As used herein, the reference character 2402 designates the parallel relationship engine, which is shown in FIG. 24. Parallel relationship engine 2402 may be a component of the A3S platform 714 that can be deployed, for example, on A3S node 604 as described with reference to FIG. 20. Parallel relationship engine 2402 may run on a one or more processing circuits, one or more processors, and/or be stored in one or more memory devices (e.g., processing circuit 404, processor 406, and/or memory 408 as described with reference to FIG. 4).

Parallel relationship engine 2402 is shown to receive computing job 2404. Computing job 2404 may be a request to perform a computation. In some embodiments, the request is received by parallel relationship engine 2402 from another component of the platform on which parallel relationship engine 2402 is implemented. In various embodiments, the computing job may be received from a user (e.g., from planning tool 618 and/or user device 617 as described with reference to FIG. 20). Computing job 2404 may include a request to compute particular properties (e.g., data points, variable values, etc.). In FIG. 24, computing job 2404 is shown to include a request to calculate properties 0, 1, 6, and 7. However, the computing job 2404 can include a request to compute any property or any number of properties.

Property model 2408 is shown in FIG. 24. Property model 2408 includes a map of relationships between various properties including the properties requested to be calculated by computing job 2404. In various embodiments, property model 2408 is part of and/or is otherwise based on the class structure the CML class structure described with reference to FIG. 8. The property model 2408 can be and/or may be similar to the data model 799 as described with reference to FIGS. 7A, 7B, and 8. Property model 2408 may be stored by the platform that includes parallel relationship engine 2402, may be stored by parallel relationship engine 2402, and/or may otherwise be retrieved, received, or extracted from a storage location by the platform that runs parallel relationship engine 2402.

Property model 2408 is shown to include properties 0-13. The property model 2408 may include any number of properties. Property model 2408 of FIG. 24 illustrates the various dependencies between the properties. For example, property 4 is shown to depend from property 6 and 7 while property 3 is shown to depend from property 4. Some of the properties, namely, property 5, property 7, property 9, and property 10 are bolded. These bolded properties represent raw properties. The raw properties may be properties where data exits that has not been processed for use. In some embodiments, the raw data is data that a user has manually entered, a sensor or actuator has collected, or any other data that has not been processed.

Parallel relationship engine 2402 is shown to receive computing job 2404 and property model 2408. Execution map generator 2406 can generate execution map 2410 based on property model 2408. Execution map generator 2406 can be store and/or load property model 2408 for use in generating a result for the computing job 2404. In some embodiments, execution map generator 2406 generates a total distance of each property to a raw property. For example, considering property 1, property 1 has a maximum dependency of four properties between property 3 and a raw property (i.e., raw property 9). For this reason, property 1 is placed in slot six of execution map 2410. Considering property 6, there is one property, property 8 between property 6 and raw property 9. For this reason, property 6 is placed in the third slot of execution map 2410. Since raw properties 5, 9, 7, and 10 include data, these raw properties are placed in slot one of execution map 2410. Execution map generator 2406 can provide execution map 2410 to map executer 2412.

Map executer 2412 can receive execution map 2410 and generate a result for computing job 2404 based on execution map 2410. Map executer 2412 can perform the calculations for each slot of execution map 2410 in parallel. For example, in slot 1, raw data points 5, 10, 9, and 7 exist. This step may simply be retrieving and/or loading raw data points 5, 10, 9, and 7. However, since there are no dependencies between raw properties 5, 19, 9, and 7, map executer 2412 can retrieve the data in parallel. This raw data may be stored in raw property data 2414. In slot 2, map executer 2412 can, in parallel, determine property 2, property 13, and property 8 since property 2, property 13, and property 8 do not depend from each other. Property 2 can be determined by map executer 2412 based on property 5, property 13 can be determined based on property 10, and property 8 can be determined based on raw property 9. Map executer 2412 can continue this execution until all the properties of execution map 2410 are determined or until the properties requested in computing job 2404 are determined. Map executer 2412 can provide the result of executing execution map 2410 to any component or device that requested computing job 2404.

The various "threads" (e.g., the thread from property 5 to 2, the thread from property 10 to property 11, etc.) included in execution map 2410 can be performed simultaneously in so far as there are no cross dependencies. If one thread depends from a second thread, the execution of the first thread may pause whenever a property determined in the second thread is needed for performing the first thread.

Recursion in property model 2408 may occur when one of the properties of property model 2408 depends either directly or indirectly from itself or when a particular determination is performed repeatedly. In response to determining that property model 2408 includes recursion, execution map generator 2406 may place the properties that involve recursion at the end of execution map 2410 so that map executer 2412 attempts to determine the recursion properties after determining all properties that do not involve recursion. In some embodiments, map executer 2412 may return no value (e.g., an empty value) for any property that involves recursion.

Figure 25:
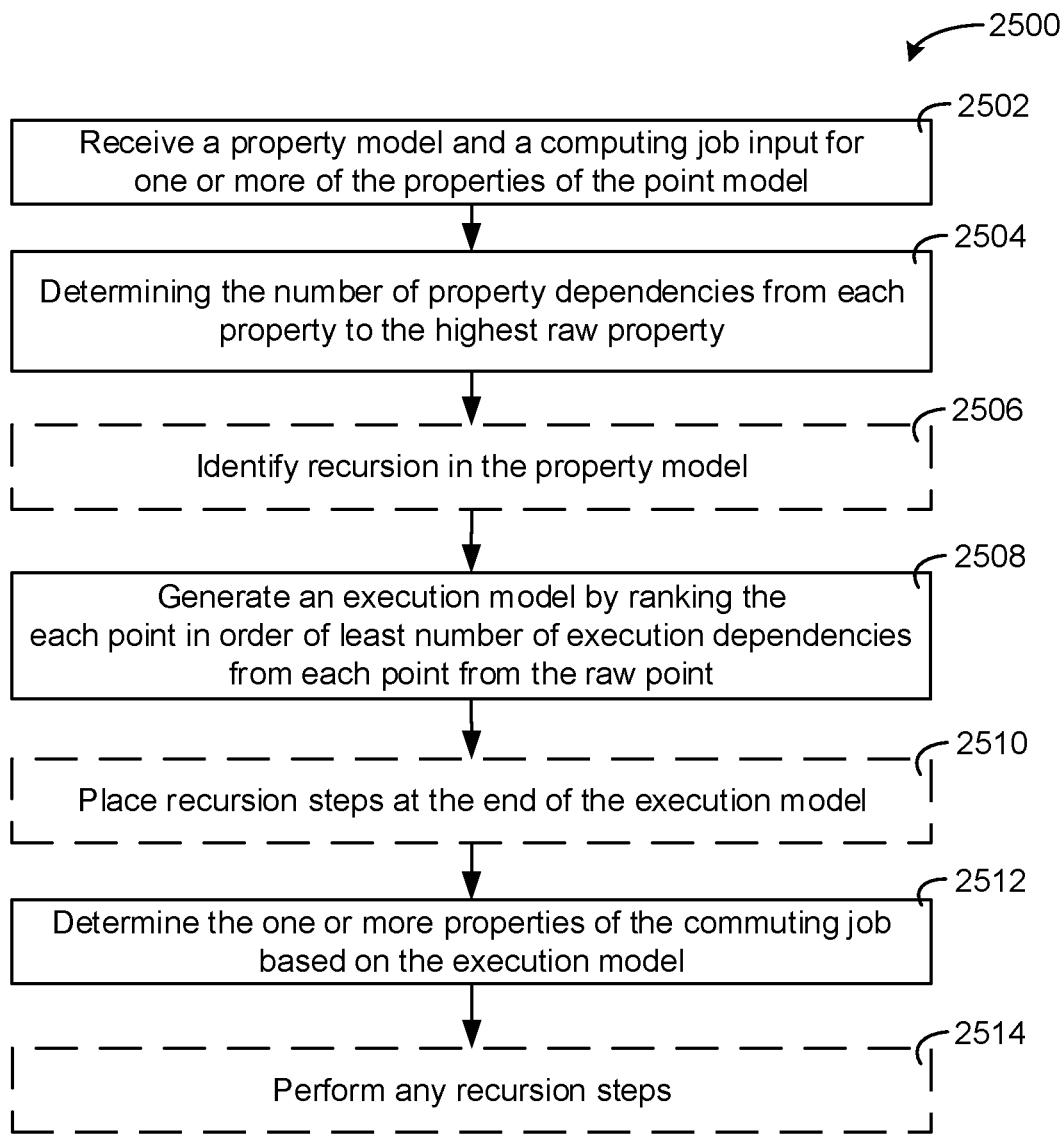
FIG. 25 is a process for optimizing the execution of determining properties that can be performed with the parallel relationship engine of FIG. 24, according to an exemplary embodiment.

Referring now to FIG. 25, a process 2500 for determining a result for a computing job (e.g., the computing job 2404) is shown, according to an exemplary embodiment. In step 2502, execution map generator 2406 may receive property model 2408 while map executer 2412 can receive computing job 2404. In some embodiments, computing job 2404 includes a request to compute certain properties. In this regard, execution map generator 2406 may retrieve, receive, generate, and/or use a property model that includes the properties indicated in computing job 2404.

In steps 2504 and 2508, execution map generator 2406 can be configured to generate execution map 2410 based on property model 2408. In some embodiments, execution map generator 2406 can determine the distance from each property to the highest raw property in property model 2408 and use the distance from each property to the highest raw property in property model 2408 to organize the properties in execution map 2410. The "highest" raw property refers to the highest raw property in the hierarchy of property dependencies illustrated in property model 2408. For example, in FIG. 24, property 4 is dependent from two raw properties. Property 4 depends from raw property 7. Furthermore, property 4 depends on property 6 which depends from property 8. Property 8 in turn depends from raw property 9. For raw property 7, there the total "distance" is two. For raw property 9, the total "distance" is four. Since raw property 9 is the "farthest" or "highest" raw property in relation to property 4, the execution map generator 2406 would determine that the number of dependencies between property 4 and raw property 9 (i.e., four) for determining the location to place the execution of property 4 in execution map 2410.

In step 2512, map executer 2412 can determine the properties requested to be determined in computing job 2404. In some embodiments, based on execution map 2410 and any raw properties in execution map 2410 that map executer 2412 can retrieve from raw property data 2414, the requested properties can be determined. Map executer 2412 may determine the properties in parallel based on the slots that each property is located. For example, properties 12 and 6 can be determined simultaneously while properties 11 and 4 can be determined simultaneously. The various "threads" (e.g., the thread from property 5 to 2, the thread from property 10 to property 11, etc.) included in execution map 2410 can be performed simultaneously in so far as there are no cross dependencies between threads. If one thread depends from a second thread, the execution of the first thread may pause whenever a property determined in the second thread is needed for performing a determination of a property in the first thread.

In some embodiments, the values determined for the properties are used to control building equipment of a building. For example, one property may be a temperature setpoint than can then be used to cause the building equipment to control the temperature of the building to a particular temperature. Another property could be a runtime setting for a chiller that causes the chiller to run during specific times of a period.

Steps 2506, 2510, and 2514 deal with recursion in property model 2408. These steps are indicated via dashed boxes in FIG. 25. These steps may only be performed by parallel relationship engine 2402 when there is recursion in property model 2408. In step 2506, execution map generator 2406 can determine if there is any recursion in property model 2408. In step 2510, any of the identified recursion points can be placed at the end of execution map 2410 i.e., in the last execution slot. In step 2514, after all other properties have been determined by map executer 2412, map executer 2412 can determine the properties that involve recursion. In some embodiments, if the recursion is infinite, map executer 2412 may return, an empty value or no value. If the recursion is finite (e.g., less than a predefined number of recursions), map executer 2412 can determine the properties that involve recursion based on the finite number of iterations.

Live Memory Techniques

Figure 26A:
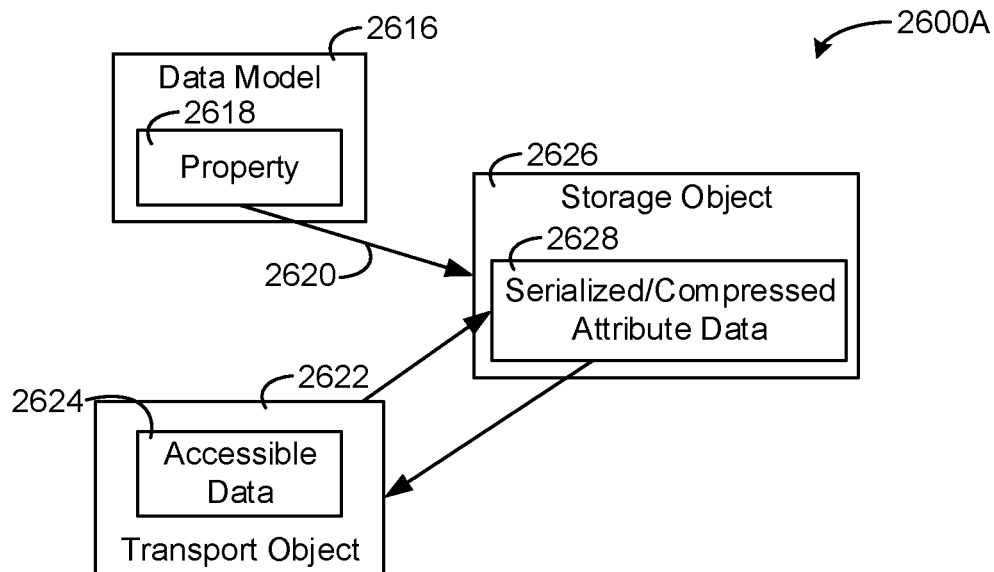
FIG. 26A is a block diagram of a data model and a storage object and a transport object which minimize the size of a data model, according to an exemplary embodiment.

Referring now to FIG. 26A, a block diagram 2600A is shown illustrating the live memory techniques that can be implemented by the systems and methods discussed herein, according to an exemplary embodiment. The live memory techniques may include storing relationships in a non-serialized and open class form but leaving the data in compressed and serialized boxes. This is described further with reference to the class structure of CML 710 described with reference to FIG. 8.

The C# language can be used as an example to illustrate live memory techniques. For example, a class called "Foo" may have ten properties. A Foo object could be created based on the Foo class and one of the properties of the Foo object can be accessed. The normal behavior may be whatever object the property is would be resting at the pointer location the Foo property targets. In a data model (e.g., the data model 799), the properties of the classes all point to byte arrays under the hood that at calling of the property are decompressed and de-serialized the byte array into the object the property really points to and lets the user interact with that. When the user is done with the object any updates go back into the boxed form and the objected is serialized and compressed. When the Foo class goes to transport, all that is required is to serialize the relationship data therefore transportation conversion happen almost instantaneously.

In FIG. 26A, a data model 2616 is shown. The data model 2616 can be a data model for a building and can be implemented via the CML 710 e.g., the data model 799. In some embodiments, the data model 2616 indicates all environmental and equipment information for a building, campus, facility, school. For example, the data model may indicate various temperature points recorded for various zones of the building. The data model may further indicate the types of equipment located and/or serving the building. The data model may identifying both data (e.g., recorded temperature data, recorded airflow values, etc.) and relationships between various entities and the data. For example, the data model could indicate that a particular sequence of temperature value are associated with a particular zone of the building.

The data model 2616 is shown to include a property 2618. The data model 2616 includes multiple properties 2618, according to some embodiments. The property 2618 may be temperature data, airflow data, occupancy data, weather conditions, etc. The property 2618 of the data model 2616 may "point" to serialized and/or compressed data. For example, a piece of data (e.g., a pointer, a handle, etc.) 2620 may indicate the location in memory where the serialized data is stored. The data model 2616 can include various pointers or handles that indicate the storage object 2626 or other storage objects for the data model 2616.

The serialized/compressed data 2628 may be serialized and/or compressed after being serialized. Serializing data may be generating a "box" of values that remove metadata. For example, three temperature readings could each have information indicating the value of the temperature reading, the zone the temperature reading is associated with, the type of temperature sensor taking the reading, etc. Only the value of the reading may be relevant, the other metadata may be redundant. Therefore, this metadata can be stripped when serializing the data. Various techniques can be used to serialize data including GOOGLE'S® protocol buffer technique. The serialized data can then be compressed via any known data compression algorithm. Compressing the serialized data may further reduce the memory footprint of the data.

The storage object 2626 may be a data object that includes the serialized/compressed data 2628 and/or any other metadata necessary for the serialized/compressed data 2628. The storage object 2626 can be used to generate the transport object 2622. The transport object 2622 can include accessible data 2624. The accessible data 2624 may be a decompressed and/or de-serialized version of the serialized/compressed data 2628. In some embodiments, the serialized/compressed data 2686 is a byte array which can be used to generate the accessible data 2624. The appropriate metadata for the accessible data 2624 may be included in the transport object 2622.

In some embodiments, in response to a request for the property 2618, the serialized/compressed data 2628 can be de-serialized and/or decompressed to generate the accessible data 2624. This accessible data 2624 can be used in algorithms which generate control commands for building equipment, display to a user, and/or any other calculation and/or determination. If changes are made to the accessible data 2624, the accessible data can be serialized and/or compressed into the serialized/compressed data 2628.

Figure 26B:
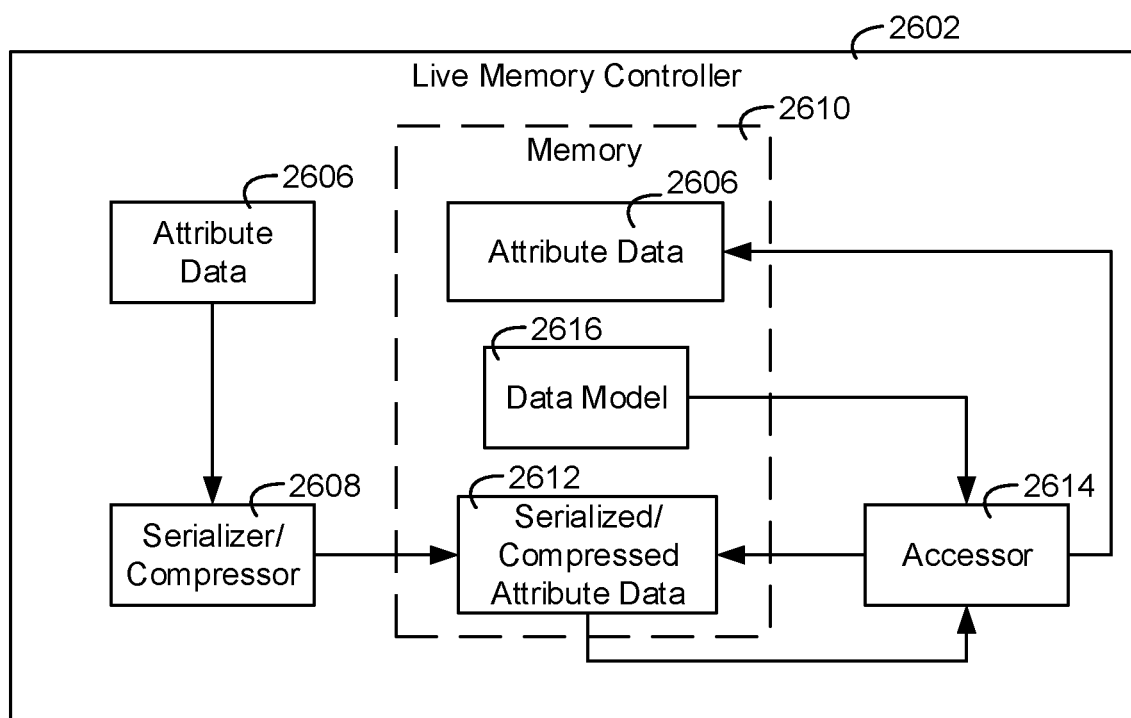
FIG. 26B is a block diagram of a live memory controller that can be configured to minimize the size of the data model of FIG. 26A, according to an exemplary embodiment.

Referring now to FIG. 26B, a block diagram is shown for a live memory controller 2602 that can be configured to serialize and compresses property data for a data model (e.g., the data model 799), according to an exemplary embodiment. The live memory controller 2602 may be a component of the A3S platform 714 and can be implemented via a processing circuit (processing circuit 404), processor (e.g., processor 406), and/or memory (e.g., memory 408).

In FIG. 26B, attribute data 2606 is shown. Attribute data 2606 may be data that is part of an object that is defined via the attribute class, the attribute class shown in FIG. 8. Attribute data 2606 can be serialized and/or compressed via serializer/compressor 2608. In some embodiments, the serialized and/or compressed data may serialized into a byte array and then can be compressed. This serialized and/or compressed data may be the data stored in the "box," a byte array shown in the attribute class in FIG. 8. Serializer/compressor 2608 may serialize via attribute data 2606 via a Protocol Buffer e.g., GOOGLE'S® protocol buffer technique. Any kind of lossy or lossless compression can be performed on attribute data 2606 by serializer/compressor 2608 after the attribute data 2606 is serialized.

In various embodiments, live memory controller 2602 may load serialized and/or compressed form of attribute data 2606 into a memory device instead of attribute data 2606 itself. This may minimize the requirements of the memory device (e.g., allow for memory devices with lower memory) and further allow for attribute data 2606 to be large. Memory 2610 may be one or more memory devices (e.g., RAM, ROM, etc.) of a computing device (e.g., cloud computing server, desktop computer, data center computer, etc.).

In response to determining that the attribute data 2606 is needed for a calculation, determination, or viewing by a user, the accessor 2614 can be configured to retrieve the accessed attribute data 2606 from the memory 2610. The accessor 2614 can be configured to identify the accessed attribute data 2606 requested based on the data model 2616. The data model 2616 is described with further reference to FIG. 26A. The accessor 2614 can derive a "key" which may indicate what serialized data stored in memory 2610 is required to be retrieved to generate the attribute data 2606. For example, the key may indicate which handle of multiple handles, locates the serialized data required. For example, data model 2616 may include various pointers or handles that can be used to identify the serialized and/or compressed data that needs to be retrieved, decompressed, and de-serialized.

Figure 26C:
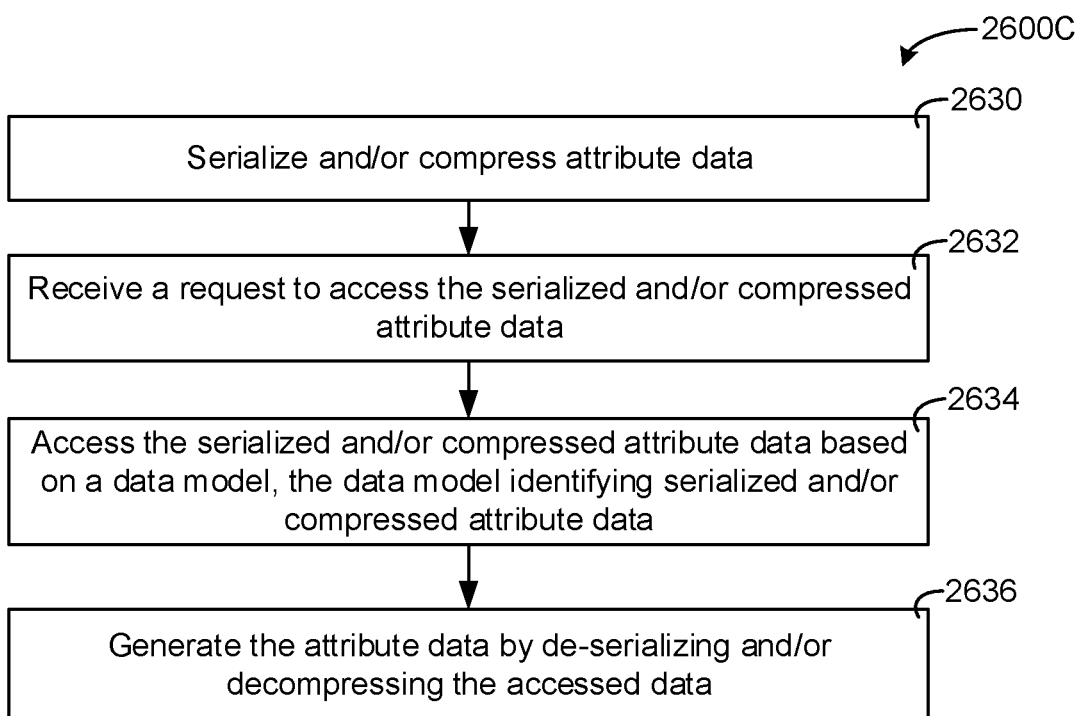
FIG. 26C is a flow diagram of a process for minimizing the size of a data model with the live memory controller of FIG. 26A, according to an exemplary embodiment.

Referring now to FIG. 26C, a process 2600C for serializing, compressing, de-serializing, and decompressing attribute data is shown, according to an exemplary embodiment. The A3S platform 714 and/or any other computing device described herein can be configured to implemented process 2600C. Process 2600C is described with reference to the components of FIGS. 26A and 26B.

In step 2630, the serializer/compressor 2608 can serialize and/or compress the attribute data 2606. For example, the serializer/compressor 2608 can serialize using one or more serializing protocols (e.g., GOOGLE'S® protocol buffer technique or another object serialization as supported by many programming languages).

In step 2632, the accessor 2614 may receive a request to the serialized/compressed attribute data 2612. The accessor 2614 can identify the serialized/compressed attribute data 2612 based on the data model 2616. The data model 2616 may include multiple handles or pointers that identify the location of the serialized compressed attribute data 2612 (step 2634). In step 2636, the accessor 2614 can generate the attribute data 2606 by decompressing and/or de-serializing the serialized/compressed attribute data 2612. In some embodiments, the attribute data 2606 is used to control various pieces of building equipment. For example, a building management system or controller can be configured to cause building equipment of a building to control environmental characteristics of the building based on attribute data 2606. The attribute data 2606 could be environmental temperature data used to establish a setpoint. In this regard, the building equipment can be controlled with the setpoint.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for executing computations in parallel for a building management system of a building, the method comprising:
   receiving, via a processing circuit of the building management system, a computing job request to determine values for one or more particular properties;
   receiving, via the processing circuit of the building management system, a property model indicating dependencies between a plurality of properties, the plurality of properties comprising the one or more particular properties, wherein the plurality of properties comprise raw properties;
   generating, via the processing circuit of the building management system, two or more computing threads based on the property model, wherein each computing thread comprises a sequence of computations for determining a value for each of the plurality of properties, wherein generating the two or more computing threads comprises:
      determining, for each property of at least some of the plurality of properties, a greatest dependency distance from the property to the raw properties; and
      ordering computations of the at least some of the plurality of properties in the two or more computing threads based on the greatest dependency distance of each of the at least some of the plurality of properties; and
   executing, via the processing circuit of the building management system, the two or more computing threads in parallel to determine the values for the one or more particular properties.

2. The method of claim 1, further comprising controlling, via the processing circuit of the building management system, one or more pieces of building equipment of the building to control an environmental condition of the building based on the values for the one or more particular properties.

3. The method of claim 1, wherein the dependencies between the plurality of properties comprise a computational relationship between one or more of the plurality of properties, wherein the computational relationship between the one or more of the plurality of properties indicates that a first value of a first property of the plurality of properties relies on a second value of a second property of the plurality of properties.

4. The method of claim 1, wherein executing, via the processing circuit of the building management system, the two or more computing threads in parallel comprises performing one or more determinations of the value of each of the plurality of properties of the two or more computing threads and pausing execution of one of the two or more computing threads in response to determining that not all thread dependencies between the one of the two or more computing threads and another of the two or more computing threads for a current computation of the one of the two or more computing threads has been satisfied.

5. The method of claim 1, wherein the method further comprises:
   identifying, via the processing circuit of the building management system, recursion in the dependencies of the plurality of properties of the property model; and
   generating, via the processing circuit of the building management system, the two or more computing threads to include one or more computing steps associated with the recursion at an end of the two or more computing threads.

6. The method of claim 5, wherein the method further comprises:
   determining, via the processing circuit of the building management system, whether the two or more computing threads comprising the recursion create an infinite recursive loop; and
   returning, via the processing circuit of the building management system, an empty result for the plurality of properties associated with the infinite recursive loop.

7. The method of claim 1, wherein the raw properties comprise data that has not been processed, wherein the raw properties comprise environmental data collected by building equipment of the building.

8. The method of claim 7, wherein executing, via the processing circuit of the building management system, the two or more computing threads in parallel comprises generating the value for each of the plurality of properties based on the dependencies between the plurality of properties;
   wherein the raw properties are first properties used in a first determination of the sequence of computations of the two or more computing threads, wherein the value for each of the plurality of properties depends on raw property values for the raw properties.

9. The method of claim 1, wherein determining, via the processing circuit of the building management system, for each of the at least some of the plurality of properties, the greatest dependency distance from the property to the raw properties comprises:
   determining a number of dependencies between the property to each of the raw properties; and
   determining the greatest dependency distance from the property to the raw properties by comparing each of the number of dependencies between the property to each of the raw properties, wherein the greatest dependency distance is one of the number of dependencies that is a greatest number of dependencies.

10. A building management system of a building for executing computations in parallel, wherein the building management system comprises a processing circuit configured to:
    receive a computing job request to determine values for one or more particular properties;
    receive a property model indicating dependencies between a plurality of properties, the plurality of properties comprising the one or more particular properties, wherein the plurality of properties comprise raw properties;
    generate two or more computing threads based on the property model, wherein each computing thread comprises a sequence of computations for determining a value for each of the plurality of properties, wherein generating the two or more computing threads comprises:
       determining, for each property of at least some of the plurality of properties, a greatest dependency distance from the property to the raw properties; and
       ordering computations of the at least some of the plurality of properties in the two or more computing threads based on the greatest dependency distance of each of the at least some of the plurality of properties; and
    execute the two or more computing threads in parallel to determine the values for the one or more particular properties.

11. The system of claim 10, wherein the processing circuit is configured to control one or more pieces of building equipment of the building to control an environmental condition of the building based on the values for the one or more particular properties.

12. The system of claim 10, wherein the dependencies between the plurality of properties comprise a computational relationship between one or more of the plurality of properties, wherein the computational relationship between the one or more of the plurality of properties indicates that a first value of a first property of the plurality of properties relies on a second value of a second property of the plurality of properties.

13. The system of claim 10, wherein the raw properties comprise data that has not been processed, wherein the raw properties comprise environmental data collected by building equipment of the building.

14. The system of claim 13, wherein the processing circuit is configured to execute the two or more computing threads in parallel by generating the value for each of the plurality of properties based on the dependencies between the plurality of properties;
    wherein the raw properties are first properties used in a first determination of the sequence of computations of the two or more computing threads, wherein the value for each of the plurality of properties depend on raw property values for the raw properties.

15. The system of claim 10, wherein determining, for each of the at least some of the plurality of properties, the greatest dependency distance from the property to the raw properties comprises:
    determining a number of dependencies between the property to each of the raw properties; and
    determining the greatest dependency distance from the property to the raw properties by comparing each of the number of dependencies between the property to each of the raw properties, wherein the greatest dependency distance is one of the number of dependencies that is a greatest number of dependencies.

16. A non-transitory computer-readable medium having machine instructions stored therein, the machine instructions being executable by a processor of a building management system to perform operations comprising:
    receiving a computing job request to determine values for one or more particular properties;
    receiving a property model indicating dependencies between a plurality of properties, the plurality of properties comprising the one or more particular properties, wherein the plurality of properties comprise building data for a building, wherein the plurality of properties comprise raw properties, wherein the raw properties comprise data that has not been processed, wherein the raw properties comprise environmental data collected by building equipment of the building;
    generating two or more computing threads based on the property model, wherein each computing thread comprises a sequence of computations for determining a value for each of the plurality of properties, wherein generating the two or more computing threads based on the property model comprises:
- determining, for each of the plurality of properties, a greatest dependency distance from the property to the raw properties; and
- ordering computations of the plurality of properties in the two or more computing threads based on the greatest dependency distance of each of the plurality of properties; and executing the two or more computing threads in parallel to determine the values for the one or more particular properties.

17. The non-transitory computer-readable medium of claim 16, wherein executing the two or more computing threads in parallel comprises generating the values for the plurality of properties based on the dependencies between the plurality of properties; wherein the raw properties are first properties used in a first determination of the sequence of computations of the two or more computing threads, wherein the values for the plurality of properties depend on raw property values for the raw properties.

18. The non-transitory computer-readable medium of claim 16, wherein determining, for each of the at least some of the plurality of properties, the greatest dependency distance from the property to the raw properties comprises:
- determining a number of dependencies between the property to each of the raw properties; and
- determining the greatest dependency distance from the property to the raw properties by comparing each of the number of dependencies between the property to each of the raw properties, wherein the greatest dependency distance is one of the number of dependencies that is a greatest number of dependencies.

* * * * *